(12) United States Patent
Loschelder et al.

(10) Patent No.: US 8,459,303 B2
(45) Date of Patent: Jun. 11, 2013

(54) VALVE CARTRIDGE INSENSITIVE TO INSTALLATION LOAD

(75) Inventors: Todd C. Loschelder, Macedonia, OH (US); W. Randall Tucker, Oberlin, OH (US)

(73) Assignee: Moen Incorporated, North Olmsted, OH (US)

( * ) Notice: Subject to any disclaimer, the term of this patent is extended or adjusted under 35 U.S.C. 154(b) by 1233 days.

(21) Appl. No.: 12/023,760

(22) Filed: Jan. 31, 2008

(65) Prior Publication Data

US 2009/0026402 A1    Jan. 29, 2009

Related U.S. Application Data

(60) Provisional application No. 60/898,518, filed on Jan. 31, 2007.

(51) Int. Cl.
*F16K 11/078* (2006.01)
(52) U.S. Cl.
USPC .................................... 137/625.41
(58) Field of Classification Search
USPC .......................... 137/625.4, 625.41
See application file for complete search history.

(56) References Cited

U.S. PATENT DOCUMENTS

| | | | | |
|---|---|---|---|---|
| 2,020,286 | A | * | 11/1935 | Bittle ................... 137/625.13 |
| 3,506,036 | A | | 4/1970 | Hare |
| 3,661,180 | A | * | 5/1972 | Lyon .................... 137/625.17 |
| 3,680,592 | A | * | 8/1972 | Hayman ................ 137/625.4 |
| 3,693,660 | A | * | 9/1972 | Wheelock ............. 137/625.4 |
| 3,780,758 | A | | 12/1973 | DeVries |
| 3,788,354 | A | * | 1/1974 | Symmons .............. 137/625.4 |
| 3,789,862 | A | | 2/1974 | Keller |
| 3,789,870 | A | | 2/1974 | Keller |
| 3,807,455 | A | | 4/1974 | Farrell |
| 3,854,493 | A | | 12/1974 | Farrell |
| 4,314,673 | A | * | 2/1982 | Rudelick ............... 239/443 |
| 4,325,403 | A | | 4/1982 | Uhlman |
| 4,502,507 | A | * | 3/1985 | Hayman ................ 137/625.4 |
| 4,733,688 | A | | 3/1988 | Lorch |
| 4,733,694 | A | | 3/1988 | Knapp |
| 4,754,783 | A | | 7/1988 | Knapp |
| 4,821,765 | A | | 4/1989 | Iqbal et al. |
| 4,823,832 | A | | 4/1989 | Rodstein |
| 4,838,304 | A | | 6/1989 | Knapp |
| 4,903,943 | A | * | 2/1990 | Hochstrasser ......... 251/235 |
| 4,921,016 | A | | 5/1990 | Gnauert et al. |
| 4,932,438 | A | | 6/1990 | Kitamura et al. |

(Continued)

OTHER PUBLICATIONS

Chinese Office Action dated Oct. 21, 2010, issued in Chinese application CN200880003682.4 entitled Valve Cartridge Insensitive to Installation Load, filed on Jan. 31, 2008 by Moen Incorporated (7 pages).

(Continued)

*Primary Examiner* — John Fox
(74) *Attorney, Agent, or Firm* — Calfee, Halter & Griswold LLP

(57) ABSTRACT

A one-handle valve cartridge includes an actuating mechanism, wherein an amount of force required to operate the actuating mechanism is insensitive to a load applied to the valve cartridge during installation of the valve cartridge in a valve body. Accordingly, the valve cartridge can operate over a wide range of installation loads and can be properly installed without using a specialized tool or mechanism.

10 Claims, 59 Drawing Sheets

U.S. PATENT DOCUMENTS

| | | | |
|---|---|---|---|
| 4,942,902 A | 7/1990 | Knapp | |
| 4,944,330 A | 7/1990 | Sakakibara et al. | |
| 4,957,135 A | 9/1990 | Knapp | |
| 4,969,483 A * | 11/1990 | Knapp | 137/218 |
| 4,971,102 A | 11/1990 | Orlandi | |
| 4,995,419 A | 2/1991 | Pawelzik et al. | |
| 5,014,736 A | 5/1991 | Korfgen et al. | |
| 5,069,249 A | 12/1991 | Ostertag et al. | |
| 5,100,565 A | 3/1992 | Fujiwara et al. | |
| 5,113,898 A | 5/1992 | White et al. | |
| 5,195,555 A | 3/1993 | Knapp | |
| 5,402,827 A | 4/1995 | Gonzalez | |
| 5,417,242 A | 5/1995 | Goncze | |
| 5,435,348 A | 7/1995 | Nakamura et al. | |
| 5,755,258 A | 5/1998 | Pawelzik et al. | |
| 5,755,261 A | 5/1998 | Fukuzawa et al. | |
| 5,823,510 A | 10/1998 | Muramatsu et al. | |
| 5,829,735 A | 11/1998 | Ikeda | |
| 5,934,321 A | 8/1999 | Miya et al. | |
| 6,131,600 A | 10/2000 | Chang | |
| 6,386,226 B1 | 5/2002 | Lopp et al. | |
| 6,405,756 B2 | 6/2002 | Creswell et al. | |
| 6,439,581 B1 | 8/2002 | Chang | |
| 6,484,753 B1 | 11/2002 | Shimizu et al. | |
| 6,575,196 B1 | 6/2003 | Creswell | |
| 6,758,242 B2 | 7/2004 | Jones et al. | |
| 6,904,935 B2 | 6/2005 | Welty et al. | |
| 6,920,899 B2 | 7/2005 | Haenlein et al. | |
| 6,935,618 B2 | 8/2005 | Welty et al. | |
| 6,966,335 B2 | 11/2005 | Chen | |
| 7,004,197 B2 | 2/2006 | Gilbert | |
| 7,044,162 B2 | 5/2006 | Bolgar et al. | |
| 2001/0029984 A1 | 10/2001 | Creswell et al. | |
| 2003/0178072 A1 | 9/2003 | Jones et al. | |
| 2003/0196700 A1 | 10/2003 | Gilbert | |
| 2004/0118455 A1 | 6/2004 | Welty et al. | |
| 2004/0129314 A1 | 7/2004 | Welty et al. | |
| 2004/0231735 A1 | 11/2004 | Haenlein et al. | |
| 2005/0000576 A1 | 1/2005 | Chen | |
| 2006/0016491 A1 | 1/2006 | Rosko et al. | |
| 2006/0038156 A1 | 2/2006 | Welty et al. | |
| 2006/0174955 A1 | 8/2006 | Huang | |

OTHER PUBLICATIONS

International Search Report and Written Opinion dated Jul. 8, 2008, issued in application PCT/US08/052663 entitled Valve Cartridge Insensitive to Installation Load, filed on Jan. 31, 2008 by Moen Incorporated.

* cited by examiner

SECTION A-A

SECTION A-A

SECTION B-B

SECTION A-A

SECTION B-B

SECTION A-A

SECTION A-A

SECTION A-A

SECTION A-A

SECTION A-A

SECTION B-B

SECTION A-A

VALVE CARTRIDGE INSENSITIVE TO INSTALLATION LOAD

RELATED APPLICATION

The present application is being filed as a non-provisional patent application claiming priority under 35 U.S.C. §119(e) from, and any other benefit of, U.S. Provisional Patent Application No. 60/898,518 filed on Jan. 31, 2007, the entire disclosure of which is herein incorporated by reference.

FIELD

The invention relates generally to valve cartridges and, more particularly, to a valve cartridge in which operation of the valve cartridge is insensitive to a load applied to the valve cartridge during installation.

BACKGROUND

Typically, for a plumbing fixture (e.g., a faucet, a tub spout, a shower head), a valve body conveys water flowing from a main water source to a desired destination (e.g., a sink, a tub, a basin). The valve body generally has two water inlet passages through which cold water and hot water from the main water source can respectively flow. The valve body also has a water outlet passage through which the cold water, the hot water or a mixture of the cold and hot water can be discharged to an outlet portion of the plumbing fixture (e.g., a spout). In a one-handle version of the valve body, the valve body has a cavity for receiving a valve cartridge which allows a user to control the flow rate and the temperature of the water flowing through the water inlet passages to the water outlet passage using a single valve actuating mechanism.

One type of (conventional) valve cartridge is a structural assembly including a housing in which two or more disks, plates or the like are disposed. The disks are generally made of a hard material (e.g., ceramic or metal). At least one of the disks (i.e., a fixed disk) is fixed with respect to the housing. Another of the disks (i.e., a movable disk) is disposed above the fixed disk and is movable with respect to the fixed disk. The valve cartridge includes the actuating mechanism that is directly or indirectly connected at one end to the movable disk. Another end of the actuating mechanism extends through an opening in the housing for manipulation by a user. The end of the actuating mechanism extending through the opening in the housing can be connected to an operating member, such as a handle, knob or the like, to assist the user in operating the valve cartridge.

In a one-handle version of this type of valve cartridge for use in the one-handle version of the valve body, the fixed disk includes two inlet openings (i.e., a cold water inlet opening and a hot water inlet opening) that substantially align with the water inlet passages of the valve body when the valve cartridge is installed in the valve body. Furthermore, the fixed disk includes an outlet opening that substantially aligns with the water outlet passage of the valve body when the valve cartridge is installed in the valve body. The actuating mechanism is connected to the movable disk via a coupling. The actuating mechanism can be pivoted to cause translational movement of the movable disk. The actuating mechanism can be rotated to cause angular movement of the movable disk.

In this manner, the movable disk can assume different positions with respect to the fixed disk. In particular, pivoting of the actuating mechanism changes the flow rate of the water from zero to a maximum flow rate, whereas rotation of the actuating mechanism changes the temperature of the water. Accordingly, a one-handle actuating mechanism can control both the flow rate and the temperature of the water flowing through the valve cartridge.

The valve cartridge also includes one or more seals for preventing water from leaking out of the valve cartridge. The seals can be located, for example, below, between and/or above the disks in the valve cartridge. When the valve cartridge is installed in the valve body, a retention nut is used to secure the valve cartridge in the valve body. The retention nut engages the housing of the valve cartridge such that the seals in the valve cartridge are compressed and, thus, apply a loading force to the components (including the disks) in the valve cartridge. As a torque applied to the retention nut increases, the load on the components in the valve cartridge increases. Accordingly, the fixed disk and the movable disk are kept in water tight contact after installation of the valve cartridge in the valve body.

During installation of the conventional valve cartridge in the valve body, it is typically required that a load within a specified range be applied to the valve cartridge to insure proper operation of the valve cartridge. Consequently, a torque within a specified range must be applied to the retention nut to achieve a proper load on the valve cartridge.

If an insufficient load is applied to the valve cartridge, such as from too little torque being applied to the retention nut, the valve cartridge will not operate properly. For example, if inadequate torque is applied to the retention nut during installation of the valve cartridge, the seals in the valve cartridge are not compressed sufficiently to insure that the fixed disk and the movable disk are kept in water tight contact after installation of the valve cartridge in the valve body, such that the valve cartridge is likely to leak. Additionally, the insufficient compression of the seals in the valve cartridge can cause the components in the valve cartridge to engage one another loosely or improperly. For example, if a frictional force between the disks (under the load of the retention nut) is too small, the frictional force can be insufficient to keep the operating member in a raised (i.e., on) position, thereby resulting in a problem known as "handle drop." As a result of these problems resulting from an insufficient installation load, the user can experience an inconsistent, imprecise and/or rough feel during operation of the valve cartridge.

If too great a load is applied to the valve cartridge, such as from an excessive torque being applied to the retention nut, it will be difficult for the user to operate the valve cartridge (e.g., the movable disk will be hard to move relative to the fixed disk). In an extreme case, the movable disk will not move relative to the fixed disk, thereby rendering the valve cartridge inoperable. Furthermore, if an excessive load is applied during installation of the valve cartridge, a resulting increased frictional force needed to move the movable disk on the fixed disk is transferred up to the actuating mechanism of the valve cartridge, where it is felt by the user. Further still, the excessive load on the valve cartridge can result in accelerated wear of the various dynamic bearing surfaces in the valve cartridge, thereby shortening the effective life of the valve cartridge. As a result of these problems resulting from an excessive installation load, the user can experience an inconsistent, imprecise and/or rough feel during operation of the valve cartridge.

Accordingly, a specialized tool (e.g., a torque wrench) or some other specialized mechanism is necessary for properly installing the conventional valve cartridge in the valve body.

Consequently, there is a need in the art for a valve cartridge wherein operation of the valve cartridge is insensitive to a load applied to the valve cartridge during installation of the valve cartridge in a valve body.

SUMMARY

In view of the above, it is an exemplary aspect to provide a valve cartridge wherein operation of the valve cartridge is insensitive to a load applied to the valve cartridge during installation of the valve cartridge in a valve body.

It is another exemplary aspect to provide a valve cartridge that operates properly over a wide range of installation loads.

It is still another exemplary aspect to provide a valve cartridge which can be properly installed in a valve body without the need for any specialized tools or mechanisms, such as a torque wrench.

BRIEF DESCRIPTION OF THE DRAWINGS

The above aspects and additional aspects, features and advantages will become readily apparent by describing in detail exemplary embodiments thereof with reference to the attached drawings, wherein like reference numerals denote like elements, and:

FIG. 4A is a perspective view of the spring. FIG. 4B is a plan view of the spring. FIG. 4C is a side elevational view of the spring.

FIG. 5A is a perspective view of the bushing. FIG. 5B is a side elevational view of the bushing. FIG. 5C is a bottom view of the bushing. FIG. 5D is a cross-sectional view of the bushing of FIG. 5C, along line A-A.

FIG. 6A is a perspective view of the flow plate. FIG. 6B is a plan view of the flow plate. FIG. 6C is a cross-sectional view of the flow plate of FIG. 6B, along line A-A. FIG. 6D is a cross-sectional view of the flow plate of FIG. 6B, along line B-B.

FIG. 8A is a top perspective view of the base seal. FIG. 8B is a bottom perspective view of the base seal.

FIG. 9A is a plan view of the valve cartridge in assembled form. FIG. 9B is a cross-sectional view of the valve cartridge of FIG. 9A, along line A-A. FIG. 9C is a cross-sectional view of the valve cartridge of FIG. 9A, along line B-B.

FIG. 12A is a perspective view of the upper housing. FIG. 12B is a side elevational view of the upper housing. FIG. 12C is a cross-sectional view of the upper housing of FIG. 12B, along line A-A.

FIG. 14A is a perspective view of the spring. FIG. 14B is a plan view of the spring. FIG. 14C is a cross-sectional view of the spring of FIG. 14B, along line A-A.

FIG. 15A is a side elevational view of the bushing. FIG. 15B is a cross-sectional view of the bushing of FIG. 15A along line A-A. FIG. 15C is a plan view of the bushing.

FIG. 16A is a perspective view of the carrier. FIG. 16B is a plan view of the carrier. FIG. 16C is a bottom view of the carrier. FIG. 16D is a side elevational view of the carrier.

FIG. 17A is a plan view of the movable disk. FIG. 17B is a cross-sectional view of the movable disk of FIG. 17A, along line A-A. FIG. 17C is a bottom view of the movable disk.

FIG. 18A is a top perspective view of the fixed disk. FIG. 18B is a bottom perspective view of the fixed disk. FIG. 18C is a plan view of the fixed disk. FIG. 18D is a bottom view of the fixed disk.

FIG. 19A is a top perspective view of the base seal. FIG. 19B is a plan view of the base seal.

FIG. 20A is a top perspective view of the lower housing. FIG. 20B is a bottom perspective view of the lower housing. FIG. 20C is a plan view of the lower housing.

FIG. 20D is a bottom view of the lower housing.

FIG. 21A is a plan view of the valve cartridge in assembled form. FIG. 21B is a cross-sectional view of the valve cartridge of FIG. 21A, along line A-A. FIG. 21C is a cross-sectional view of the valve cartridge of FIG. 21A, along line B-B.

FIG. 22A is a perspective view of the retention nut.

FIG. 22B is a plan view of the retention nut. FIG. 22C is a cross-sectional view of the retention nut of FIG. 22B, along line A-A.

DETAILED DESCRIPTION

Figure 1:
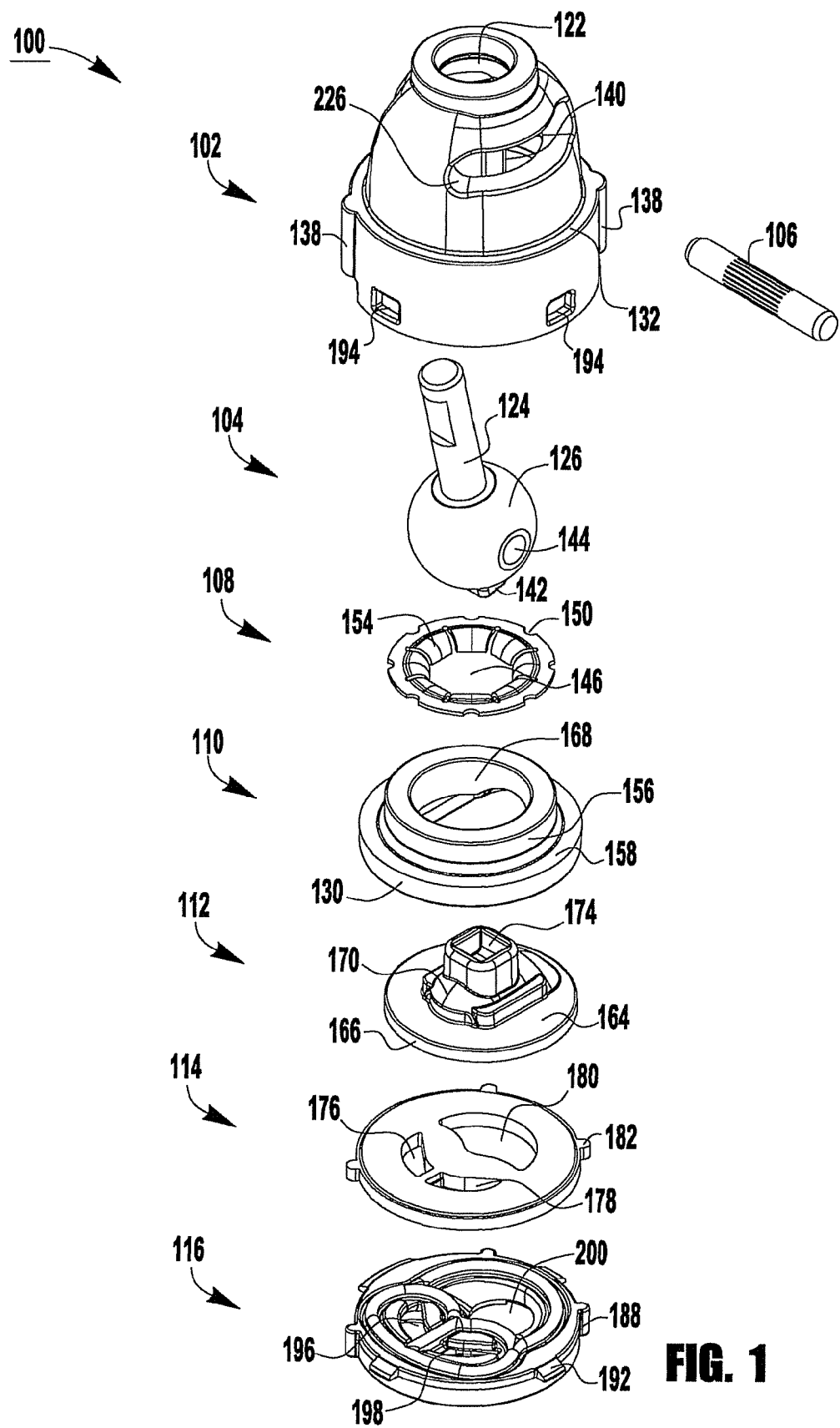
FIG. 1 is a perspective exploded view of a valve cartridge, according to an exemplary embodiment.

While the general inventive concept is susceptible of embodiment in many different forms, there are shown in the drawings and will be described herein in detail specific embodiments thereof with the understanding that the present disclosure is to be considered as an exemplification of the principles of the general inventive concept. Accordingly, the general inventive concept is not intended to be limited to the specific embodiments illustrated herein.

A one-handle valve cartridge 100, according to an exemplary embodiment, has structure that makes operation of the valve cartridge 100 insensitive to an installation load on the valve cartridge 100. Accordingly, as a larger installation load is applied to the valve cartridge 100 during installation of the valve cartridge 100, there is little or no change in the force (e.g., torque) required to operate the valve cartridge 100.

As shown in FIGS. 1 and 9A-9C, the exemplary valve cartridge 100 has several discrete components including a housing 102, a ball-stem 104, a pin 106, a spring 108, a bushing 110, a flow plate 112, a manifold 114 and a base seal 116. The flow plate 112 and/or the manifold 114 can be made of a hard material. For example, the flow plate 112 and/or the manifold 114 can be made of stainless steel. The housing 102, for example, can be made of plastic or metal.

Figure 2:
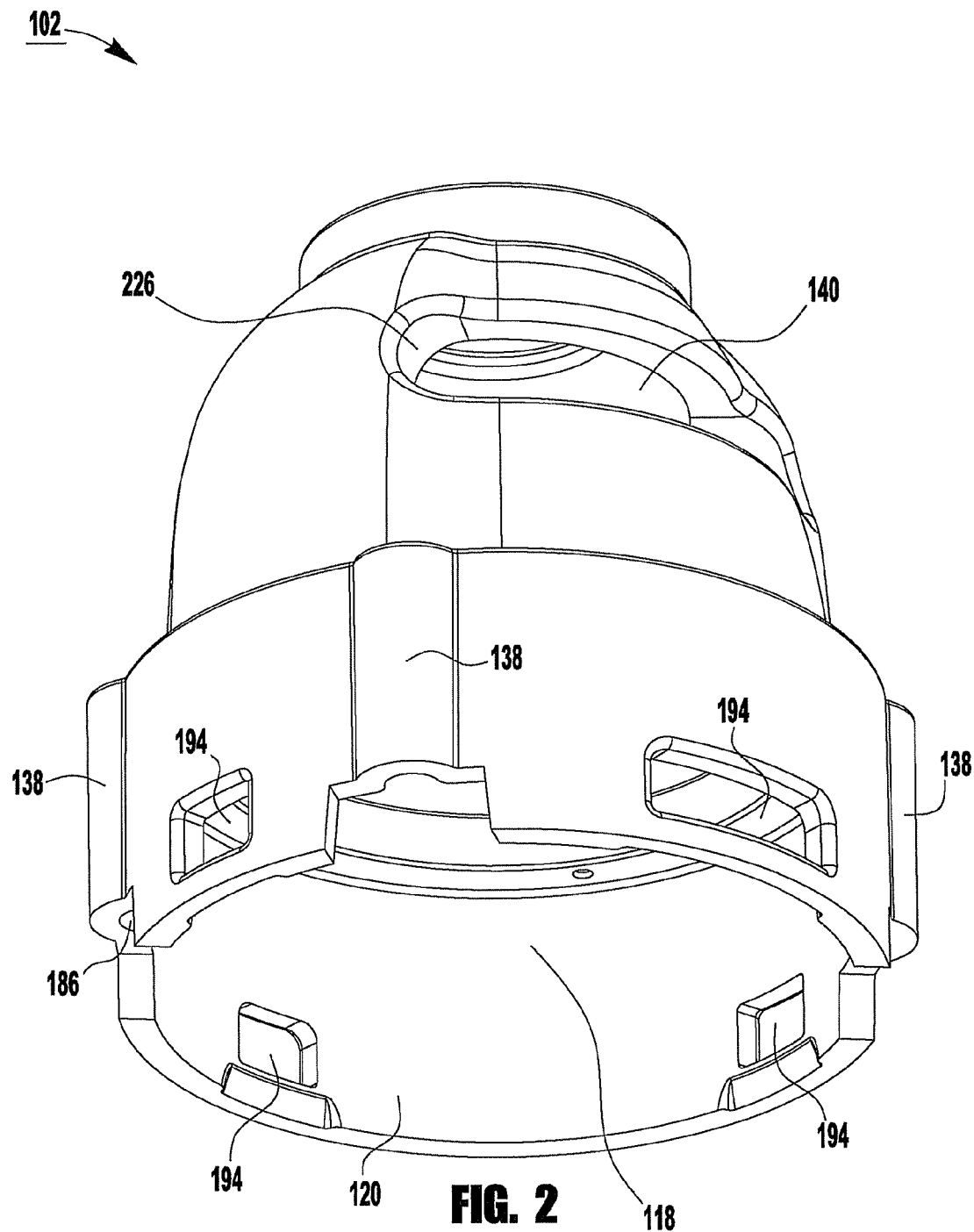
FIG. 2 is a perspective view of an exemplary housing of the exemplary valve cartridge of FIG. 1.

As shown in FIG. 2, the housing 102 has a cavity 118 formed therein for receiving the remaining components of the valve cartridge 100. The housing 102 includes a lower opening 120 through which the components can be inserted into the housing 102. The housing 102 also includes an upper opening 122 through which a stem portion 124 of the ball-stem 104 extends. The cavity 118 in the housing 102 is wider near the lower opening 120 than near the upper opening 122. A portion of the cavity 118 near the upper opening 122 of the housing 102 receives a ball portion 126 of the ball-stem 104. Accordingly, a first inner surface 128 of the portion of the cavity 118 near the upper opening 122 has a shape that substantially conforms to a shape of the ball portion 126 of the ball-stem 104 (see FIGS. 9B-9C and 10).

A portion of the cavity 118 near the lower opening 120 of the housing 102 receives the bushing 110, the flow plate 112, the manifold 114 and the base seal 116. A diameter of the cavity 118 near the lower opening 120 is substantially the same as a diameter of the base seal 116, the manifold 114 and a flat annular portion 130 of the bushing 110, such that only a small gap is present between these components and the housing 102 when the components are received in the housing 102.

Figure 9A:
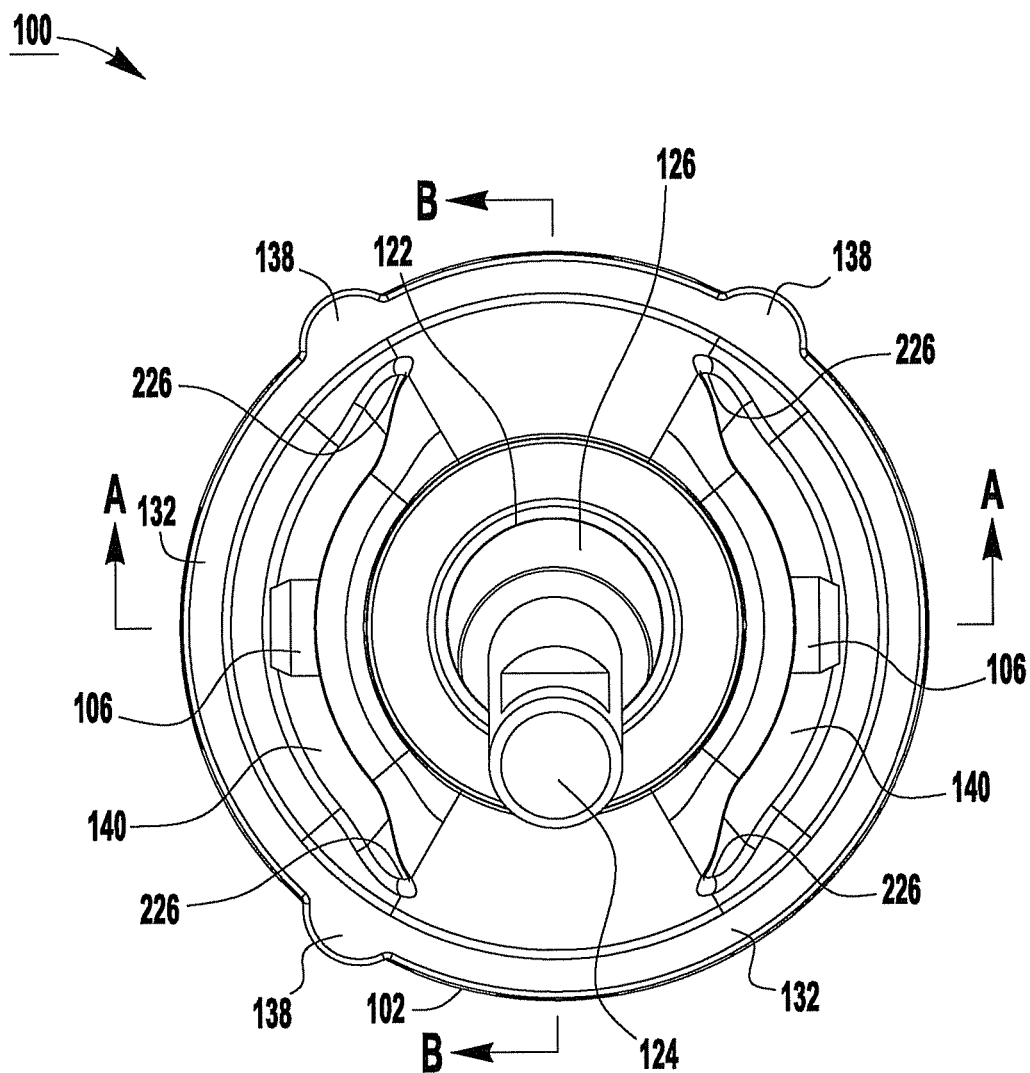
FIGS. 9A-9C show the exemplary valve cartridge of FIG. 1 in assembled form.
Figure 9B:
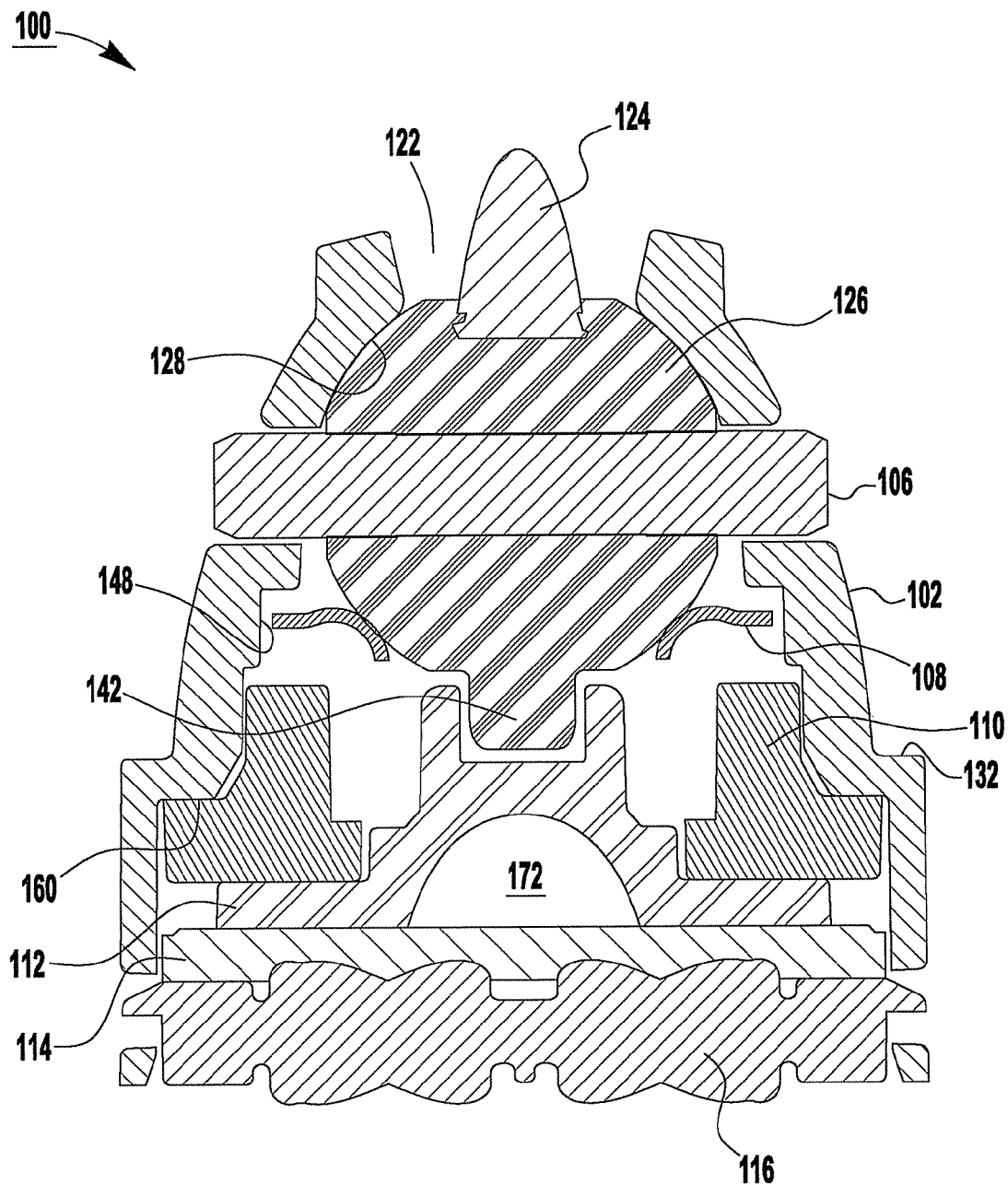
Figure 9C:
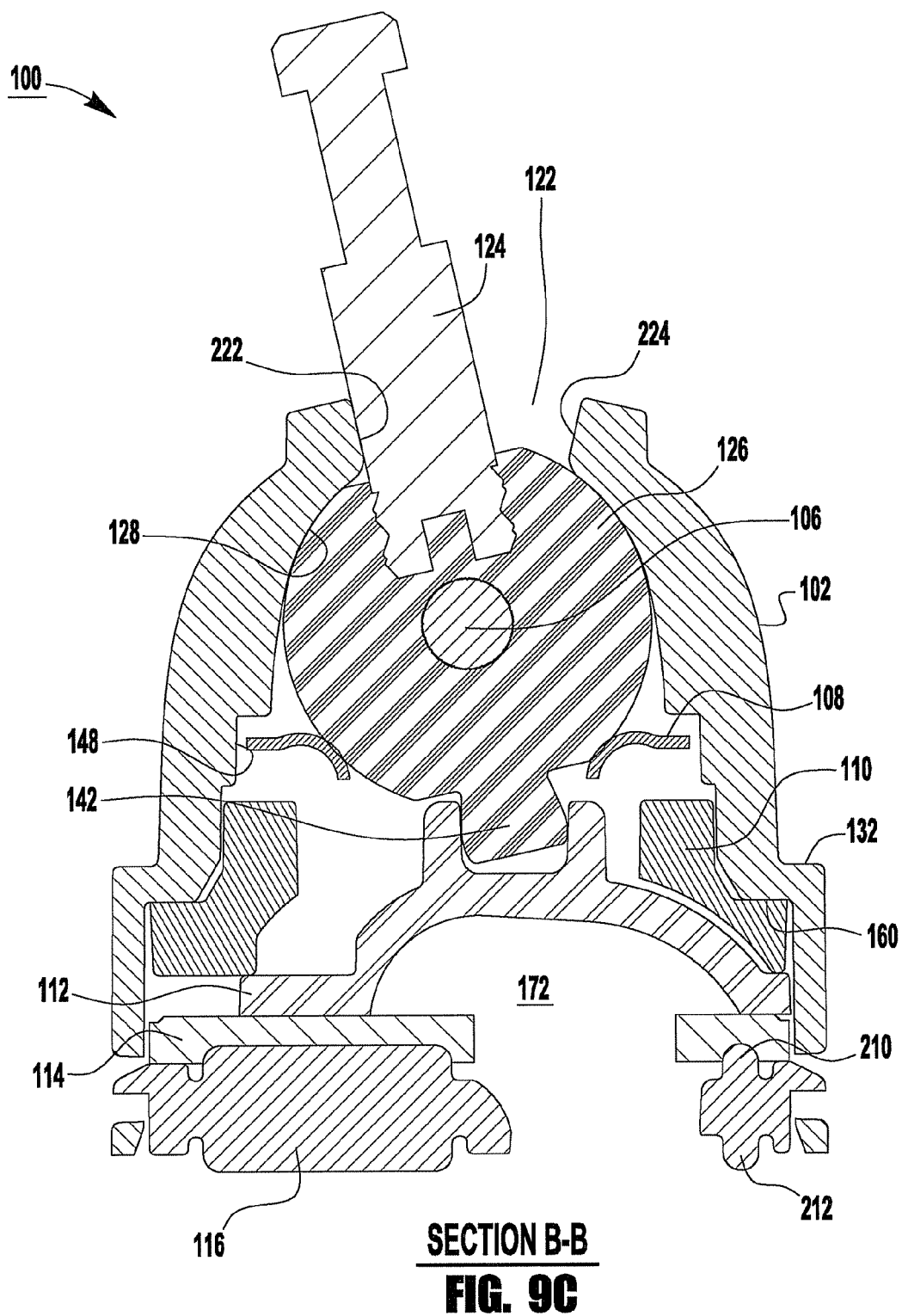

The portion of the cavity 118 near the lower opening 120 of the housing 102 forms an installation ledge 132 on an outer surface of the housing 102 (see FIGS. 1 and 9B-9C). A retention nut 134 engages the installation ledge 132 and/or the housing 102 above the installation ledge 132 to secure the valve cartridge 100 in a valve body 136 (see FIG. 10). Furthermore, the housing 102 has one or more keys 138 that each engage a complementary-shaped recess (not shown) in the valve body 136 to prevent rotation of the housing 102 relative to the valve body 136 after the valve cartridge 100 is installed. The one or more keys 138 can have a lobular shape. The housing 102 also includes a pair of slots 140 formed on opposing sides of the housing 102 that interface with distal ends of the pin 106 to function as temperature-limit stops, as described below.

Figure 3:
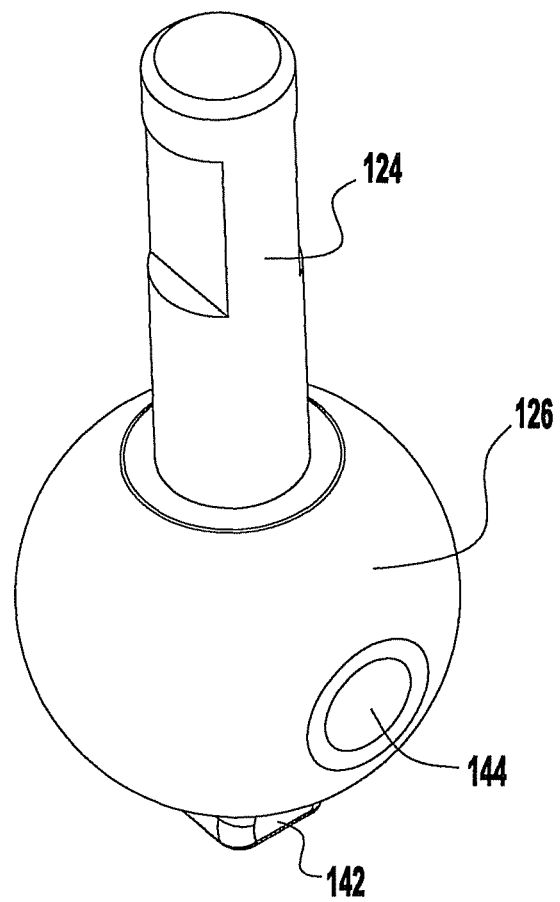
FIG. 3 is a perspective view of an exemplary ball-stem of the exemplary valve cartridge of FIG. 1.

As shown in FIG. 3, the ball-stem 104 is the actuating mechanism for the valve cartridge 100. The ball-stem 104 includes the ball portion 126 and the stem portion 124. The ball portion 126 and the stem portion 124 can be discrete components or can be formed integrally. The ball portion 126 includes a projection 142 extending from a side of the ball portion 126 that is opposite a side of the ball portion 126 from which the stem portion 124 extends. The projection 142 acts as a coupling device for connecting the ball-stem 104 to the flow plate 112, as described below. The ball portion 126 and the projection 142 can be discrete components or can be formed integrally.

A bore 144 is formed through a center of the ball portion 126 of the ball-stem 104. The bore 144 is orthogonal to the stem portion 124 of the ball-stem 104. After the ball-stem 104 is inserted into the cavity 118 of the housing 102, the pin 106 can be inserted through one of the slots 140 in the housing 102 and into the bore 144 of the ball-stem 104. In this manner, the pin 106 retains the ball-stem 104 in the housing 102.

Figure 4A:
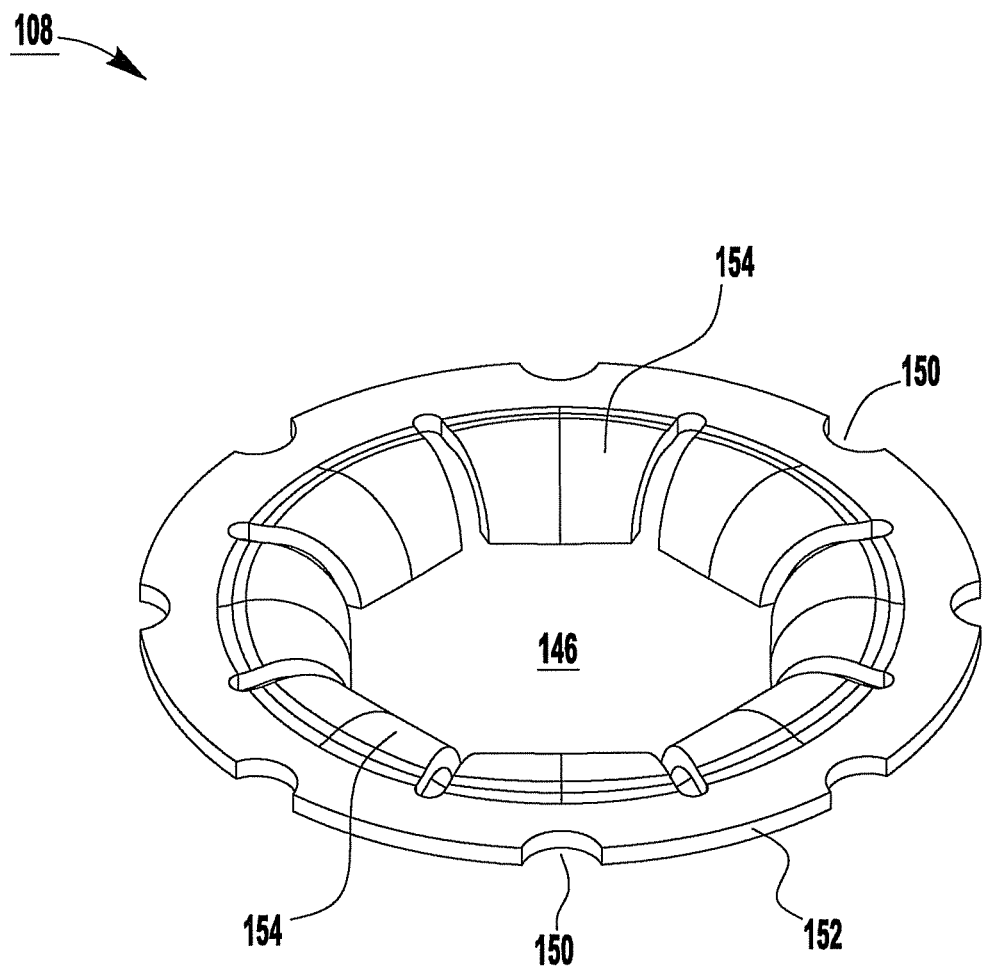
FIGS. 4A-4C show an exemplary spring used in the exemplary valve cartridge of FIG. 1.
Figure 4B:
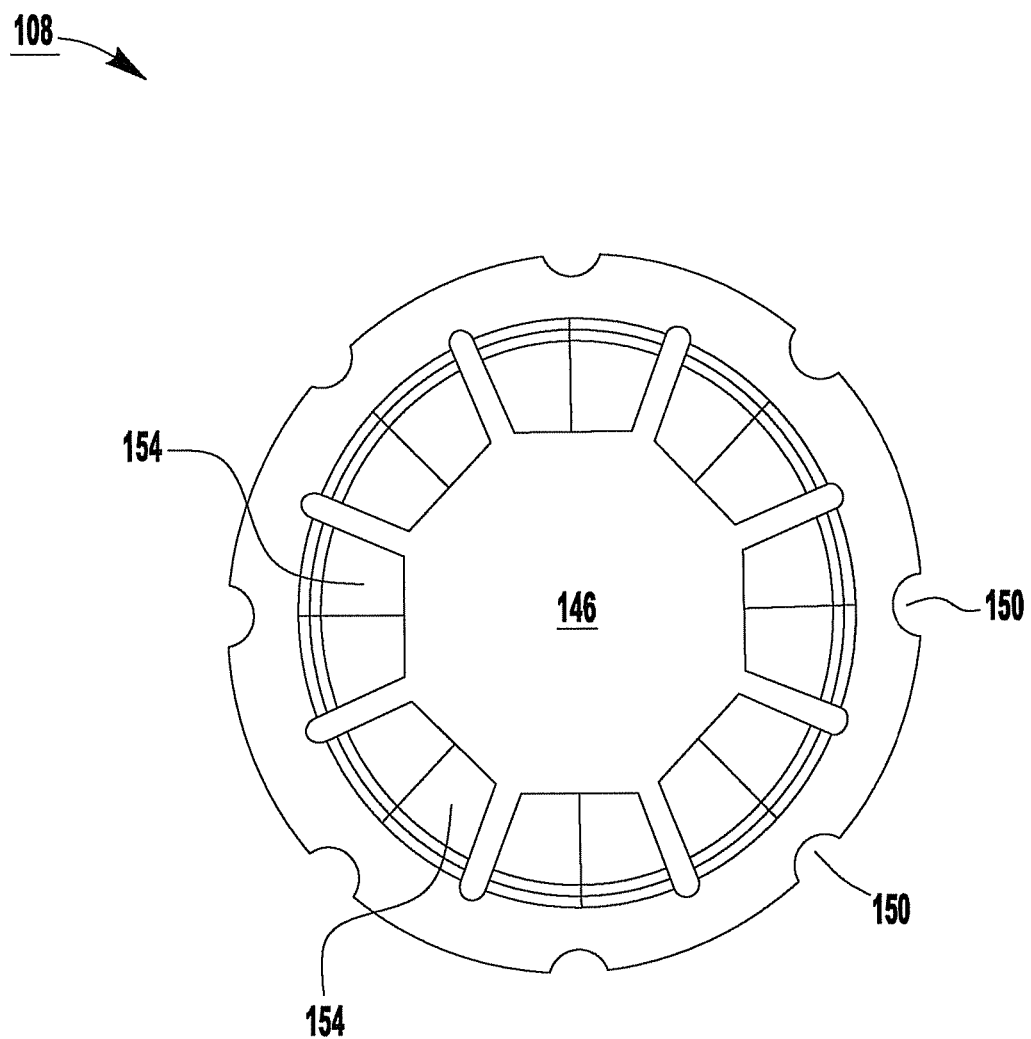
Figure 4C:
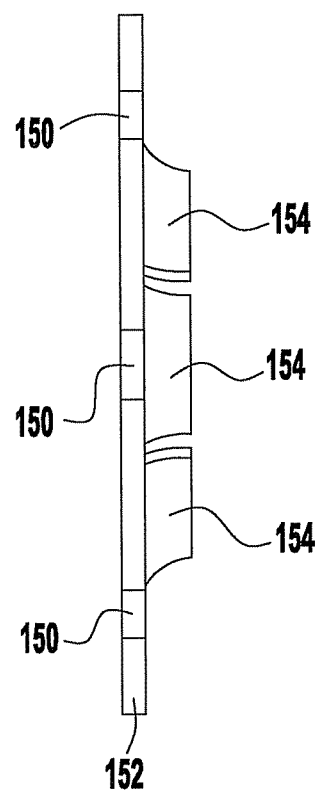
Figure 5A:
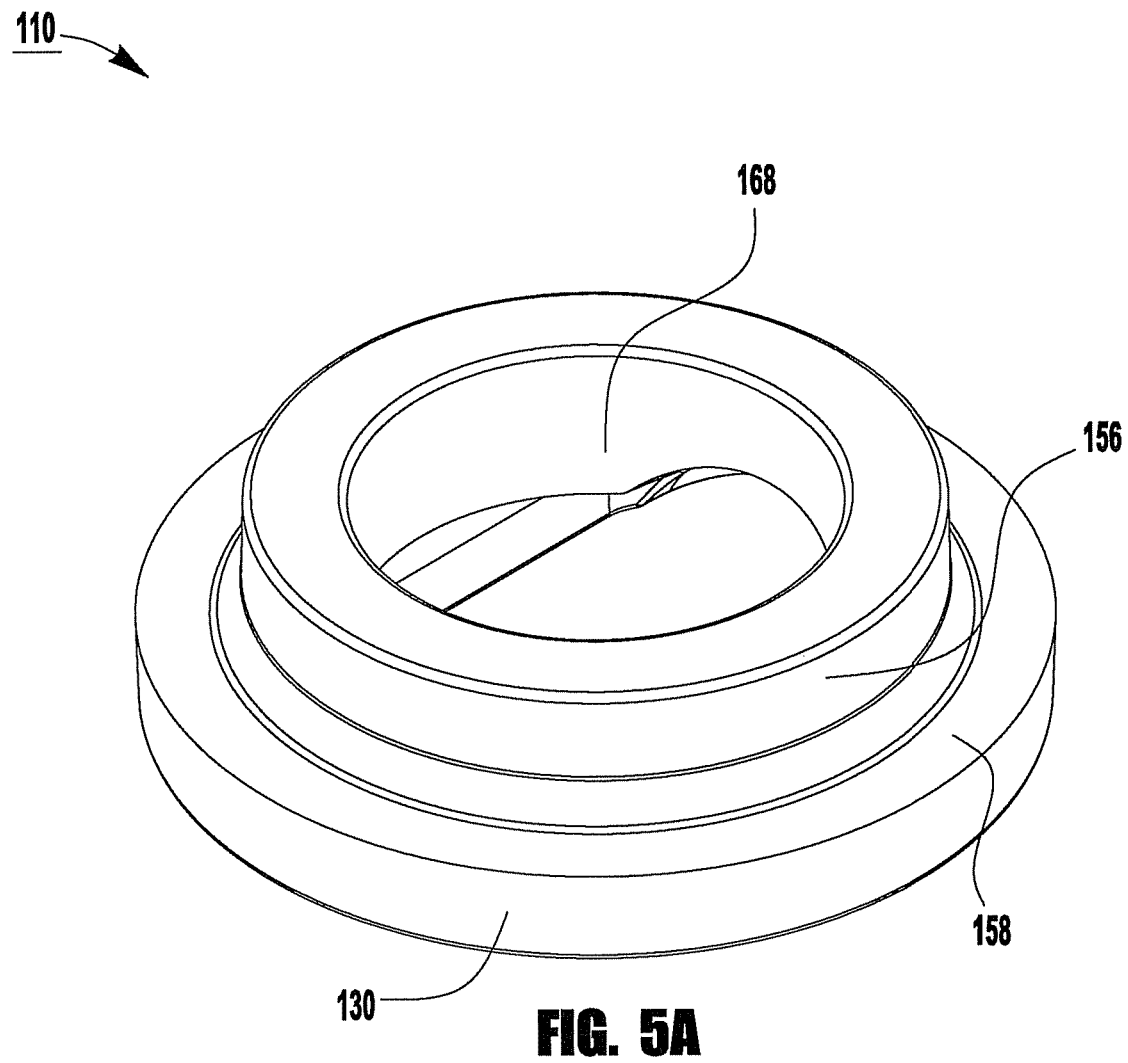
FIGS. 5A-5D show an exemplary bushing used in the exemplary valve cartridge of FIG. 1.
Figure 5B:
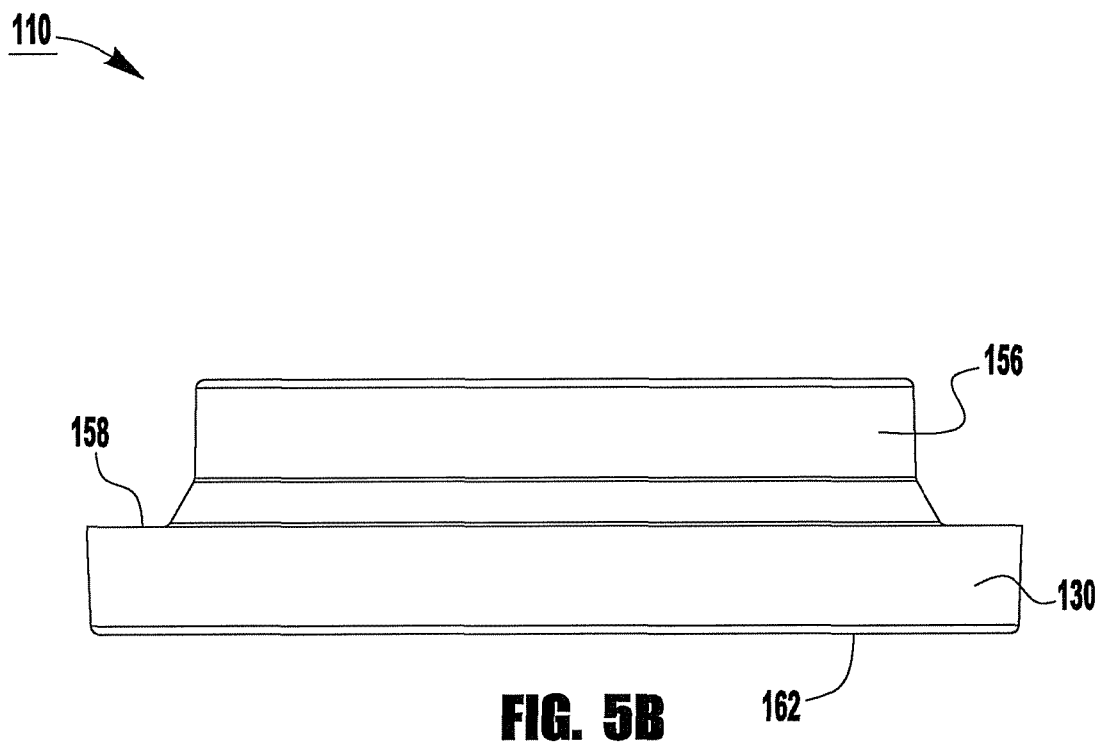
Figure 5C:
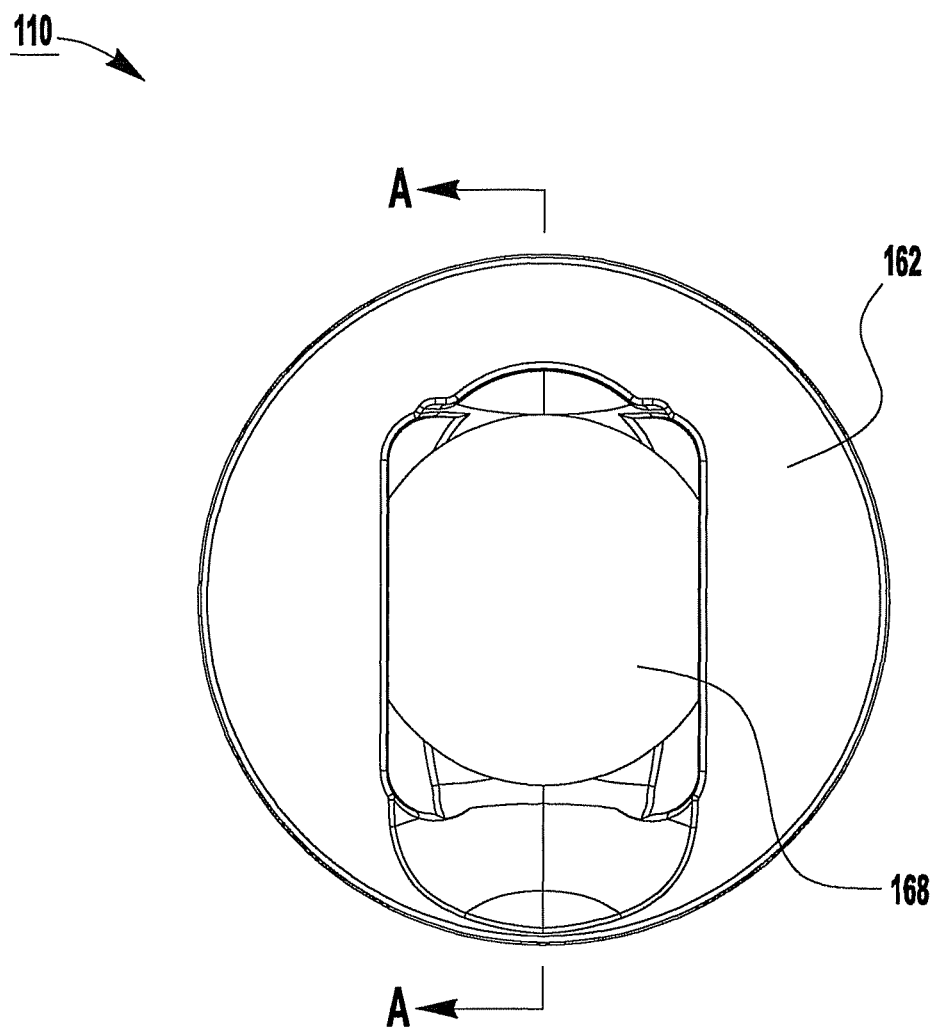
Figure 5D:
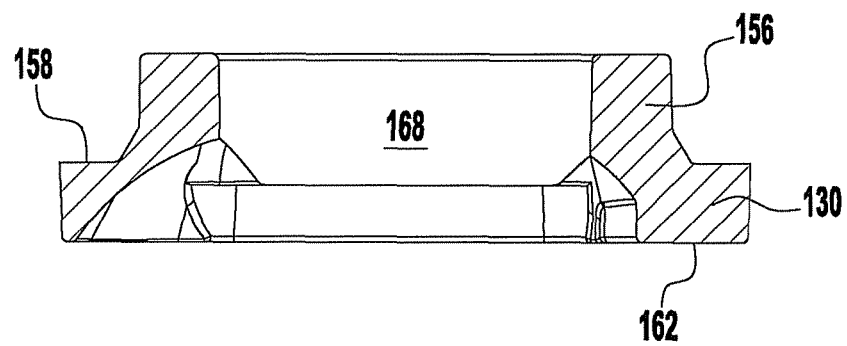
Figure 6A:
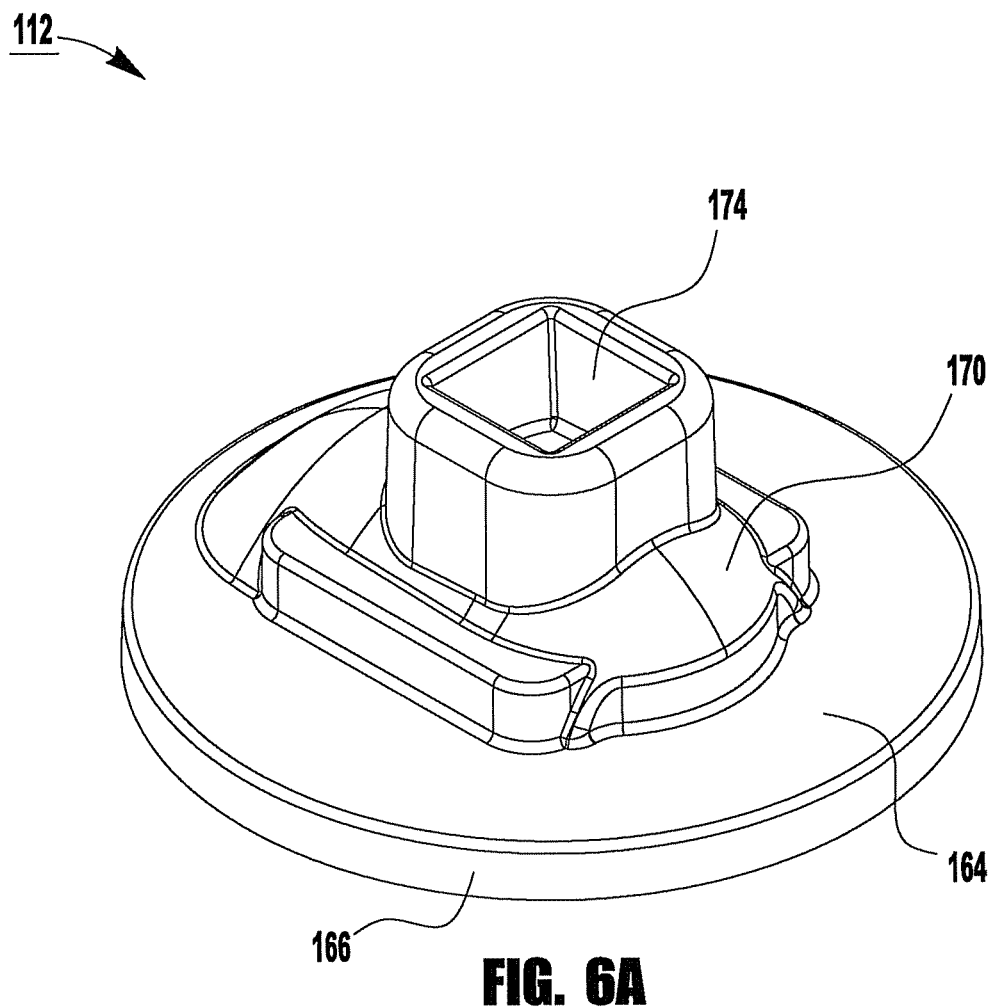
FIGS. 6A-6D show an exemplary flow plate used in the exemplary valve cartridge of FIG. 1.
Figure 6B:
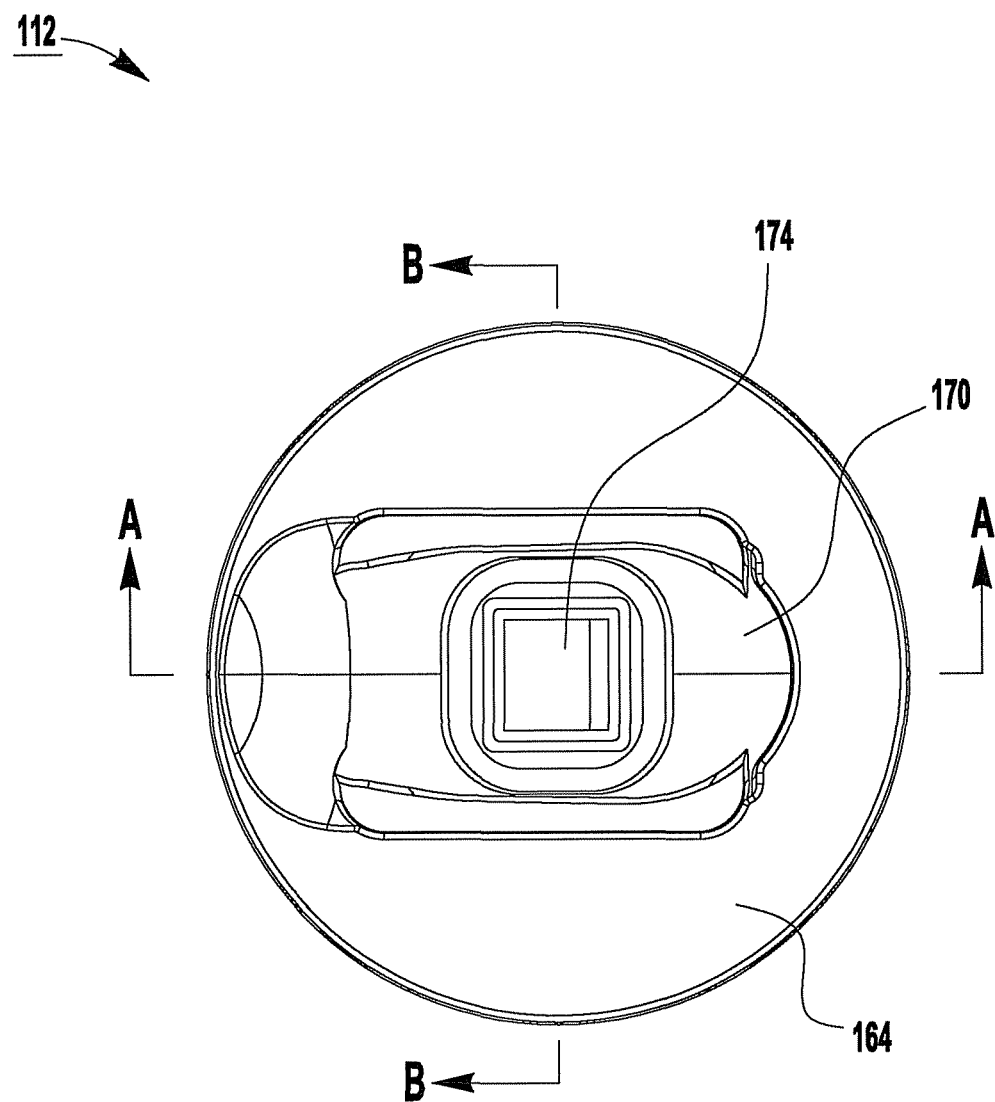
Figure 6C:
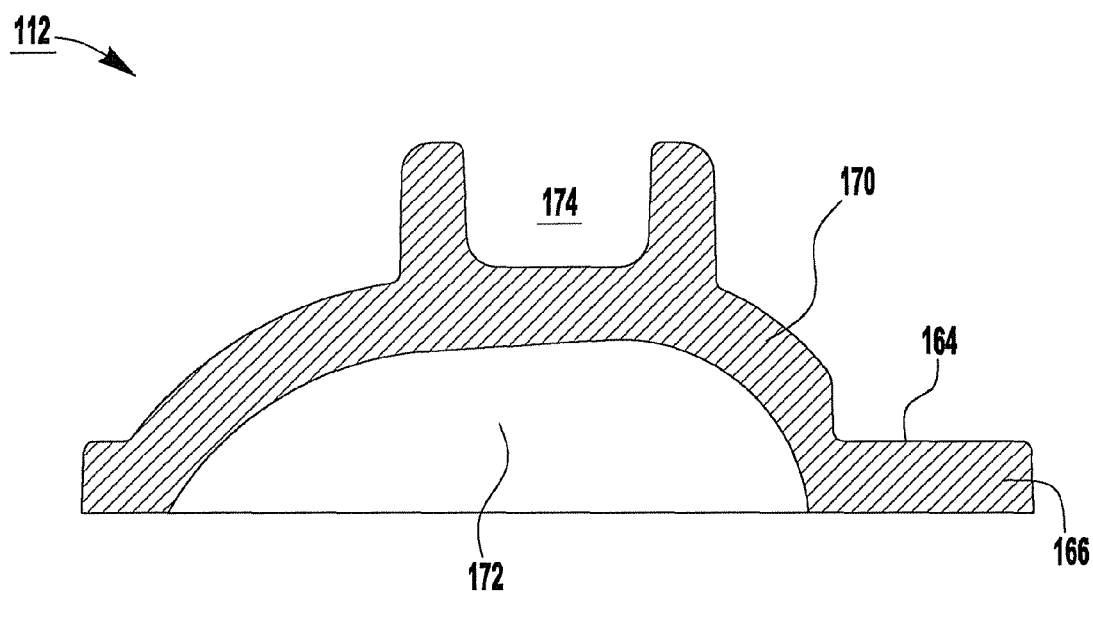
Figure 6D:
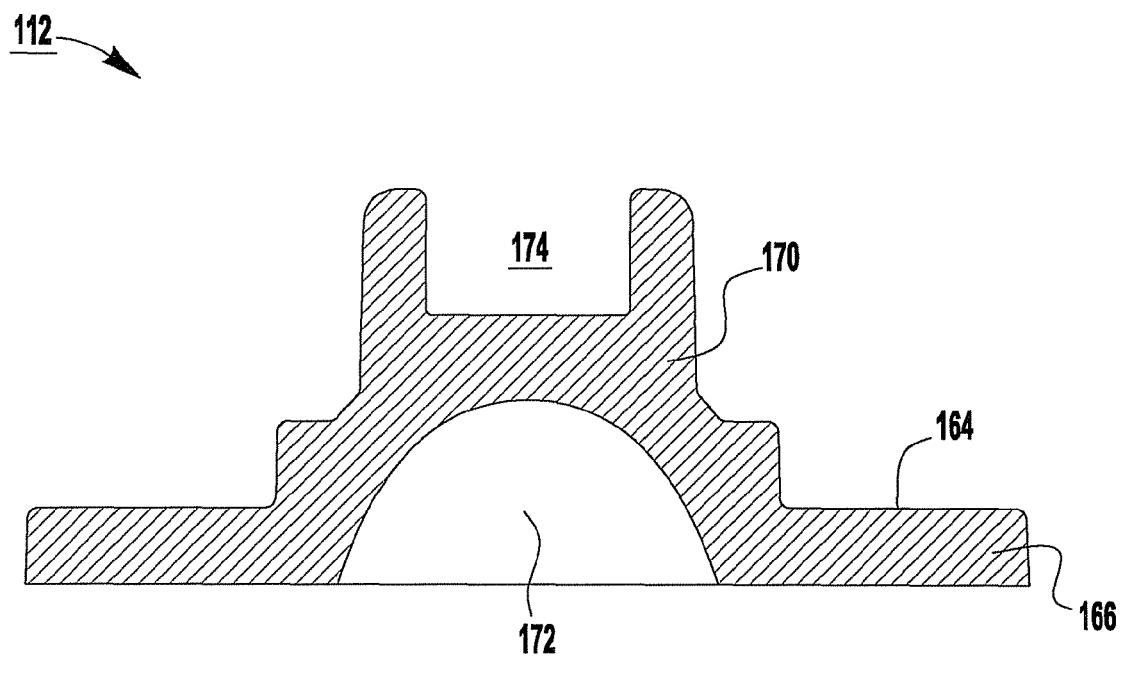

As shown in FIGS. 4A-4C, the spring 108 has an annular shape with a central opening 146. The spring 108 is disposed below the ball portion 126 of the ball-stem 104 in the housing 102 (see FIGS. 9B-9C). The spring 108 is connected to a second inner surface 148 of the housing 102 (e.g., by or through threading, friction fitting, welding), such that the spring 108 also retains the ball-stem 104 in the housing 102. The spring 108 has a plurality of notches 150 formed on an outer periphery 152 of the spring 108. The notches 150 engage corresponding tabs (not shown) formed on the second inner surface 148 of the housing 102, thereby securing the spring 108 within the housing 102 below the ball-stem 104.

The projection 142 of the ball-stem 104 extends through the central opening 146 in the spring 108. Some of the ball portion 126 of the ball-stem 104 can also extend through the central opening 146 in the spring 108. The spring 108 includes a plurality of elastic flanges 154 surrounding the central opening 146. The elastic flanges 154 of the spring 108 contact the ball portion 126 of the ball-stem 104 and urge the ball portion 126 of the ball-stem 104 against the complementary-shaped first inner surface 128 of the housing 102.

As shown in FIGS. 5A-5D, the bushing 110 includes the flat annular portion 130 and a raised annular portion 156. A diameter of the flat annular portion 130 is greater than a diameter of the raised annular portion 156. The bushing 110 is disposed below and can be spaced apart from the spring 108 in the cavity 118 of the housing 102 (see FIGS. 9B-9C). An upper surface 158 of the flat annular portion 130 of the bushing 110 contacts a third inner surface 160 of the housing 102, which is located below the installation ledge 132. A lower surface 162 of the flat annular portion 130 of the bushing 110 rests on an upper surface 164 of a flat portion 166 of the flow plate 112. Additionally, the raised portion 156 of the bushing 110 extends into a portion of the cavity 118 of the housing 102 immediately above the installation ledge 132. The raised portion 156 of the bushing 110 is sized to fit closely in that portion of the cavity 118 of the housing 102 receiving the raised portion 156 of the bushing 110. Accordingly, the bushing 110 provides a support surface between the housing 102 and the flow plate 112.

The bushing 110 has an opening 168 that extends through the flat annular portion 130 and the raised annular portion 156 of the bushing 110. A raised portion 170 of the flow plate 112 extends into the opening 168 of the bushing 110. The raised portion 170 of the flow plate 112 forms a mixing chamber 172. A portion of the opening 168 of the bushing 110 has an inner surface shaped to conform to a shape of the raised portion 170 of the flow plate 112 (see FIGS. 5C-5D). Additionally, a coupling recess 174 is formed on the raised portion 170 of the flow plate 112 (see FIGS. 6A-6D). After the flow plate 112 is installed in the valve cartridge 100, the coupling recess 174 is positioned within the opening 168 of the bushing 110 and surrounded by the raised annular portion 156 of the bushing 110 (see FIGS. 9B-9C).

The coupling recess 174 of the flow plate 112 receives the projection 142 of the ball-stem 104, thereby connecting the actuating mechanism (i.e., the ball-stem 104) and the flow plate 112. The projection 142 of the ball-stem 104 can have four sides that contact four corresponding sides of the coupling recess 174. The projection 142 of the ball-stem 104 does not contact a bottom surface of the coupling recess 174. It will be appreciated that notwithstanding the exemplary embodiments described herein, the ball-stem 104 can be connected to the flow plate 112 in any suitable manner that allows the ball-stem 104 to impart translational and angular movement to the flow plate 112.

As shown in FIGS. 6A-6D, the flow plate 112 is a valve member formed as a plate, disk or the like that is movable relative to the housing 102. The flow plate 112 includes the flat portion 166 and the raised portion 170. The flat portion 166 of the flow plate 112 forms a sealing surface that can cover and uncover water inlet apertures 176 and 178 in the manifold 114 to allow only cold water, only hot water or both cold and hot water to flow through the manifold 114. The water flowing through the water inlet apertures 176 and 178 in the manifold 114 enters the mixing chamber 172 (i.e., a cavity formed under the raised portion 170 of the flow plate 112) where the cold and hot water mixes prior to being discharged through a water outlet aperture 180 in the manifold 114. Furthermore, as noted above, the flow plate 112 also includes the coupling recess 174, which is formed on the raised portion 170 of the flow plate 112.

Figure 7:
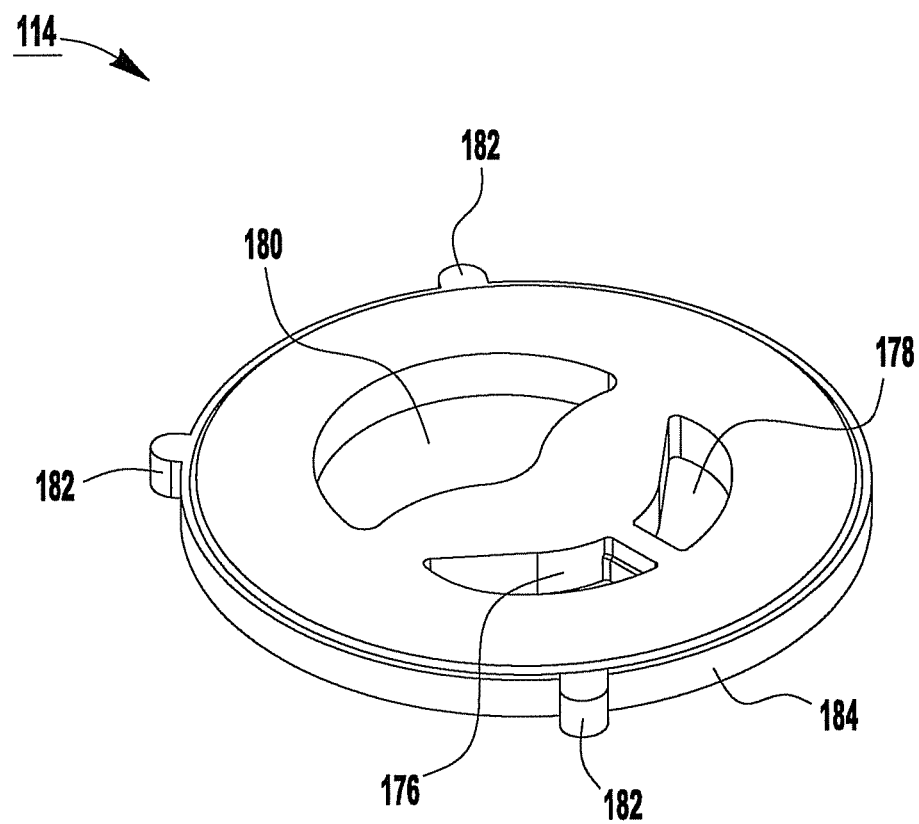
FIG. 7 is a perspective view of an exemplary manifold of the exemplary valve cartridge of FIG. 1.

As shown in FIG. 7, the manifold 114 is a valve member formed as a plate, disk or the like that is fixed relative to the housing 102. The manifold 114 includes one or more projections 182 formed on a periphery 184 of the manifold 114, wherein each of the projections 182 fits inside an internal cavity 186 of one of the keys 138 of the housing 102 (see FIG. 2). The projections 182 fix the manifold 114 relative to the housing 102, thereby preventing rotation of the manifold 114 within the housing 102.

The manifold 114 includes the water inlet apertures 176 and 178, which correspond to a cold water inlet aperture and a hot water inlet aperture, respectively. The manifold 114 also includes the water outlet aperture 180 through which cold water flowing through the cold water inlet aperture 176, hot water flowing through the hot water inlet aperture 178 or a mixture of the cold and hot water can flow to a water outlet passage (not shown) of the valve body 136.

Figure 8A:
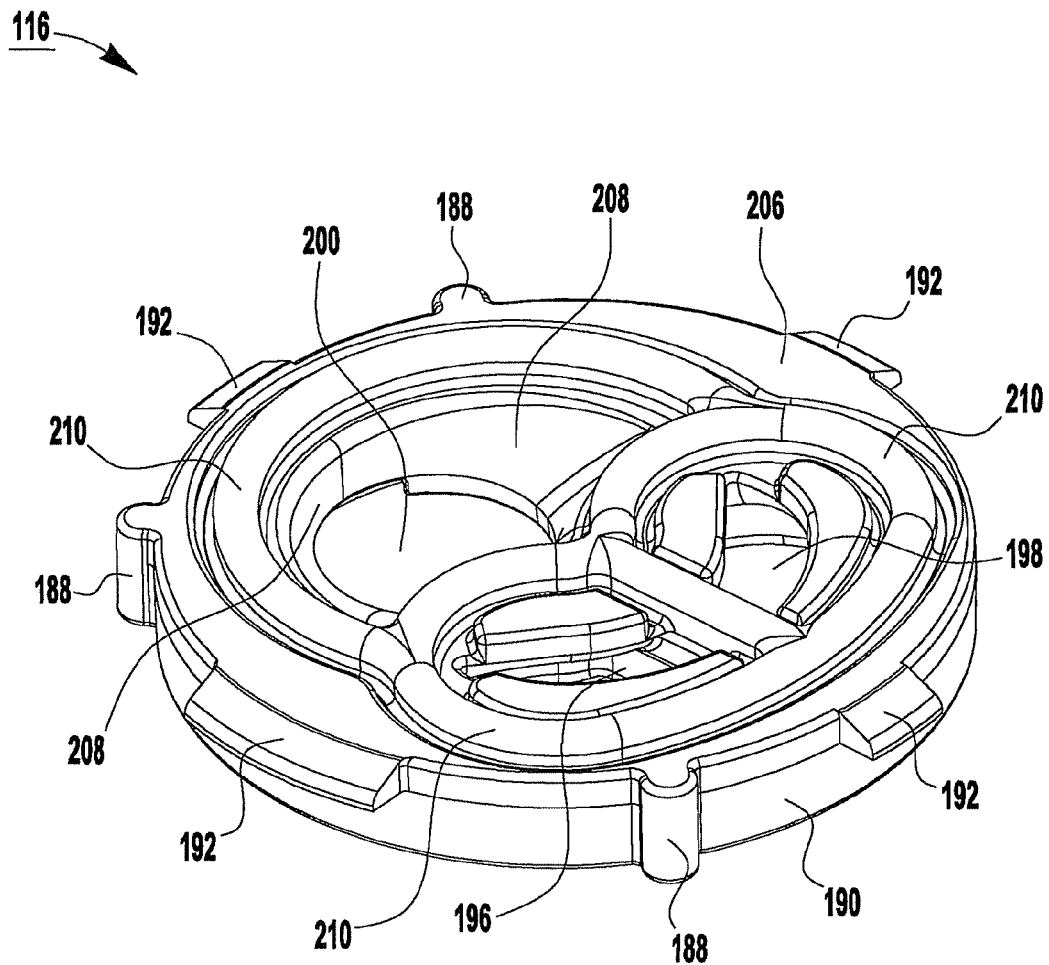
FIGS. 8A-8B show an exemplary base seal used in the exemplary valve cartridge of FIG. 1.
Figure 8B:
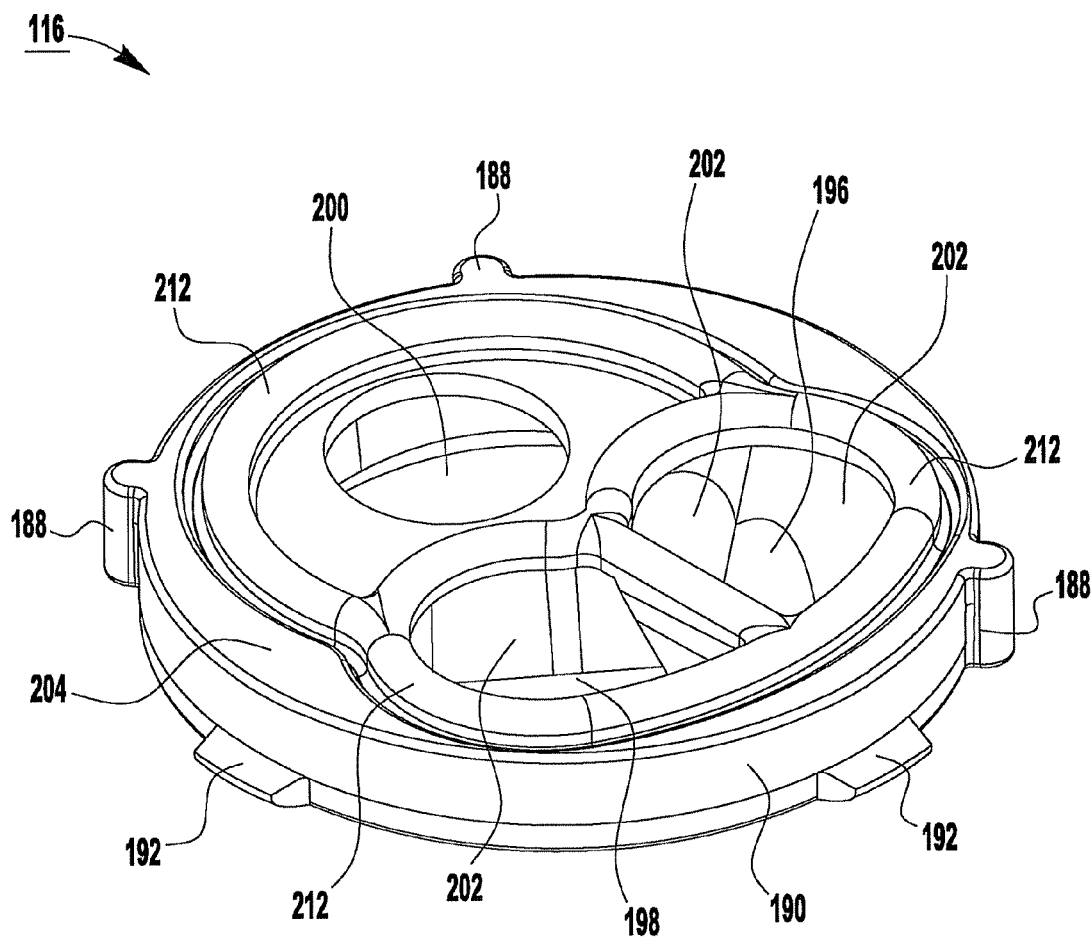

As shown in FIGS. 8A-8B, the base seal 116 is a sealing member formed of an elastic material (e.g., rubber). The base seal 116 includes one or more projections 188 formed on a periphery 190 of the base seal 116, wherein each of the projections 188 fits inside the internal cavity 186 of one of the keys 138 of the housing 102. The projections 188 fix the base seal 116 relative to the housing 102, thereby preventing rotation of the base seal 116 within the housing 102. The base seal 116 also includes one or more tabs 192 formed on the periphery 190 of the base seal 116, wherein the one or more tabs 192 are deformable to fit in and extend through a corresponding one or more openings 194 formed in the housing 102 to secure the base seal 116 in the housing 102. The one or more tabs 192 can have different sizes.

Like the manifold 114, the base seal 116 has a cold water inlet aperture 196, a hot water inlet aperture 198 and a water outlet aperture 200. The cold water inlet aperture 196 and the hot water inlet aperture 198 of the base seal 116 each have walls 202 that slope from near a lower surface 204 of the base seal 116 to near an upper surface 206 of the base seal 116 to improve the flow of water through the base seal 116 and into the valve cartridge 100. The water outlet aperture 200 of the base seal 116 has walls 208 that slope from near the upper surface 206 of the base seal 116 to near the lower surface 204 of the base seal 116 to improve the flow of water through the base seal 116 and out of the valve cartridge 100. It is important that the apertures 176, 178 and 180 in the manifold 114 are aligned with the apertures 196, 198 and 200 in the base seal 116 when the valve cartridge 100 is assembled. Accordingly, the projections 182 on the manifold 114 and the projections 188 on the base seal 116 insure that the manifold 114 and the base seal 116 fit into the housing 102 in only one orientation, wherein the apertures 176, 178 and 180 in the manifold 114 are aligned with the apertures 196, 198 and 200 in the base seal 116 in this orientation.

A ridge 210 surrounds the apertures 196, 198 and 200 in the base seal 116 on the upper surface 206 of the base seal 116 (see FIG. 8A). Similarly, a ridge 212 surrounds the apertures 196, 198 and 200 in the base seal 116 on the lower surface 204 of the base seal 116 (see FIG. 8B). The ridges 210 and 212 of the base seal 116 are compressed when the valve cartridge 100 is installed in the valve body 136 (see FIGS. 9B-9C and 10 which show the ridges 210 and 212 overlapped with the compressing structure for illustration purposes only). In particular, as the retention nut 134 is tightened down on the installation ledge 132 and/or the housing 102 above the installation ledge 132, the ridge 210 is compressed between the manifold 114 of the valve cartridge 100 and the base seal 116 while the ridge 212 is compressed between the base seal 116 and a seating surface 214 of the valve body 136 (see FIG. 10). It should be noted that although the projections 182 of the manifold 114 prevent the manifold 114 from rotating within the housing 102, the projections 182 nonetheless allow the manifold 114 to move axially within the housing 102. In this manner, the compression of the ridges 210 and 212 of the base seal 116 exerts a loading force on the flow plate 112 and the manifold 114. Accordingly, the flow plate 112 and the manifold 114 are kept in water-tight engagement with one another, after installation of the valve cartridge 100.

The position and the orientation of the flow plate 112 relative to the manifold 114 are controlled by the stem portion 124 of the ball-stem 104 projecting out of the housing 102 through the upper opening 122. For example, pivoting the stem portion 124 of the ball-stem 104 about a pivot (e.g., the pin 106) changes the position of the flow plate 112 relative to the manifold 114, which changes the flow rate of the water. Rotating the stem portion 124 of the ball-stem 104 changes the orientation of the flow plate 112 relative to the manifold 114, which changes the temperature of the water.

An operating member 216 such as a handle, knob or the like (see FIG. 10) can be connected to the stem portion 124 of the ball-stem 104 to facilitate manipulation of the stem portion 124 by the user. Accordingly, after the valve cartridge 100 is installed in the valve body 136, the user can manipulate the operating member 216 which moves the stem portion 124 of the ball-stem 104 to change the position and/or orientation of the flow plate 112 relative to the manifold 114, thereby controlling the flow rate and temperature of the water flowing through the valve cartridge 100 and out a plumbing fixture 218, such as through a spout (not shown) of the plumbing fixture 218 (see FIG. 10).

Pivoting of the stem portion 124 of the ball-stem 104 about the pin 106 can be limited by the stem portion 124 contacting opposing surfaces of the upper opening 122 of the housing 102. Thus, the stem portion 124 of the ball-stem 104 contacts a first surface 222 of the upper opening 122 of the housing 102 when the valve cartridge 100 is in a fully closed position corresponding to a flow rate of zero (see FIG. 9C). The stem portion 124 of the ball-stem 104 contacts a second surface 224 of the upper opening 122 of the housing 102 when the valve cartridge 100 is in a fully open position corresponding to a maximum flow rate. Rotation of the stem portion 124 of the ball-stem 104 can be limited by the distal ends of the pin 106 contacting end portions 226 of the slots 140 (see FIGS. 1-2 and 9A). Accordingly, the length of the slots 140, which function as temperature limit stops, define the range of temperatures for which the valve cartridge 100 can deliver the water.

The valve cartridge 100 has structural features that make an amount of force required to operate the valve cartridge 100 insensitive to a load applied to the valve cartridge 100 during installation of the valve cartridge 100 in the valve body 136. In an exemplary embodiment, the load applied to the valve cartridge 100 is directly related to an amount of torque applied to the retention nut 134 during installation of the valve cartridge 100 in the valve body 136.

In one exemplary embodiment, after an amount of torque is applied to the retention nut 134 to install the valve cartridge 100 in the valve body 136 in an operational state, an increased amount of torque will not increase the load applied to the valve cartridge 100 in the operational state. In one exemplary embodiment, the operational state refers to the valve cartridge 100 not leaking during use (i.e., from sufficient torque being applied to the valve cartridge 100 to compress its sealing member (e.g., the base seal 116) to prevent any leakage during operation of the valve cartridge 100). In another exemplary embodiment, the operational state refers to the flow plate 112 being readily movable relative to the manifold 114. In yet another exemplary embodiment, the operational state refers to a threshold load (e.g., a torque of 25 lbs-in.) that is applied to the valve cartridge 100. In still another exemplary embodiment, the operational state refers to a range of installation loads within which the valve cartridge 100 functions properly (e.g., a torque of 25-200 lbs-in., a torque of 45-65 lbs-in.).

One exemplary structural feature that contributes to the installation load insensitivity of the valve cartridge 100 is the spring 108. The spring 108 is connected to the second inner surface 148 of the housing 102 during assembly of the valve cartridge 100. In this manner, the spring 108 secures the ball-stem 104 in the housing 102 independently of the bushing 110, the flow plate 112, the manifold 114 and the base seal 116 being inserted in the housing 102. The spring 108 exerts an upward force (i.e., a preloading force) on the ball-stem 104.

As noted above, when the assembled valve cartridge 100 is installed in the valve body 136 by tightening the retention nut 134 down on the installation ledge 132 and/or the housing 102 above the installation ledge 132, the ridges 210 and 212 of the base seal 116 are compressed. This compression of the ridges 210 and 212 of the base seal 116 results in a loading force being transferred up through the components of the valve cartridge 100. However, because the spring 108 exerts the upward preloading force on the ball-stem 104, which is distinct from the loading force, and the projection 142 of the ball-stem 104 does not bottom out in the coupling recess 174 of the flow plate 112, the actuating mechanism (i.e., the ball-stem 104) is decoupled from the components of the valve cartridge 100 disposed below the spring 108 (e.g., the bushing 110, the flow plate 112, the manifold 114 and the base seal 116). Accordingly, the spring 108 isolates the ball-stem 104 from the loading force attributable to the compression of the ridges 210 and 212 of the base seal 116, such that the ball-stem 104 is influenced primarily by the preloading force of the spring 108 and not the load applied to the valve cartridge 100 during installation of the valve cartridge 100. As a result, the user realizes a consistent, precise and smooth feel during operation of the valve cartridge 100 over a wide range of installation loads (e.g., installation torques of 25-200 lbs-in.).

Another exemplary structural feature that contributes to the installation load insensitivity of the valve cartridge 100 is the integration of components within the valve cartridge 100. In particular, multiple components are integrated into unitary structures in the valve cartridge 100, thereby reducing the tolerances in the valve cartridge 100.

For example, the flow plate 112 combines a movable disk, a carrier and a mixing chamber into a single component. A carrier is a device that is connected to both an actuating mechanism and a movable disk in a conventional cartridge, wherein the carrier causes the movable disk to move in response to movement of the actuating mechanism. Because the mixing chamber is also integrated into the flow plate 112, a seal that would normally be disposed between the movable disk and the mixing chamber in the conventional cartridge can be omitted.

Furthermore, the base seal 116 combines a lower housing and a lower seal into a single component. A lower housing is often used to secure valve components, such as the disks, in the conventional cartridge. The lower housing connects to an upper housing to form a housing of the conventional cartridge. A discrete seal is disposed below the lower housing of the conventional cartridge. In the valve cartridge 100, however, the base seal 116 itself also functions as a lower housing in that it seals the lower opening 120 of the housing 102 of the valve cartridge 100 to secure the components of the valve cartridge 100 therein.

Based on these integrated components in the valve cartridge 100, the overall tolerances to be managed within the valve cartridge 100 are reduced. In particular, the loading force attributable to the compression of the base seal 116 substantially ends at the bushing 110 (because of the aforementioned spring 108 disposed in the housing 102) and is used primarily to keep the manifold 112 and the fixed disk 114 in water tight contact with one another. Accordingly, the base seal 116 can be formed to impart a sufficient loading force (upon compression) to the manifold 112 and the fixed disk 114 over a wide range of installation loads (e.g., installation torques of 25-200 lbs-in.). Furthermore, because the ball-stem 104 is decoupled from the manifold 112 and the fixed disk 114, as noted above, the compression of the base seal 116 will not adversely affect the amount of force required by the user to manipulate the ball-stem 104 during operation of the valve cartridge 100. As a result, the user realizes a consistent, precise and smooth feel during operation of the valve cartridge 100 over a wide range of installation loads (e.g., installation torques of 25-200 lbs-in.).

Still another exemplary structural feature that contributes to the installation torque insensitivity of the valve cartridge 100 is the location of the installation ledge 132. The installation ledge 132 is formed below the ball-stem 104 (see FIGS. 9B-9C and 10). Additionally, the installation ledge 132 is formed above that portion of the cavity 118 in the housing 102 that receives the flat annular portion 130 of the bushing 110, the flow plate 112, the manifold 114 and the base seal 116. When the retention nut 134 is tightened down on the installation ledge 132, the retention nut 134 engages the installation ledge 132 which forces the housing 102 toward the seating surface 214 of the valve body 136. Because the force of the retention nut 134 on the installation ledge 132 is located below (or near the bottom of) the ball-stem 104, operation of the ball-stem 104 is not directly affected by an increased torque applied to the retention nut 134 during installation of the valve cartridge 100. Furthermore, the ball-stem 104 is not indirectly affected by the increased torque applied to the retention nut 134 and the resulting compression of the base seal 116 because of the spring 108 described above.

Figure 10:
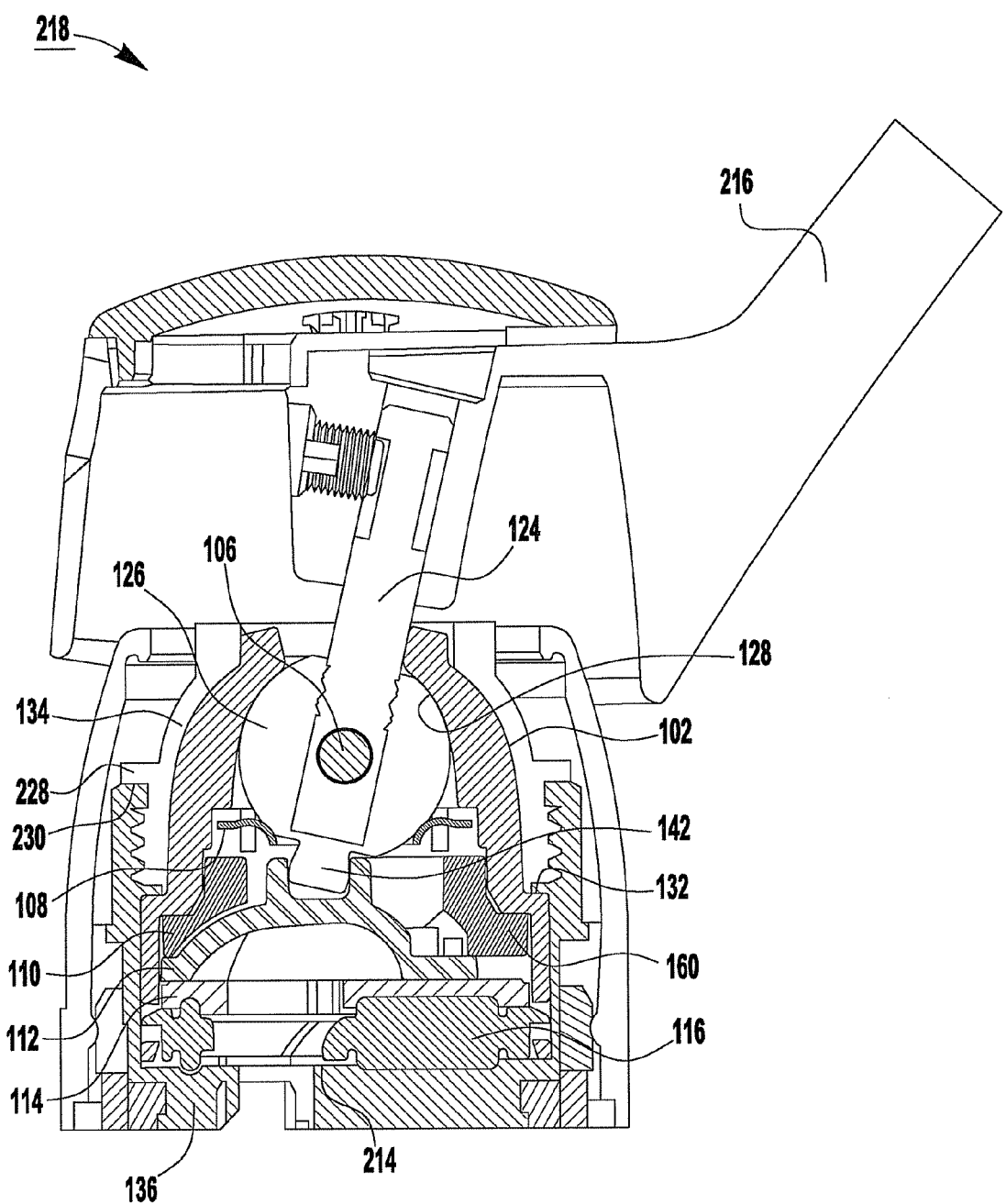
FIG. 10 is a mirror image of a cross-sectional view (along line B-B in FIG. 9A) of the exemplary valve cartridge of FIG. 1 after installation in a plumbing fixture.

Additionally, the installation ledge 132 is formed so that the retention nut 134 engaging the installation ledge 132 is substantially aligned with that portion of the housing 102 below the installation ledge 132 (see FIGS. 9B-9C and 10). For example, the width of the installation ledge 132 circumscribing the housing 102 is close in size to a width of the housing 102 below the installation ledge 132, such that the force of the retention nut 134 engaging the installation ledge 132 is substantially aligned with that portion of the housing 102 below the installation ledge 132. Consequently, the housing 102 is less likely to buckle or otherwise be deformed by an excessive amount of torque applied to the retention nut 134. Deformation of the housing 102 could affect the operation of the ball-stem 104 and could render the valve cartridge 100 inoperable. By preventing such deformation, the installation ledge 132 allows the ball-stem 104 to provide a consistent, precise and smooth feel during operation of the valve cartridge 100 over a wide range of installation loads (e.g., installation torques of 25-200 lbs-in.).

Similarly, another exemplary structural feature that prevents deformation or buckling of the housing 102 from an excessive amount of torque applied to the retention nut 134 (and the resulting installation load on the valve cartridge 100) is the rigidity of the housing 102. The housing 102 is made of a hard material such as a hard plastic or metal that resists deformation.

Another exemplary structural feature that increases the rigidity of the housing 102 and, thus, prevents deformation of the housing 102 from an excessive installation load on the valve cartridge 100 is the formation of one or more ribs on the housing 102. The ribs increase the structural strength of the housing 102, thereby preventing deformation of the housing 102. In one exemplary embodiment, the one or more keys 138 function as the ribs. As noted above, the keys 138 can have a lobular shape. The keys 138 are formed integrally with the housing 102. In one exemplary embodiment, the keys 138 extend from near the lower opening 120 of the housing 102 to the installation ledge 132 of the housing 102.

In one exemplary embodiment, the height of the keys 138 is between 0.368 and 0.378 inches. In another exemplary embodiment, the height of the keys 138 is 0.373 inches. In still another exemplary embodiment, the height of the keys 138 is between 0.486 and 0.494 inches. In yet another exemplary embodiment, the height of the keys 138 is 0.490 inches.

In one exemplary embodiment, three keys 138 are formed around a circumference of the housing 102. The keys 138 can be evenly spaced around a circumference of the housing 102. Alternatively, the keys 138 can be unevenly spaced around the circumference of the housing 102.

Because of the rigidity of the housing 102 (e.g., due to the keys 138 acting as ribs), the housing 102 can resist deformation over a wide range of installation loads applied to the valve cartridge 100, which allows the ball-stem 104 to provide a consistent, precise and smooth feel during operation of the valve cartridge 100.

Still another exemplary structural feature that prevents deformation of the housing 102 from an excessive amount of torque applied to the retention nut 134 is structure on the retention nut 134 and/or the valve body 136 that prevents the excessive torque from being transferred to the valve cartridge 100 where it would otherwise result in an excessive load on the valve cartridge 100. For example, the retention nut 134 includes an annular flange 228 that bottoms out on a surface 230 of the valve body 136 to prevent excessive tightening of the retention nut 134 (see FIG. 10). Accordingly, the annular flange 228 functions to limit the maximum amount of torque that can be transferred from the retention nut 134 to the housing 102 of the valve cartridge 100. By preventing an excessive amount of torque from being transferred from the retention nut 134 to the housing 102, the annular flange 228 prevents deformation of the housing 102, which allows the ball-stem 104 to provide a consistent, precise and smooth feel during operation of the valve cartridge 100.

Figure 24:
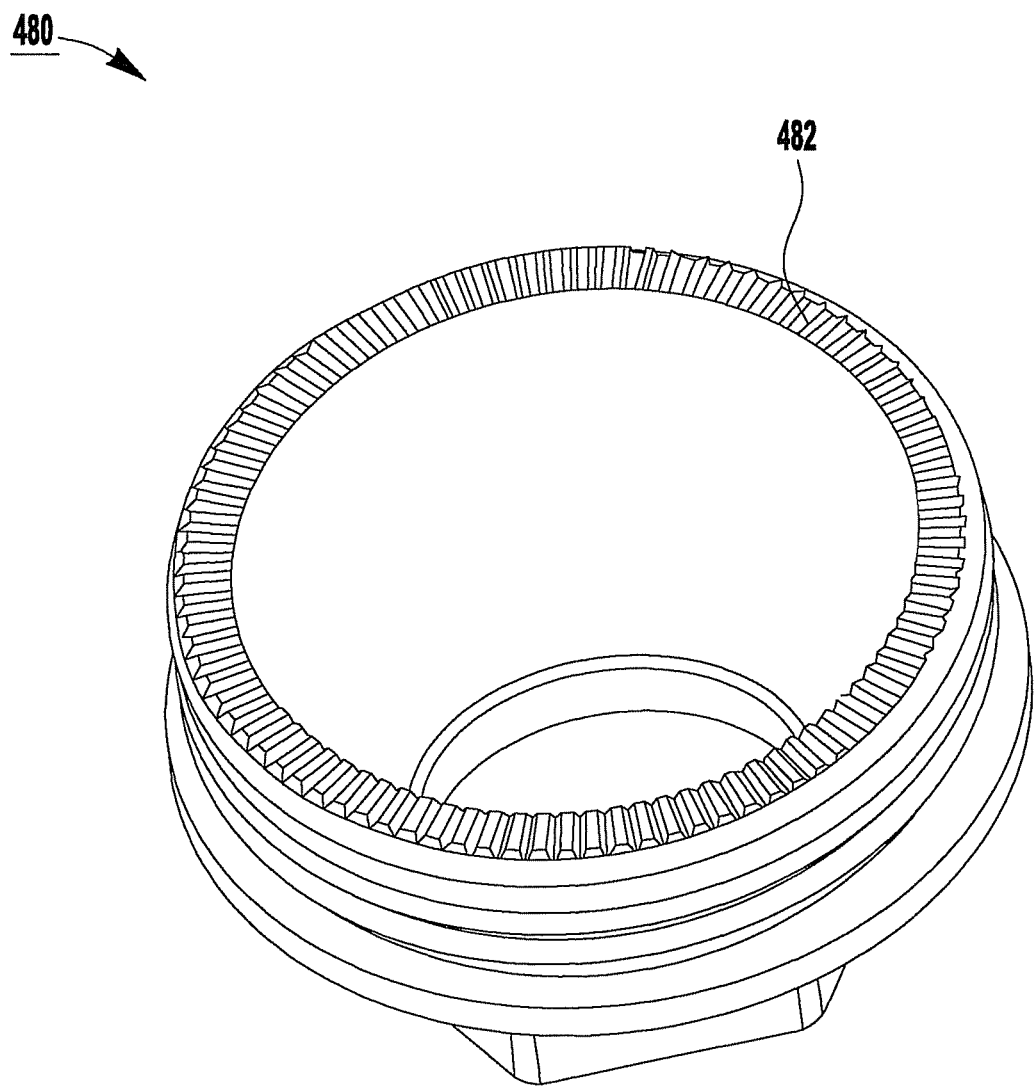
FIG. 24 shows an exemplary retention nut that can be used to secure a valve cartridge in a valve body.
Figure 25:
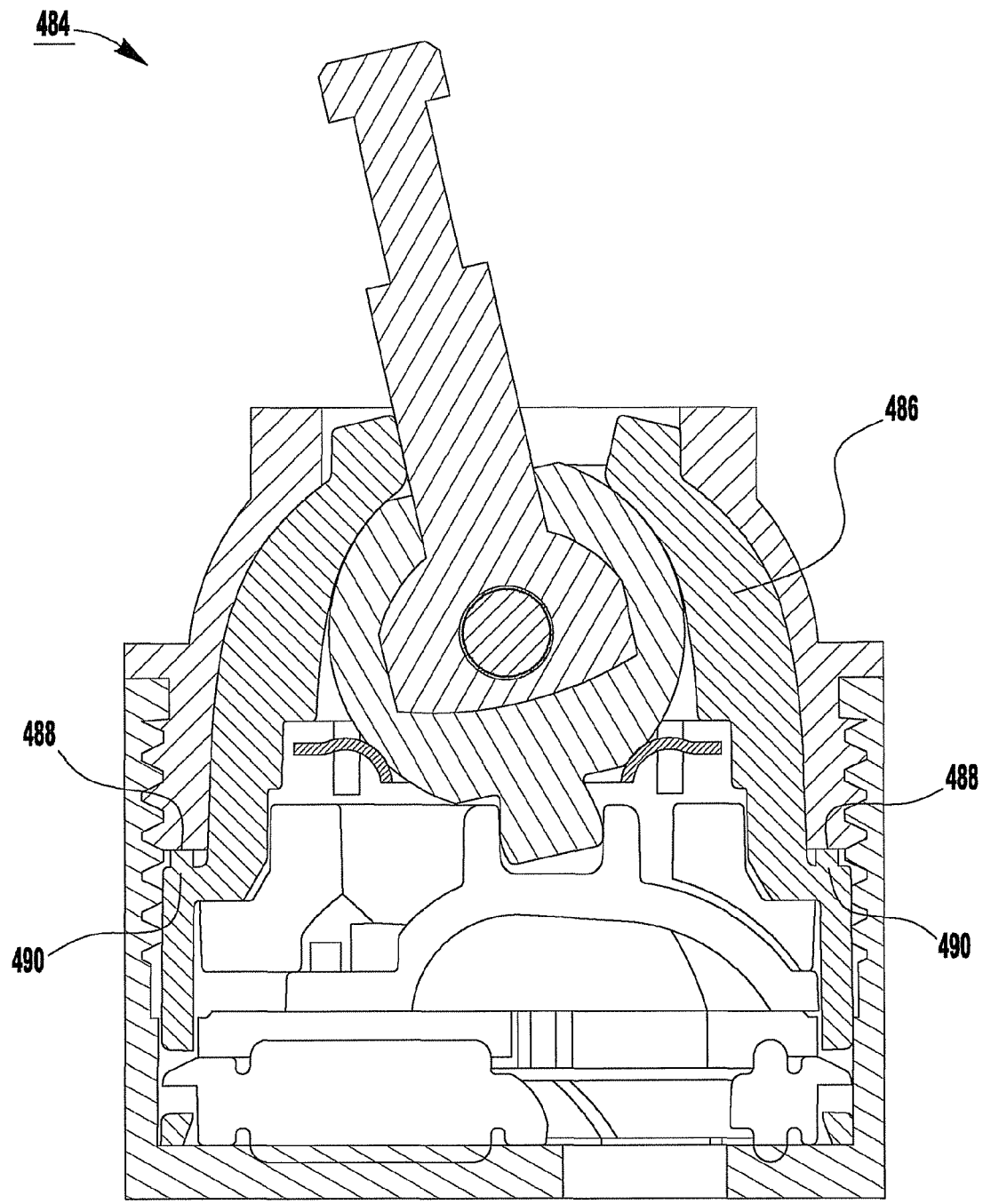
FIG. 25 shows the retention nut of FIG. 24 securing a valve cartridge in a valve body.

Yet another exemplary structural feature that may contribute to the installation load insensitivity of the valve cartridge 100 is the formation of serrations on the lower portion of the retention nut 134 that faces the installation ledge 132 of the housing 102. For example, a retention nut 480 shown in FIG. 24 has serrations 482 formed on its lower portion. Additionally, a raised ridge of material is formed or otherwise disposed on the installation ledge 132 of the housing 102. For example, a valve cartridge 484 shown in FIG. 25 includes a housing 486 with a raised ridge 488 of material formed on its installation ledge 490. Accordingly, as the retention nut 480 is rotated during installation of the valve cartridge 484 in a valve body (e.g., the valve body 136), the serrations 482 on the retention nut 480 cut the raised ridge 488 of material on the installation ledge 490 of the housing 486. In this manner, the serrations 482 and the raised ridge 488 allow manufacturing tolerances of the components (e.g., the valve cartridge 100, the retention nut 134 and the valve body 136) to be absorbed, thereby insuring the retention nut 480 properly engages the valve cartridge 484 during installation. Alternatively, the serrations 482 could be formed on the installation ledge 490 of the housing 486, while the raised ridge 488 of material could be formed on the lower portion of the retention nut 480.

Another exemplary structural feature that contributes to the installation load insensitivity of the valve cartridge 100 is a low friction coating applied to the flow plate 112 and/or the manifold 114. For example, a diamond-like carbon coating is applied to a side of the flow plate 112 facing the manifold 114 and/or a side of the manifold 114 facing the flow plate 112. Because the ball-stem 104 is decoupled from the dynamic sealing elements (e.g., the flow plate 112 and the manifold 114) by the spring 108, as noted above, the frictional force between the flow plate 112 and the manifold 114 can be small without resulting in the handle drop problem discussed above. Accordingly, use of the low friction coating does not result in a weight of the operating member 216 overcoming the frictional force between the flow plate 112 and the manifold 114, such that the operating member 216 resists any unintentional change in position.

As an increased amount of torque is applied to the retention nut 134 during installation of the valve cartridge 100 in the valve body 136, the base seal 116 is subjected to increased compression. As a result, the flow plate 112 and the manifold 114 are pressed tightly together. The low friction coating, however, facilitates the flow plate 112 moving relative to the manifold 114 over a wide range of installation loads (e.g., installation torques of 25-200 lbs-in.). Accordingly, when an excessive amount of torque is applied to the retention nut 134, the user can readily move the operating member 216 (and, thus, the ball-stem 104) to control the operation of the valve cartridge 100. Thus, the user experiences a consistent, precise and smooth feel during operation of the valve cartridge 100.

The above exemplary structural features, whether alone, in combination or in various subcombinations, contribute to the installation load insensitivity of the valve cartridge 100. Consequently, the amount of force required to operate the valve cartridge 100 is relatively insensitive to (i.e., varies little with respect to) the load applied to the valve cartridge 100 during installation of the valve cartridge 100 in the valve body 136. Thus, the valve cartridge 100 operates properly over a wide range of installation loads. Furthermore, the user realizes a consistent, precise and smooth feel during operation of the valve cartridge 100 over a wide range of installation loads.

Because operation of the valve cartridge 100 is relatively insensitive to an installation load, the valve cartridge 100 can be more readily installed in the valve body 136 without using a specialized tool or mechanism, such as a torque wrench.

A one-handle valve cartridge 300, according to another exemplary embodiment, has structure that makes operation of the valve cartridge 300 insensitive to an installation load on the valve cartridge 300. Accordingly, as a larger installation load is applied to the valve cartridge 300 during installation of the valve cartridge 300, there is little or no change in the force (e.g., torque) required to operate the valve cartridge 300.

Figure 11:
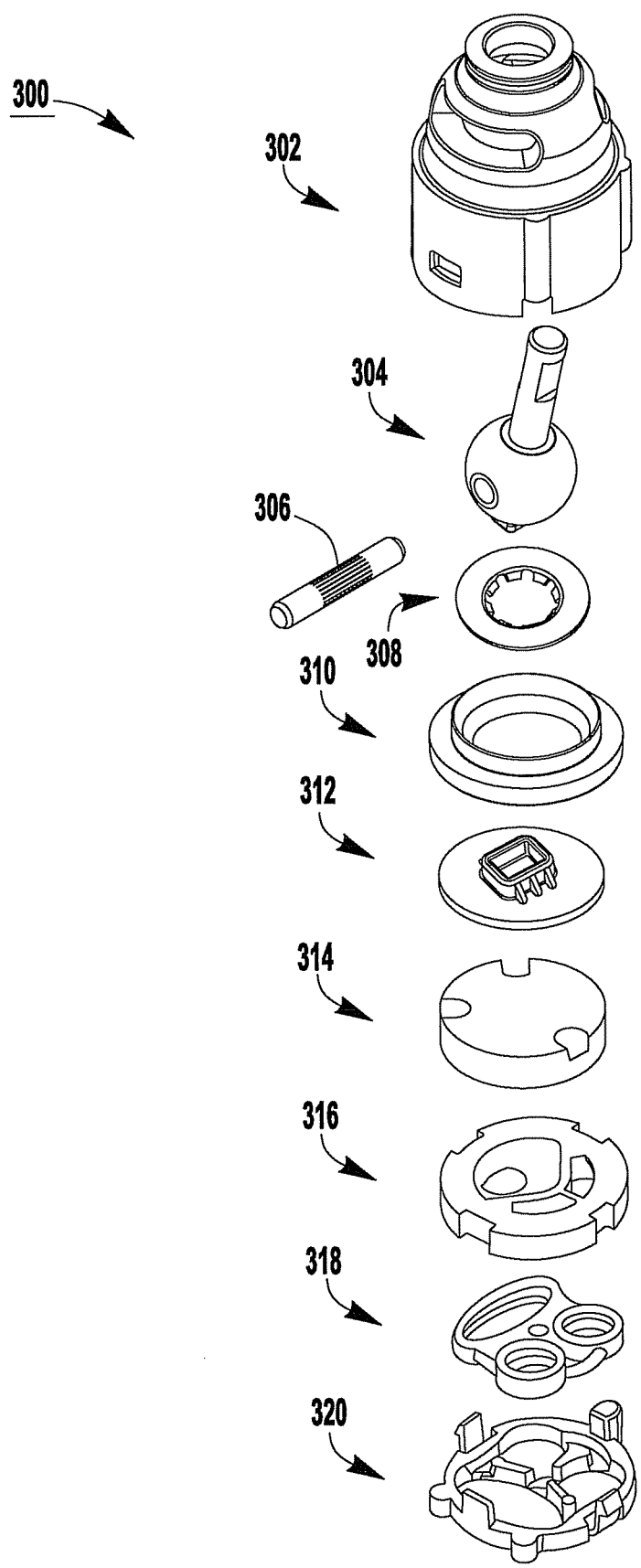
FIG. 11 is a perspective exploded view of a valve cartridge, according to another exemplary embodiment.
Figure 21A:
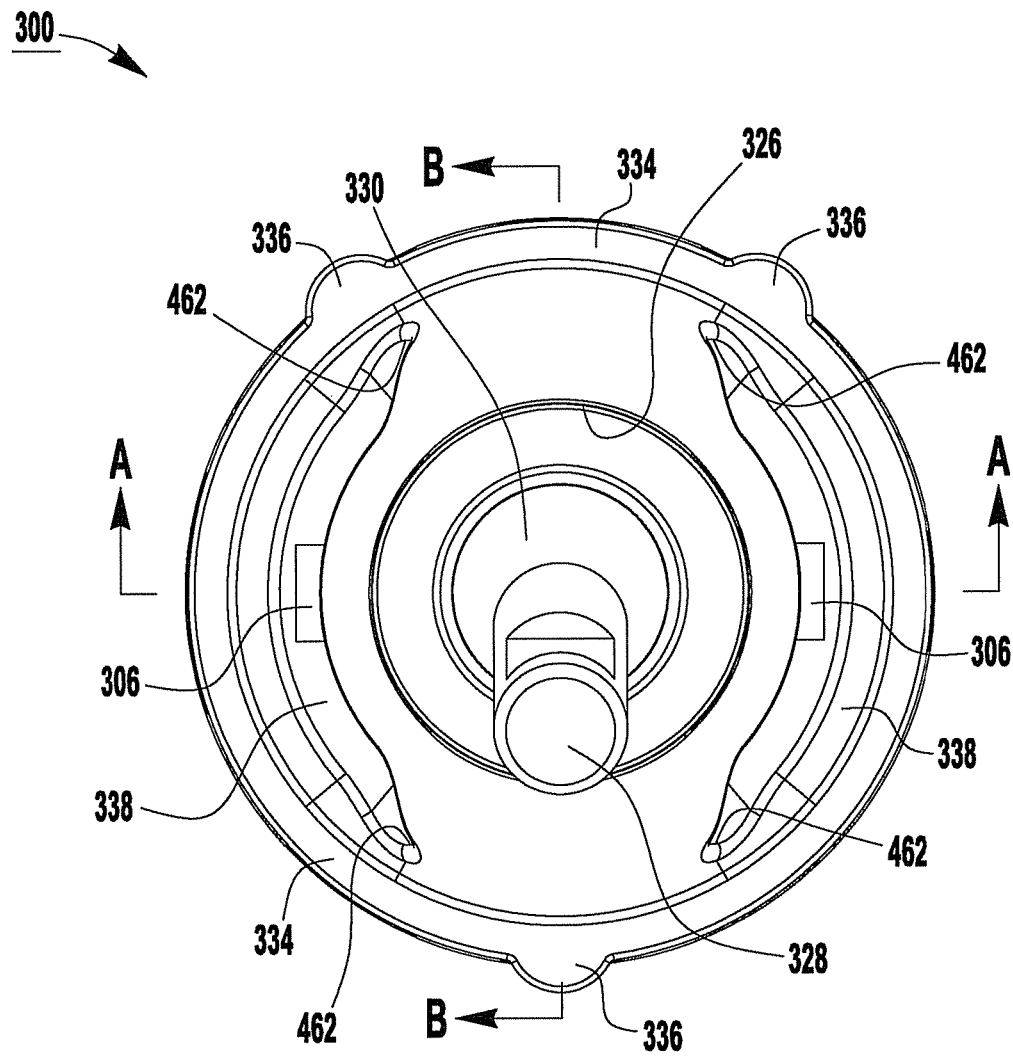
FIGS. 21A-21C show the exemplary valve cartridge of FIG. 11 in assembled form.
Figure 21B:
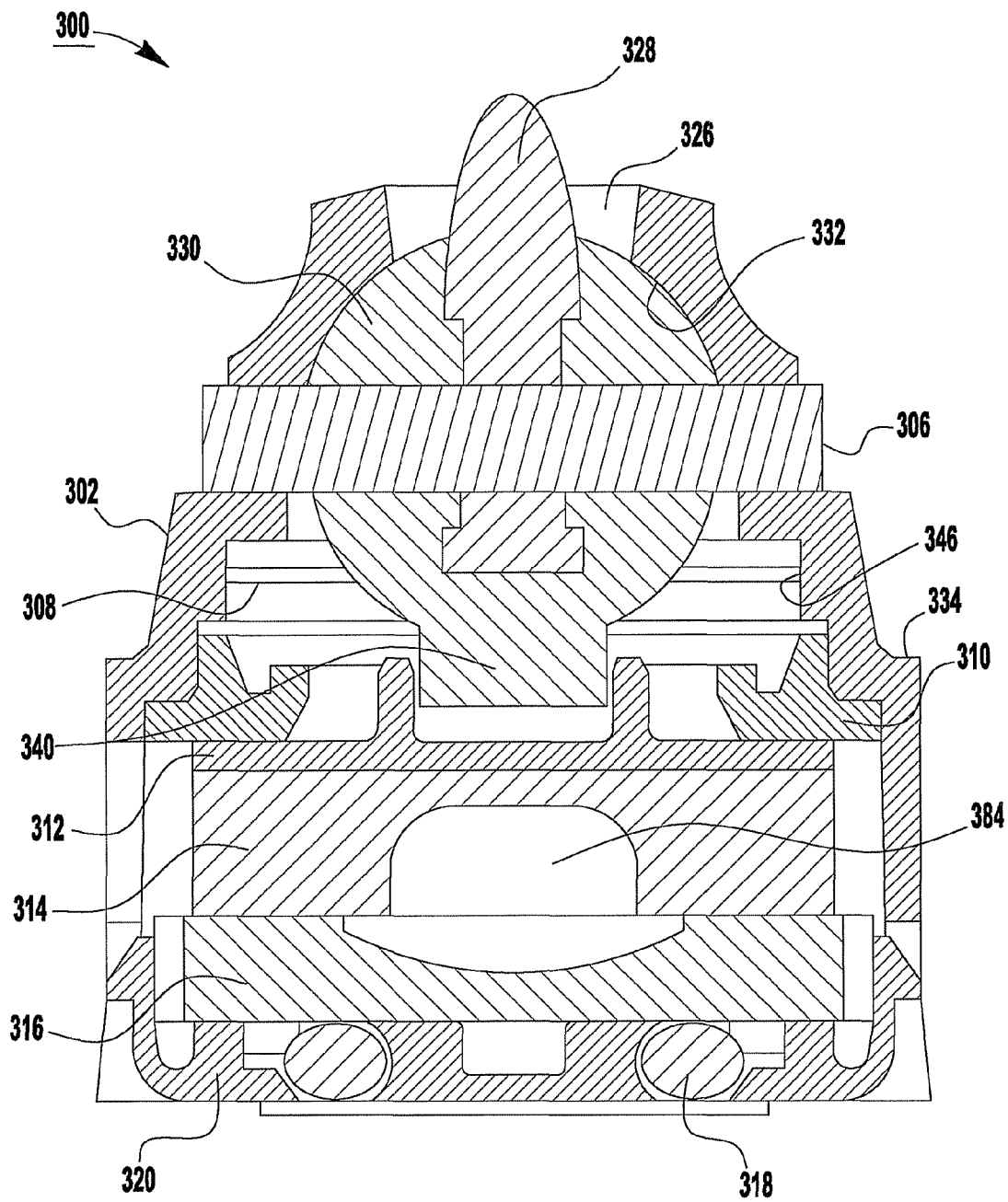
Figure 21C:
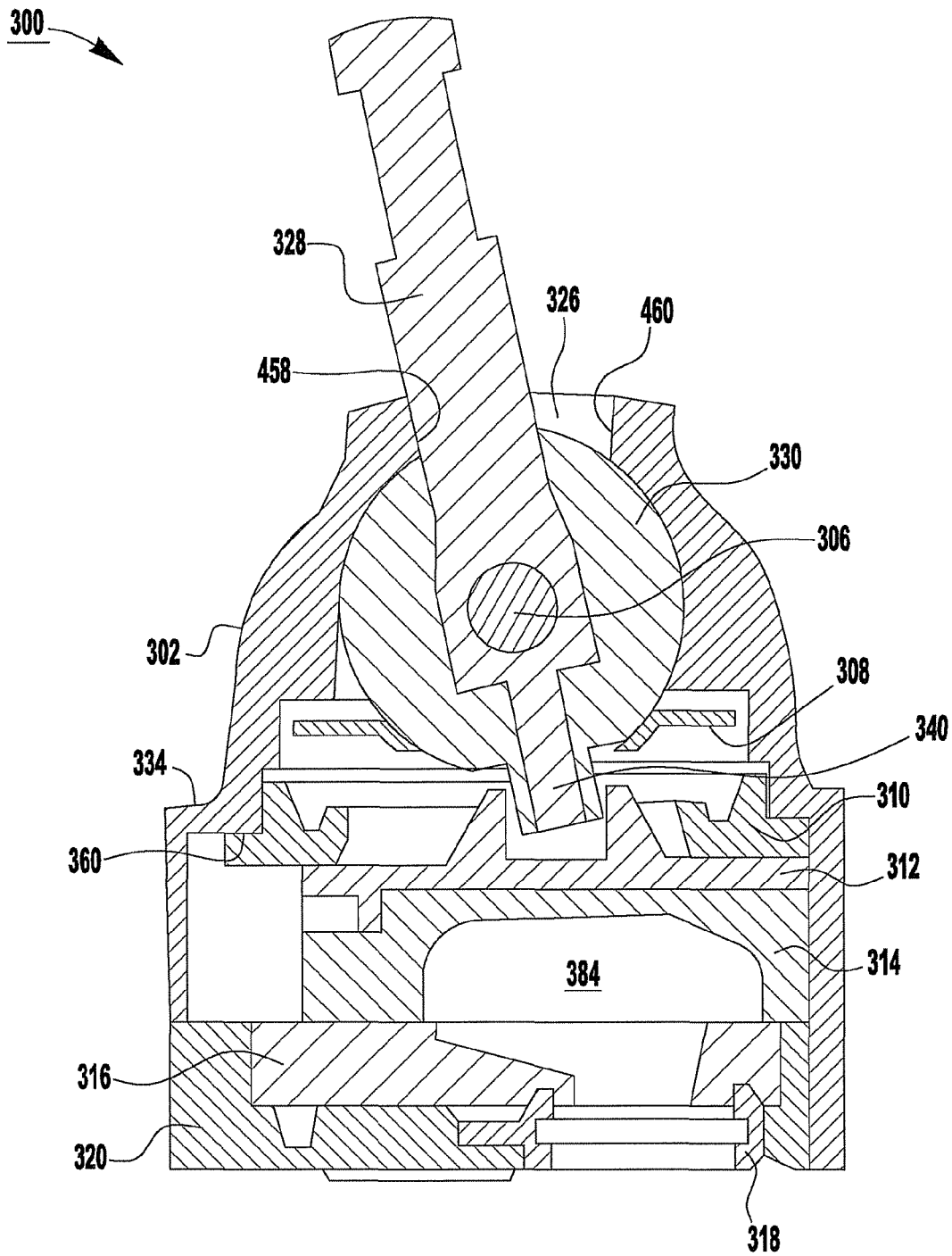

As shown in FIGS. 11 and 21B-21C, the exemplary valve cartridge 300 has several discrete components including an upper housing 302, a ball-stern 304, a pin 306, a spring 308, a bushing 310, a carrier 312, a movable disk 314, a fixed disk 316, a base seal 318 and a lower housing 320. The movable disk 314 and/or the fixed disk 316 can be made of a hard material. For example, the movable disk 314 and/or the fixed disk 316 can be made of ceramic. The upper housing 302, for example, can be made of plastic or metal.

Figure 12A:
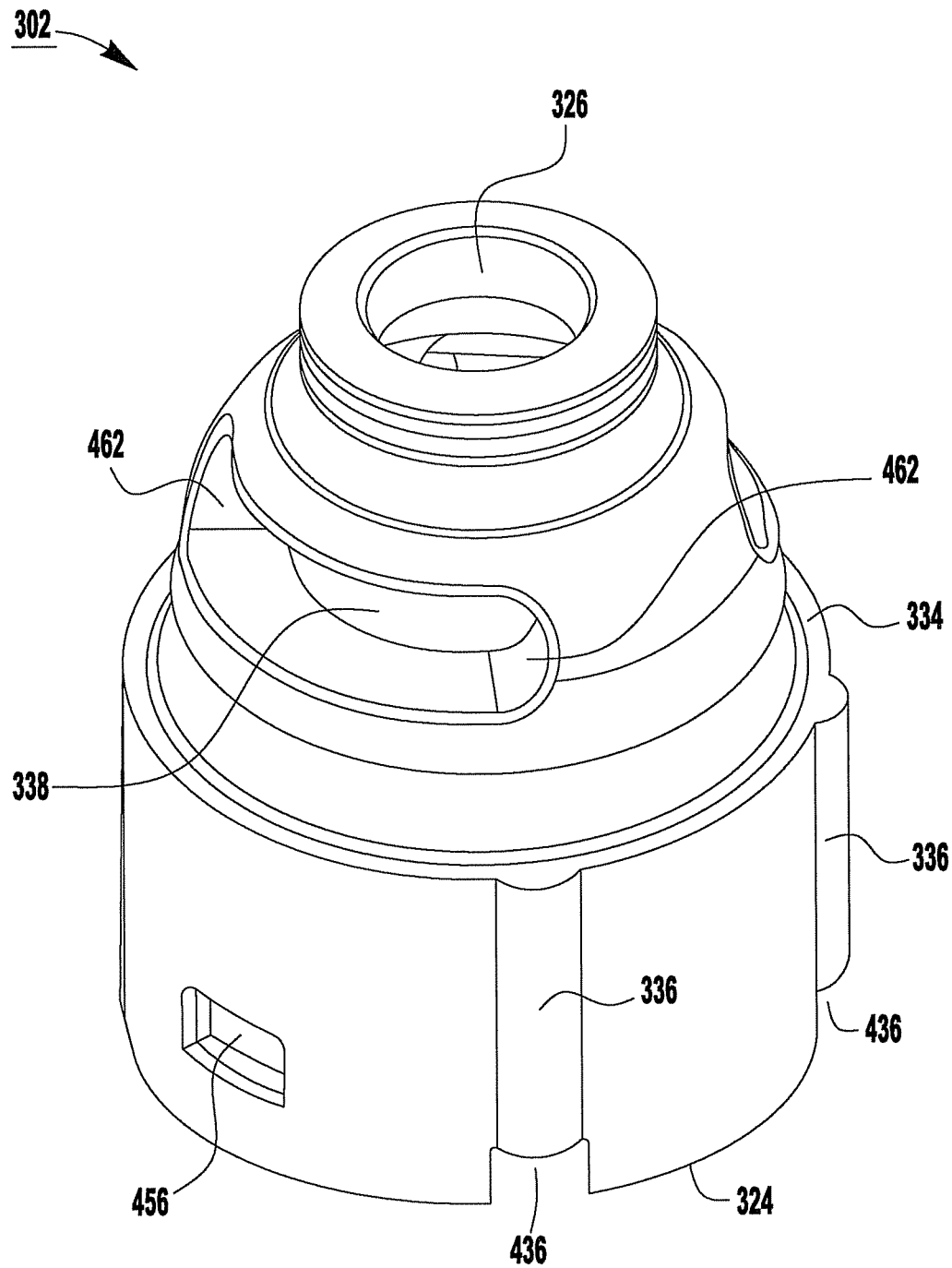
FIGS. 12A-12C show an exemplary upper housing used in the exemplary valve cartridge of FIG. 11.
Figure 12B:
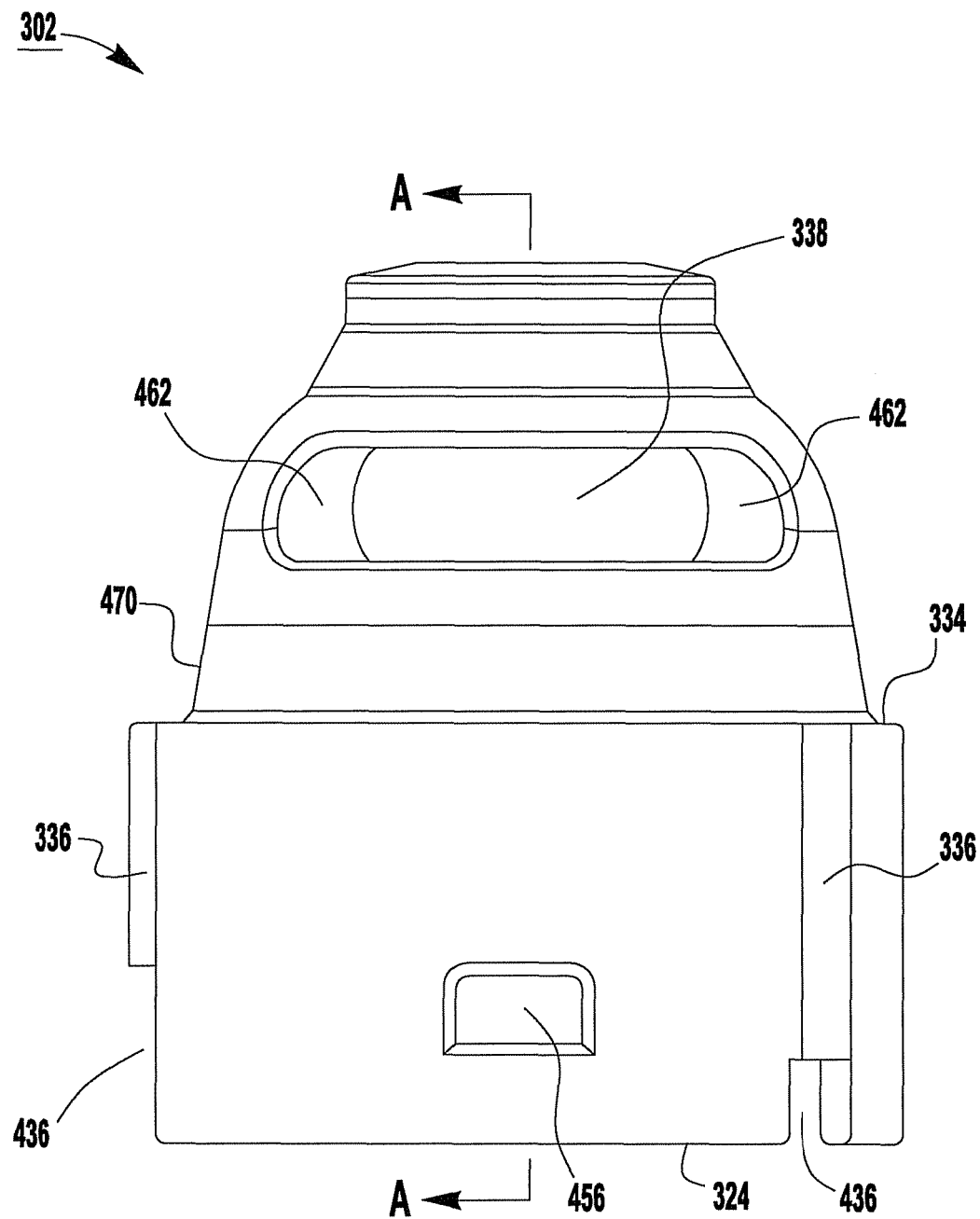
Figure 12C:
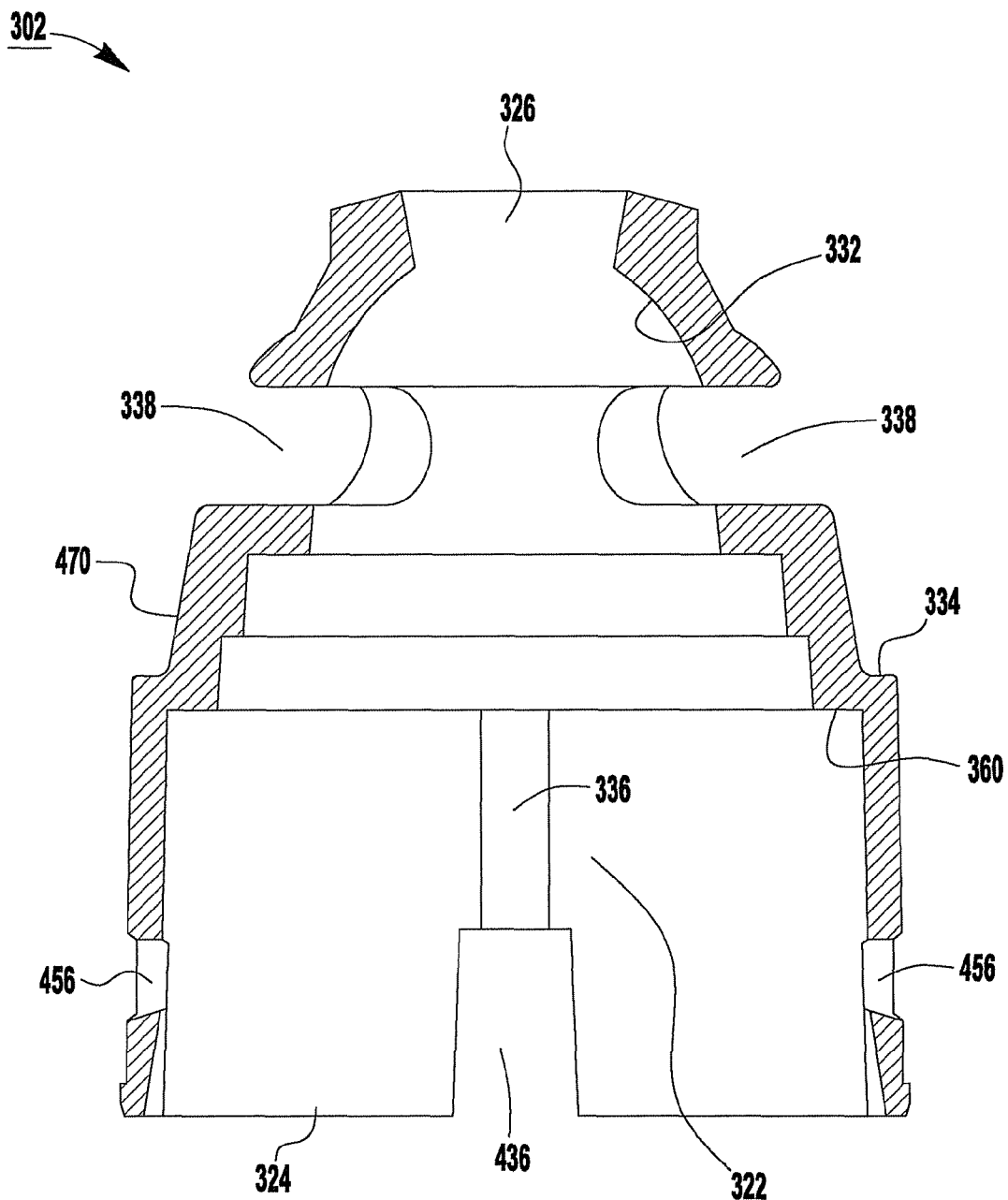

As shown in FIGS. 12A-12C, the upper housing 302 has a cavity 322 formed therein for receiving the remaining components of the valve cartridge 300. The upper housing 302 includes a lower opening 324 through which the components can be inserted into the upper housing 302. The upper housing 302 also includes an upper opening 326 through which a stem portion 328 of the ball-stem 304 extends. The cavity 322 in the upper housing 302 is wider near the lower opening 324 than near the upper opening 326. A portion of the cavity 322 near the upper opening 326 of the upper housing 302 receives a ball portion 330 of the ball-stem 304. Accordingly, a first inner surface 332 of the portion of the cavity 322 near the upper opening 326 has a shape that substantially conforms to a shape of the ball portion 330 of the ball-stem 304 (see FIGS. 12C and 21B).

A portion of the cavity 322 near the lower opening 324 of the upper housing 302 receives the bushing 310, the carrier 312, the movable disk 314, the fixed disk 316 and the base seal 318 (see FIGS. 21B-21C). Furthermore, as described below, the lower housing 320 interfaces with the upper housing 302 to retain these components in the cavity 322 of the upper housing 302 (see FIGS. 21B-21C).

Figure 23:
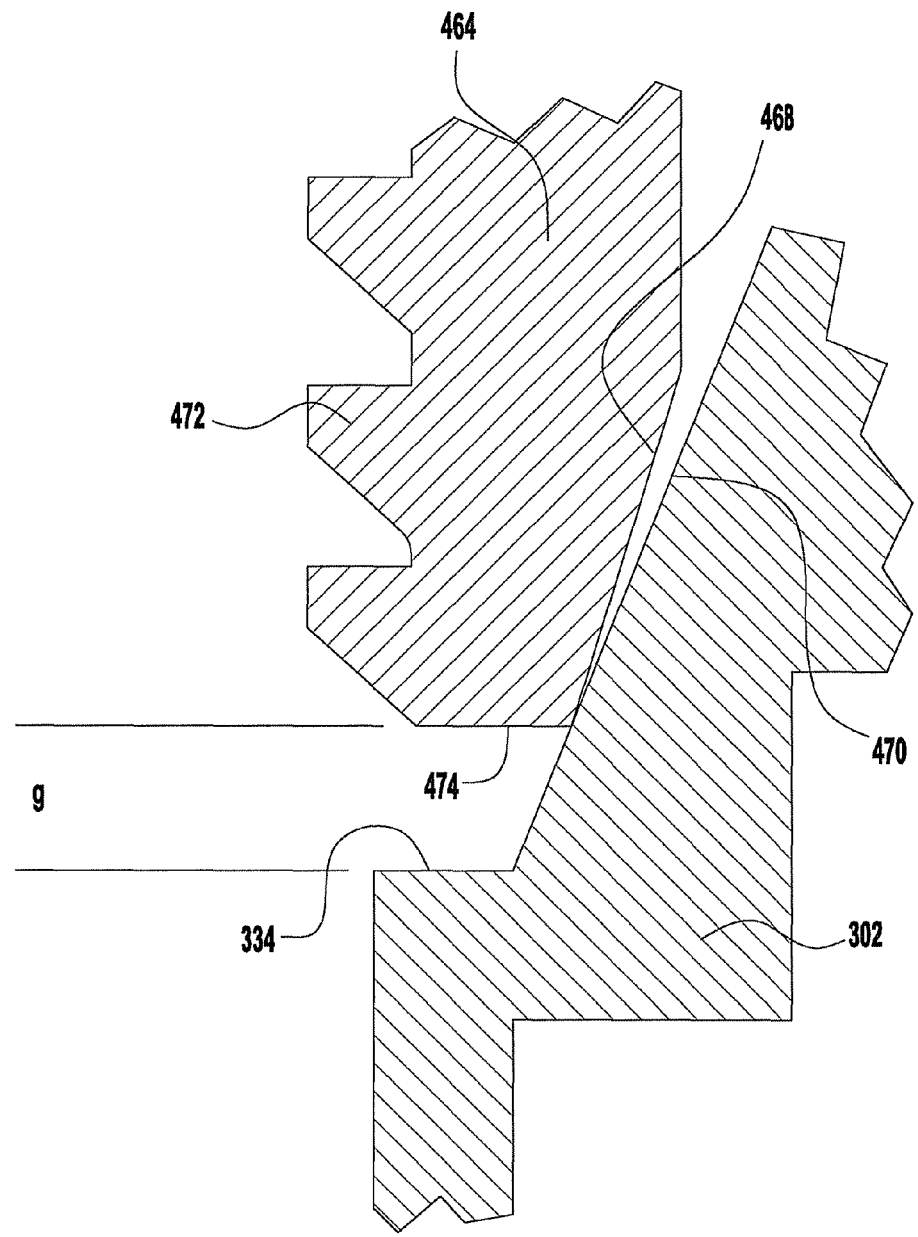
FIG. 23 is a sketch showing the exemplary retention nut of FIGS. 22A-22C engaging the exemplary valve cartridge of FIG. 11.

The portion of the cavity 322 near the lower opening 324 of the upper housing 302 forms an installation ledge 334 on an outer surface of the upper housing 302 (see FIGS. 12A-12C and 21A-21C). In one exemplary embodiment, a retention nut 464 engages the upper housing 302 above the installation ledge 334, as illustrated in FIG. 23, to secure the valve cartridge 300 in a valve body (e.g., the valve body 136 shown in FIG. 10). Furthermore, the upper housing 302 has one or more keys 336 that each engage a complementary-shaped recess in the valve body to prevent rotation of the upper housing 302 relative to the valve body after the valve cartridge 300 is installed. The one or more keys 336 can have a lobular shape. The upper housing 302 also includes a pair of slots 338 formed on opposing sides of the upper housing 302 that interface with distal ends of the pin 306 to function as temperature-limit stops, as described below.

Figure 13:
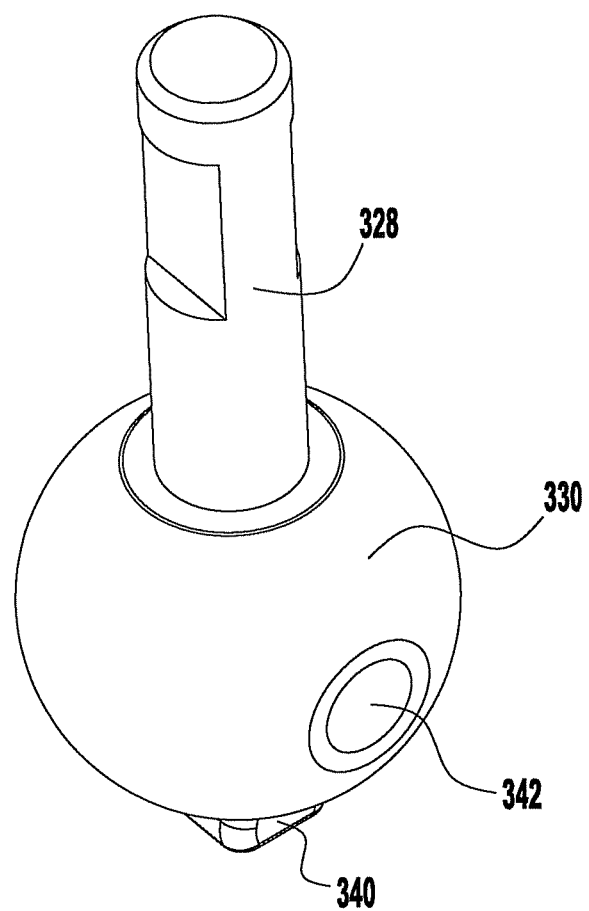
FIG. 13 is a perspective view of an exemplary ball-stem of the exemplary valve cartridge of FIG. 11.

As shown in FIG. 13, the ball-stem 304 is the actuating mechanism for the valve cartridge 300. The ball-stem 304 includes the ball portion 330 and the stem portion 328. The ball portion 330 and the stem portion 328 can be discrete components or can be formed integrally. The ball portion 330 includes a projection 340 extending from a side of the ball portion 330 that is opposite a side of the ball portion 330 from which the stem portion 328 extends. The projection 340 acts as a coupling device for connecting the ball-stem 304 to the carrier 312, as described below. The ball portion 330 and the projection 340 can be discrete components or can be formed integrally.

A bore 342 is formed through a center of the ball portion 330 of the ball-stem 304. The bore 342 is orthogonal to the stem portion 328 of the ball-stem 304. After the ball-stem 304 is inserted into the cavity 322 of the upper housing 302, the pin 306 can be inserted through one of the slots 338 in the upper housing 302 and into the bore 342 of the ball-stem 304. In this manner, the pin 306 retains the ball-stem 304 in the upper housing 302.

Figure 14A:
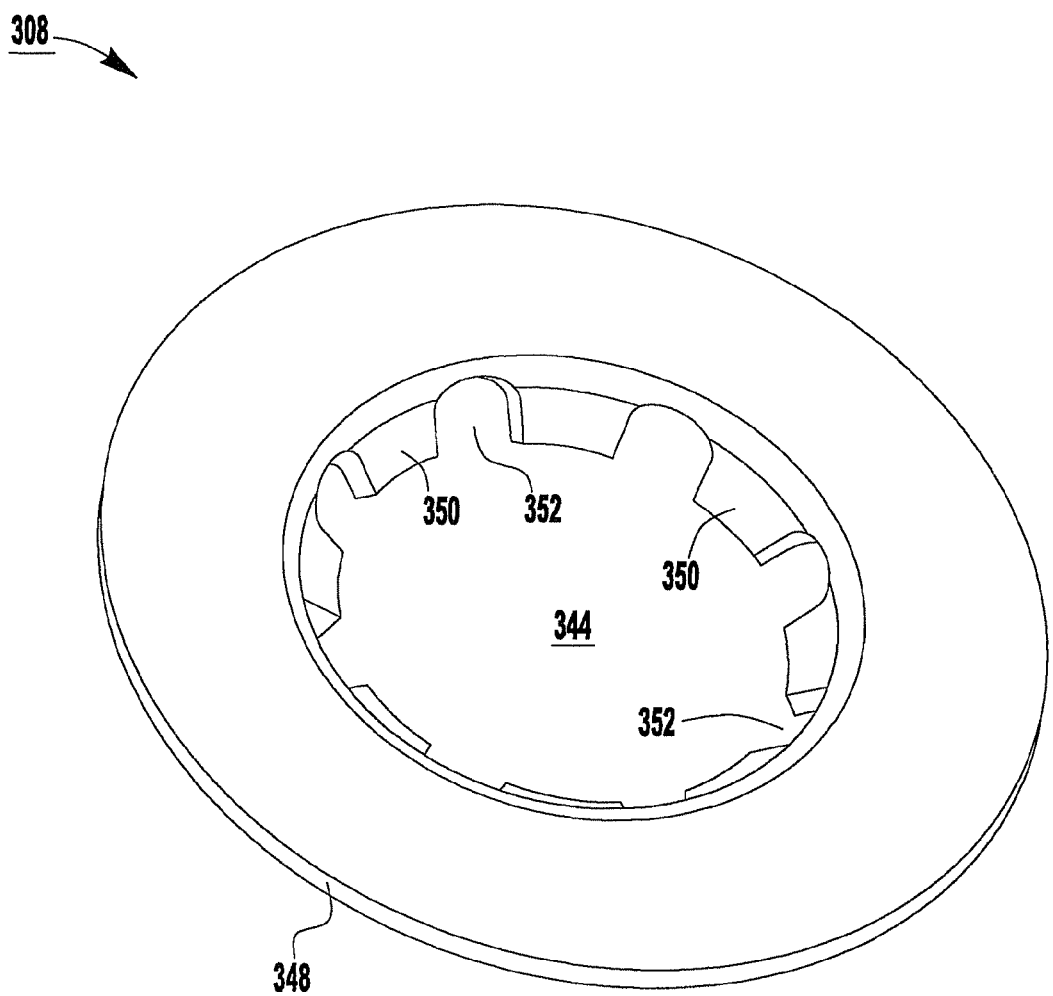
FIGS. 14A-14C show an exemplary spring used in the exemplary valve cartridge of FIG. 11.
Figure 14B:
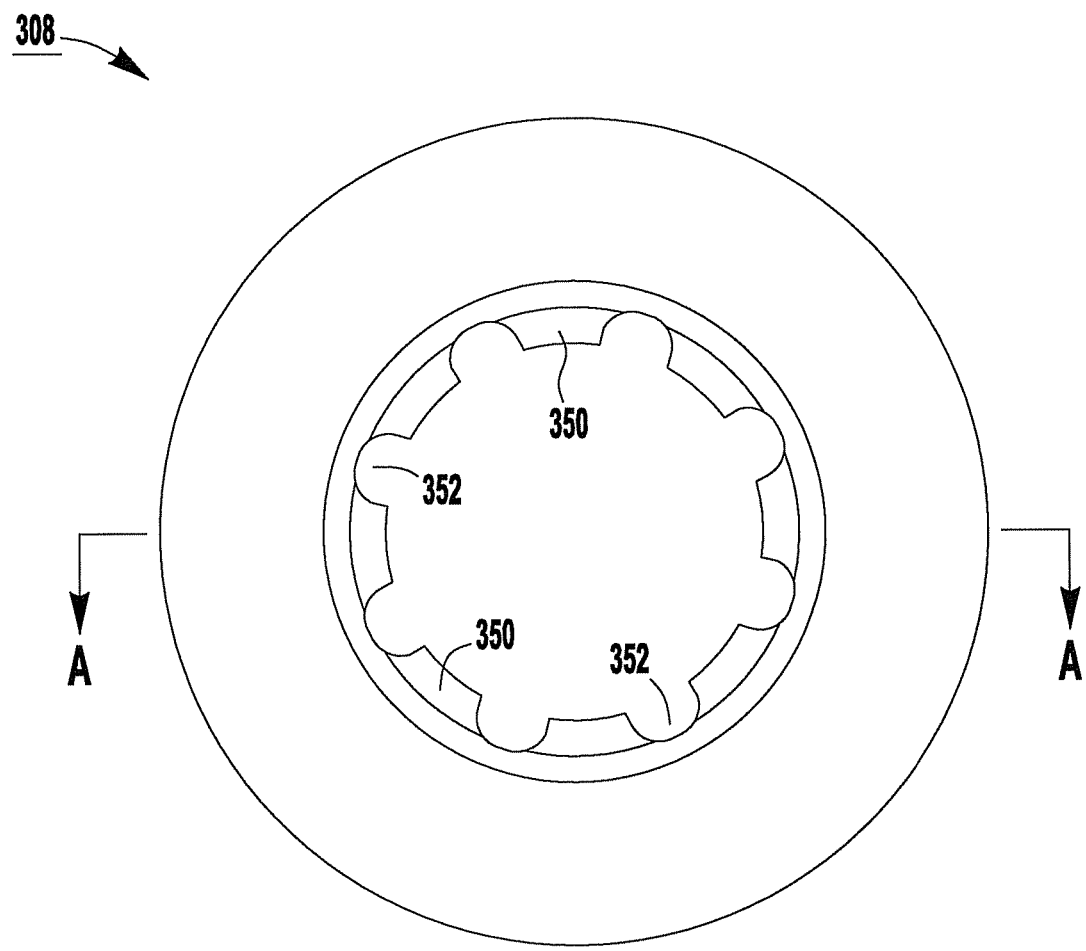
Figure 14C:
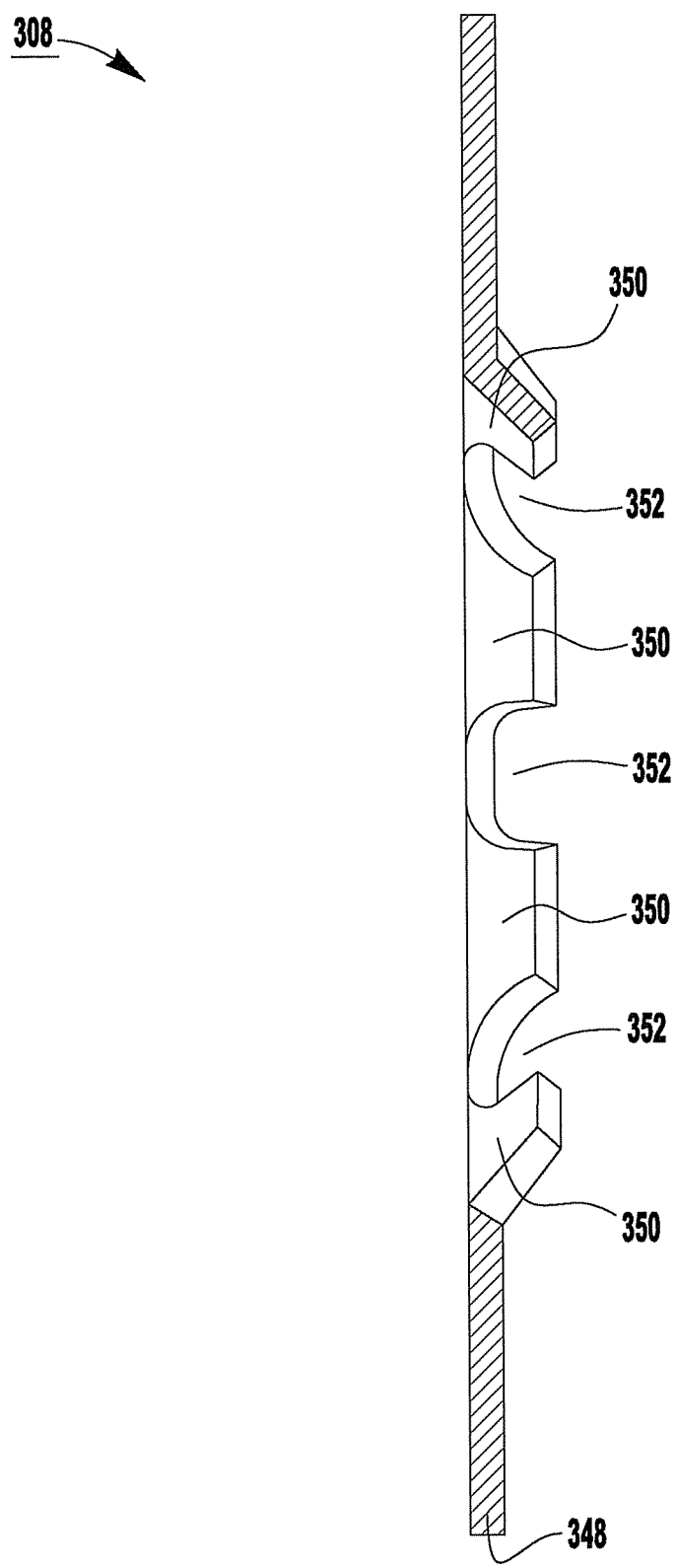

As shown in FIGS. 14A-14C, the spring 308 has an annular shape with a central opening 344. The spring 308 is disposed below the ball portion 330 of the ball-stem 304 in the upper housing 302 (see FIGS. 21B-21C). The spring 308 is connected to a second inner surface 346 of the upper housing 302 (e.g., by or though threading, friction fitting, welding), such that the spring 308 also retains the ball-stem 304 in the upper housing 302 (see FIGS. 12C and 21B). In one exemplary embodiment, at least a portion of an outer periphery 348 of the spring 308 is welded to the second inner surface 346 of the upper housing 302.

The projection 340 of the ball-stem 304 extends through the central opening 344 in the spring 308. Some of the ball portion 330 of the ball-stem 304 can also extend through the central opening 344 in the spring 308. The spring 308 includes a plurality of elastic flanges 350 surrounding the central opening 344. The elastic flanges 350 are spaced apart from one another such that gaps 352 are formed between the elastic flanges 350. The elastic flanges 350 of the spring 308 contact the ball portion 330 of the ball-stem 304 and urge the ball portion 330 of the ball-stem 304 against the complementary-shaped first inner surface 332 of the upper housing 302. The gaps 352, for example, function to reduce the stress placed on the spring 308 from engaging the ball-stem 304.

Figure 15A:
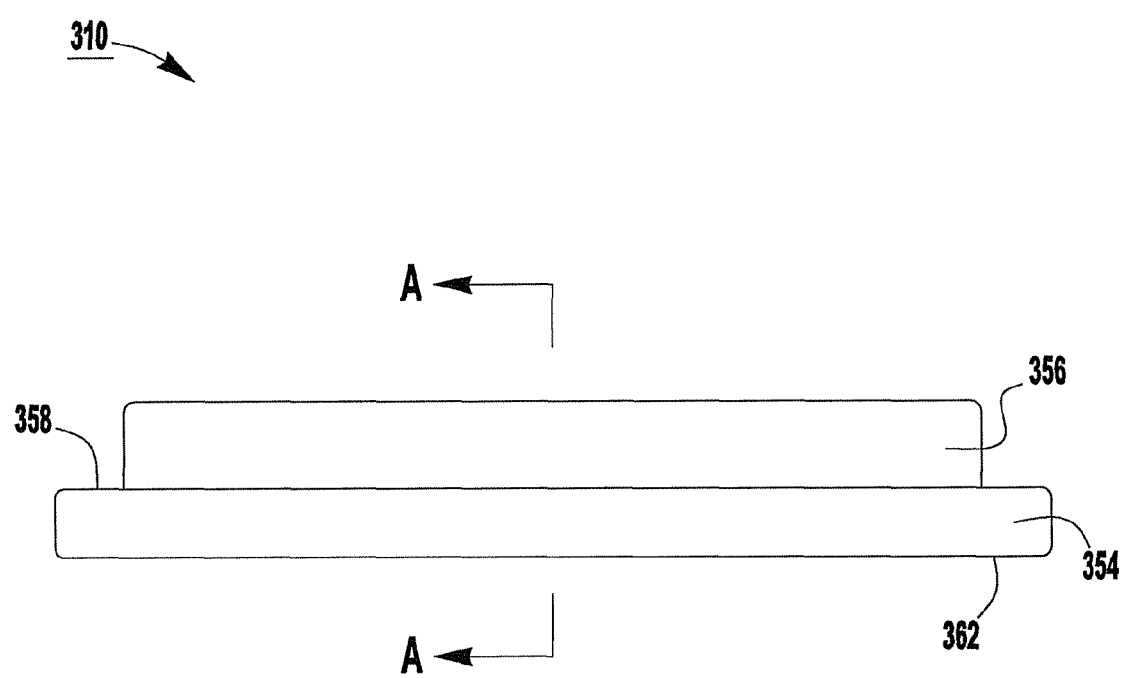
FIGS. 15A-15C show an exemplary bushing used in the exemplary valve cartridge of FIG. 11.
Figure 15B:
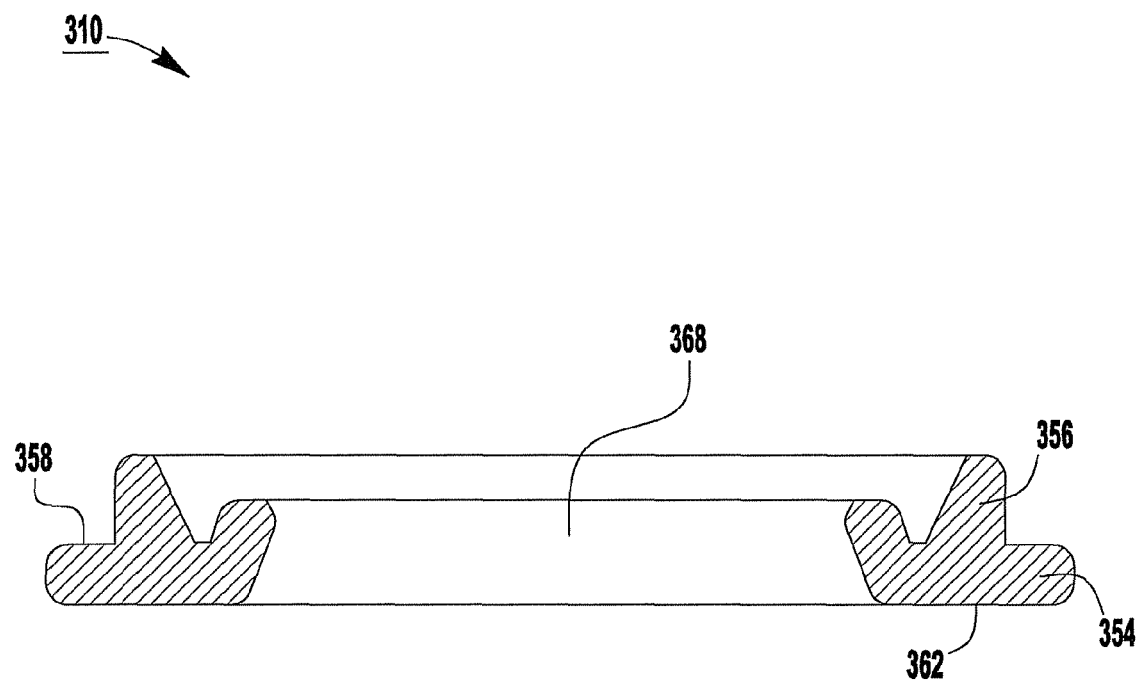
Figure 15C:
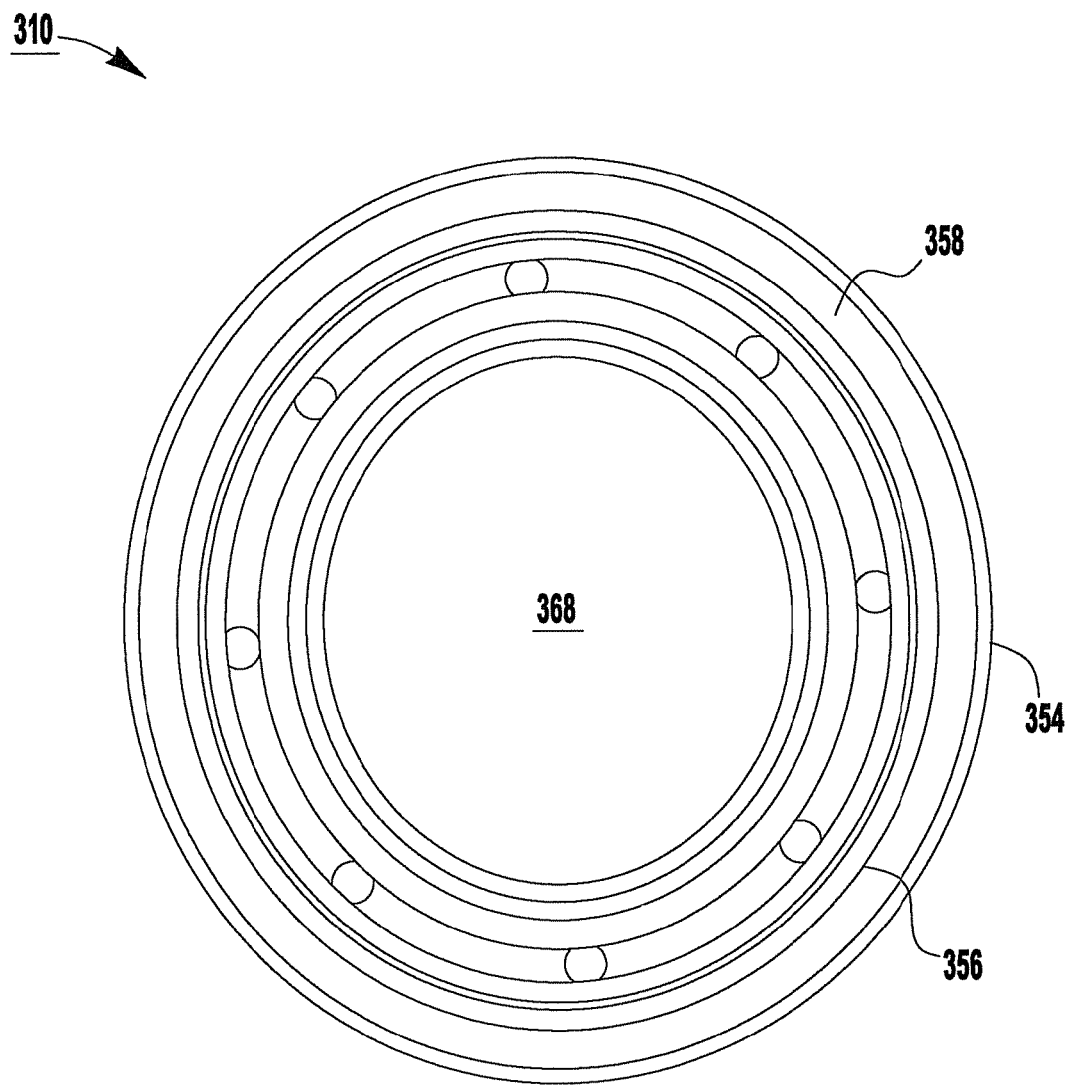
Figure 16A:
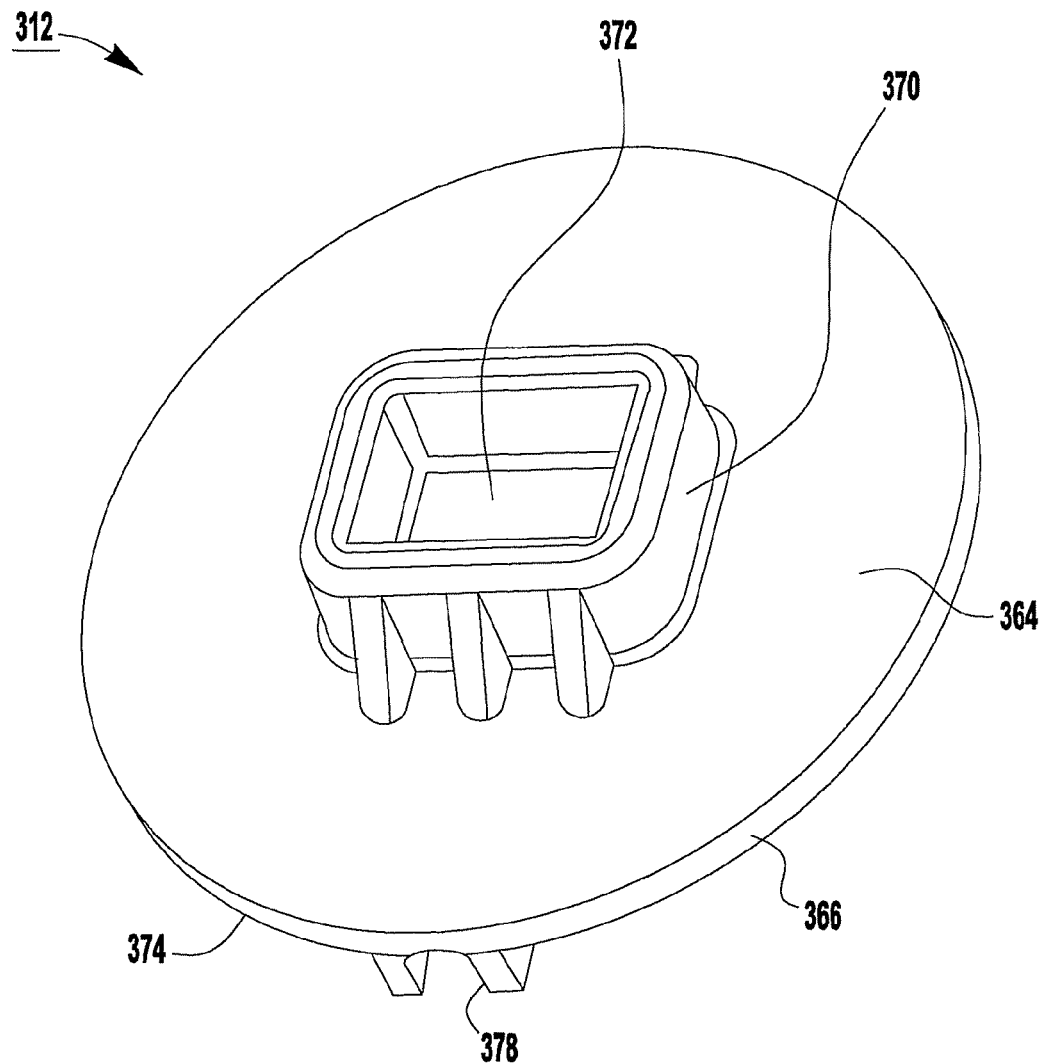
FIGS. 16A-16D show an exemplary carrier used in the exemplary valve cartridge of FIG. 11.
Figure 16B:
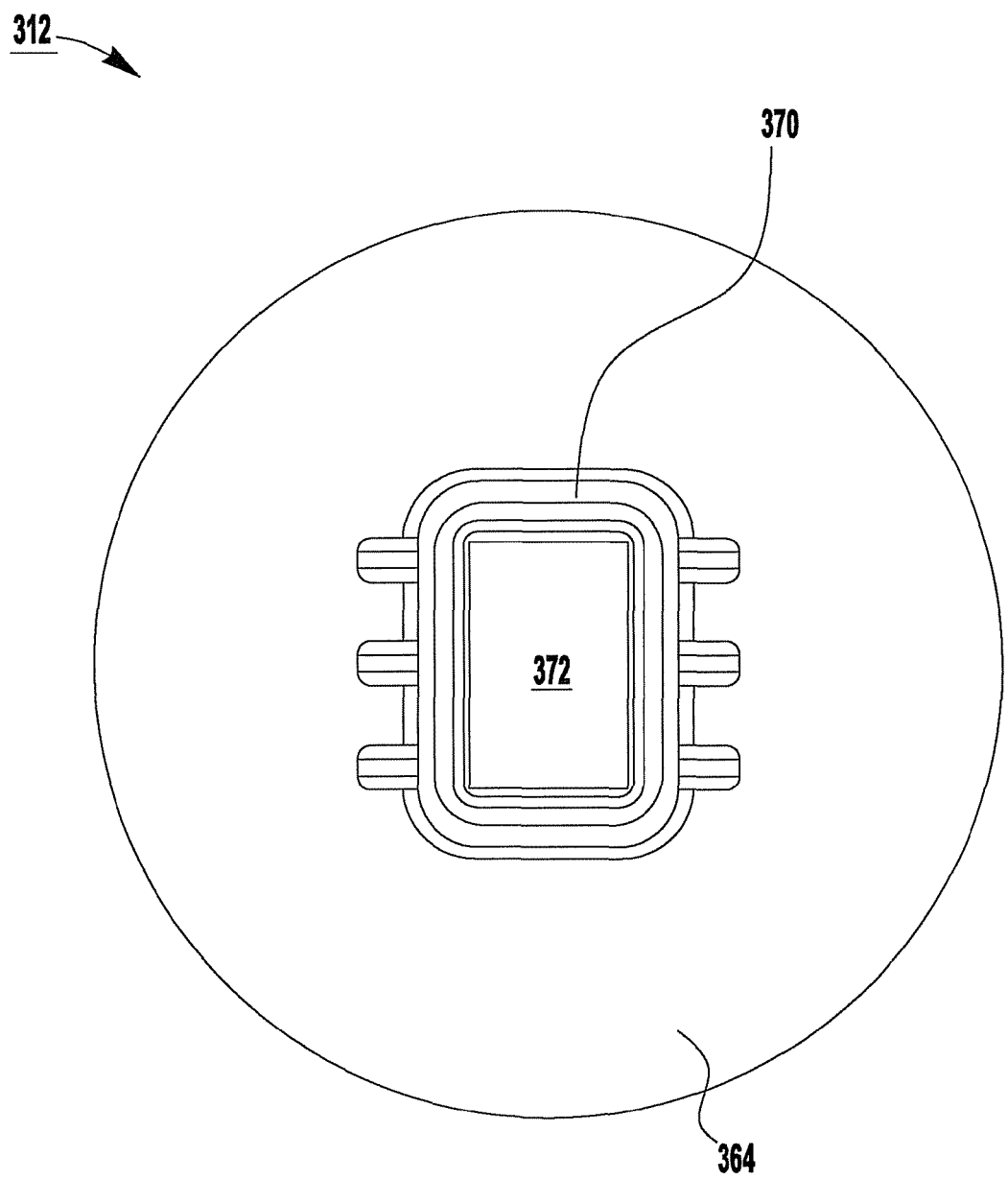
Figure 16C:
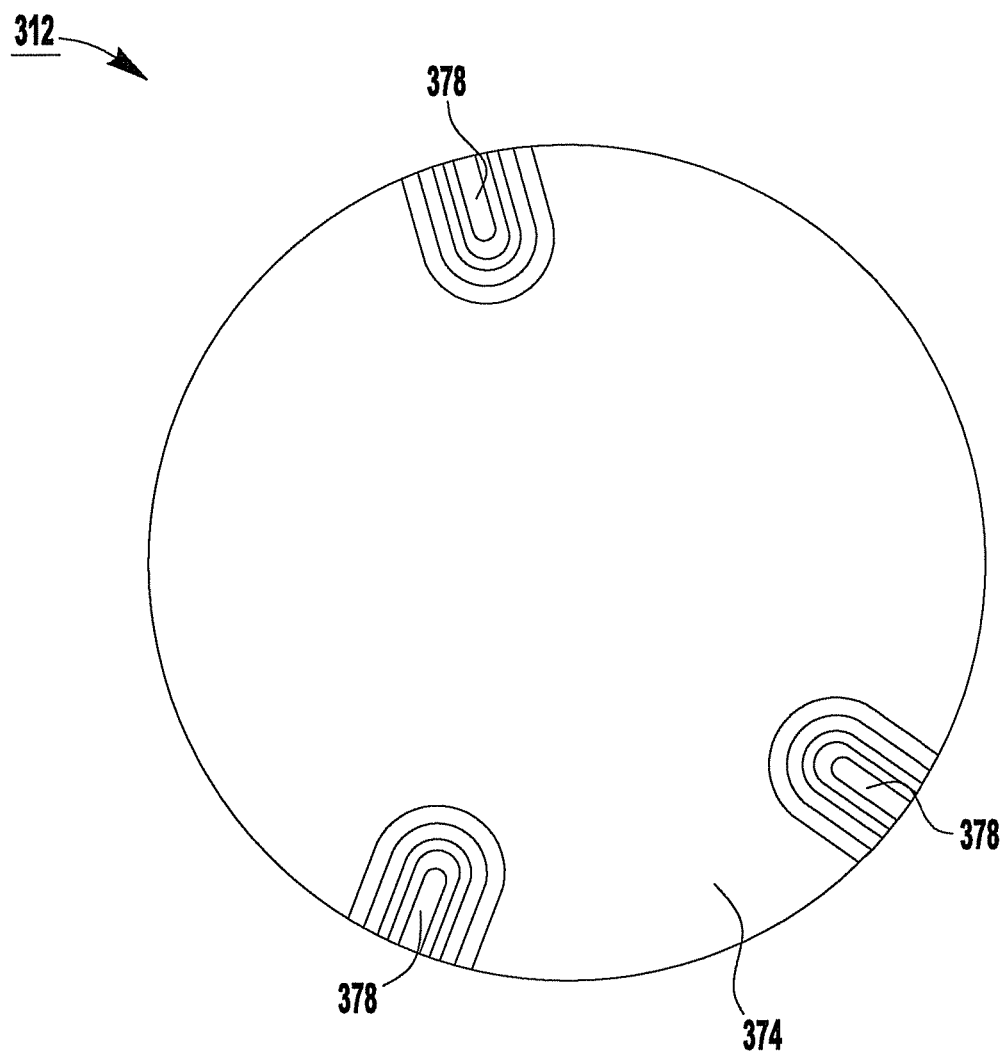
Figure 16D:
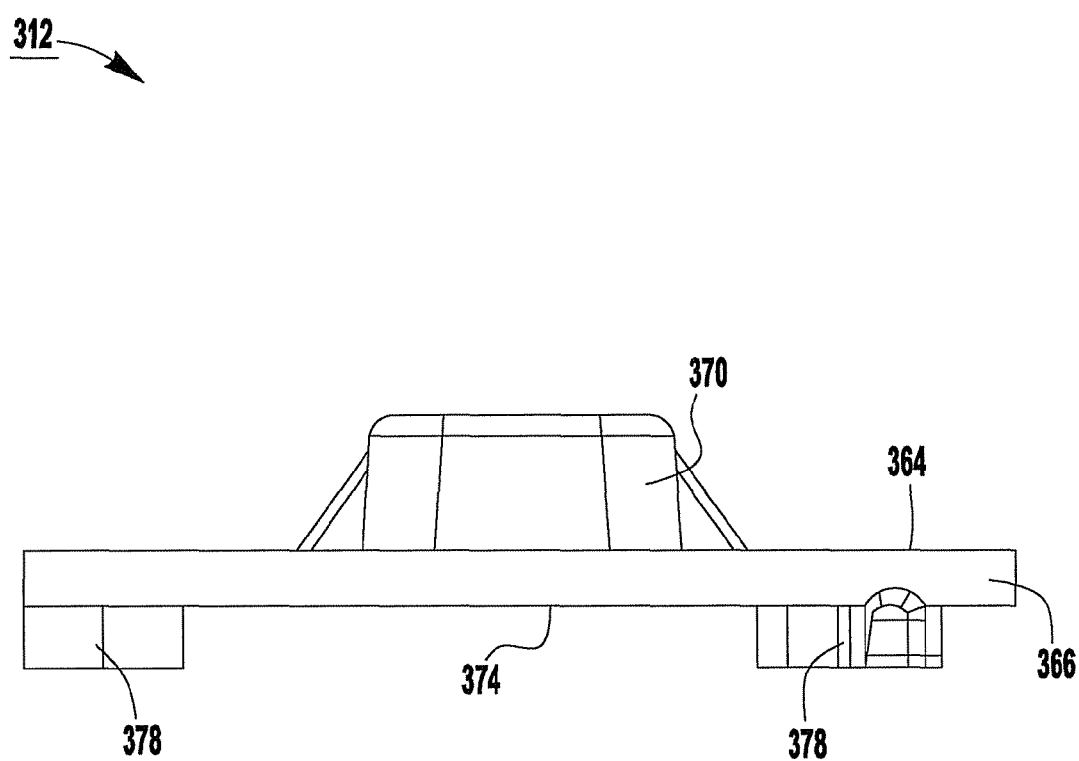

As shown in FIGS. 15A-15C, the bushing 310 includes a flat annular portion 354 and a raised annular portion 356. A diameter of the flat annular portion 354 is greater than a diameter of the raised annular portion 356. The bushing 310 is disposed below and can be spaced apart from the spring 308 in the cavity 322 of the upper housing 302 (see FIGS. 21B-21C). An upper surface 358 of the flat annular portion 354 of the bushing 310 contacts a third inner surface 360 of the upper housing 302, which is located below the installation ledge 334 (see FIGS. 12C and 21C). A lower surface 362 of the flat annular portion 354 of the bushing 310 rests on an upper surface 364 of a flat portion 366 of the carrier 312 (see FIGS. 16A-16B, 16D and 21B-21C). Additionally, the raised annular portion 356 of the bushing 310 extends into a portion of the cavity 322 of the upper housing 302 immediately above (and adjacent to) the installation ledge 334. The raised annular portion 356 of the bushing 310 is sized to fit closely in that portion of the cavity 322 of the upper housing 302 receiving the raised annular portion 356 of the bushing 310. Accordingly, the bushing 310 provides a support surface between the upper housing 302 and the carrier 312.

The bushing 310 has an opening 368 that extends through the flat annular portion 354 and the raised annular portion 356 of the bushing 310. A raised portion 370 of the carrier 312 extends into the opening 368 of the bushing 310 (see FIGS. 16A-16B and 16D). Additionally, a coupling recess 372 is formed in the raised portion 370 of the carrier 312. After the carrier 312 is installed in the valve cartridge 300, the raised portion 370 including the coupling recess 372 is positioned within the opening 368 of the bushing 310 and surrounded by the bushing 310 (see FIGS. 21B-21C).

The coupling recess 372 of the carrier 312 receives the projection 340 of the ball-stem 304, thereby connecting the actuating mechanism (i.e., the ball-stem 304) and the carrier 312 (see FIGS. 21B-21C). The projection 340 of the ball-stem 304 can have four sides that contact four corresponding sides of the coupling recess 372. The projection 340 of the ball-stem 304 does not contact a bottom surface of the coupling recess 372. It will be appreciated that notwithstanding the exemplary embodiments described herein, the ball-stem 304 can be connected to the carrier 312 in any suitable manner that allows the ball-stem 304 to impart translational and angular movement to the carrier 312.

As shown in FIGS. 16A-16D, the carrier 312 includes the flat portion 366 and the raised portion 370. A lower surface 374 of the flat portion 366 of the carrier 312 includes structure for interfacing with an upper surface 376 of the movable disk 314, such that the carrier 312 and the movable disk 314 are joined and do not move relative to one another. In one exemplary embodiment, the lower surface 374 of the carrier 312 includes three U-shaped projections 378 that friction fit into three corresponding U-shaped recesses 380 formed in the upper surface 376 of the movable disk 314. The spacing between adjacent U-shaped projections 378 (and, thus, the corresponding U-shaped recesses 380) can be varied so that the carrier 312 will only interface with the movable disk 314 in one orientation. Furthermore, as noted above, the carrier 312 also includes the coupling recess 372, which is formed in the raised portion 370 of the carrier 312. In this manner, the carrier 312 functions to interconnect the actuating mechanism (e.g., the ball-stem 304) and the dynamic sealing elements (e.g., the movable disk 314), in the valve cartridge 300.

Figure 17A:
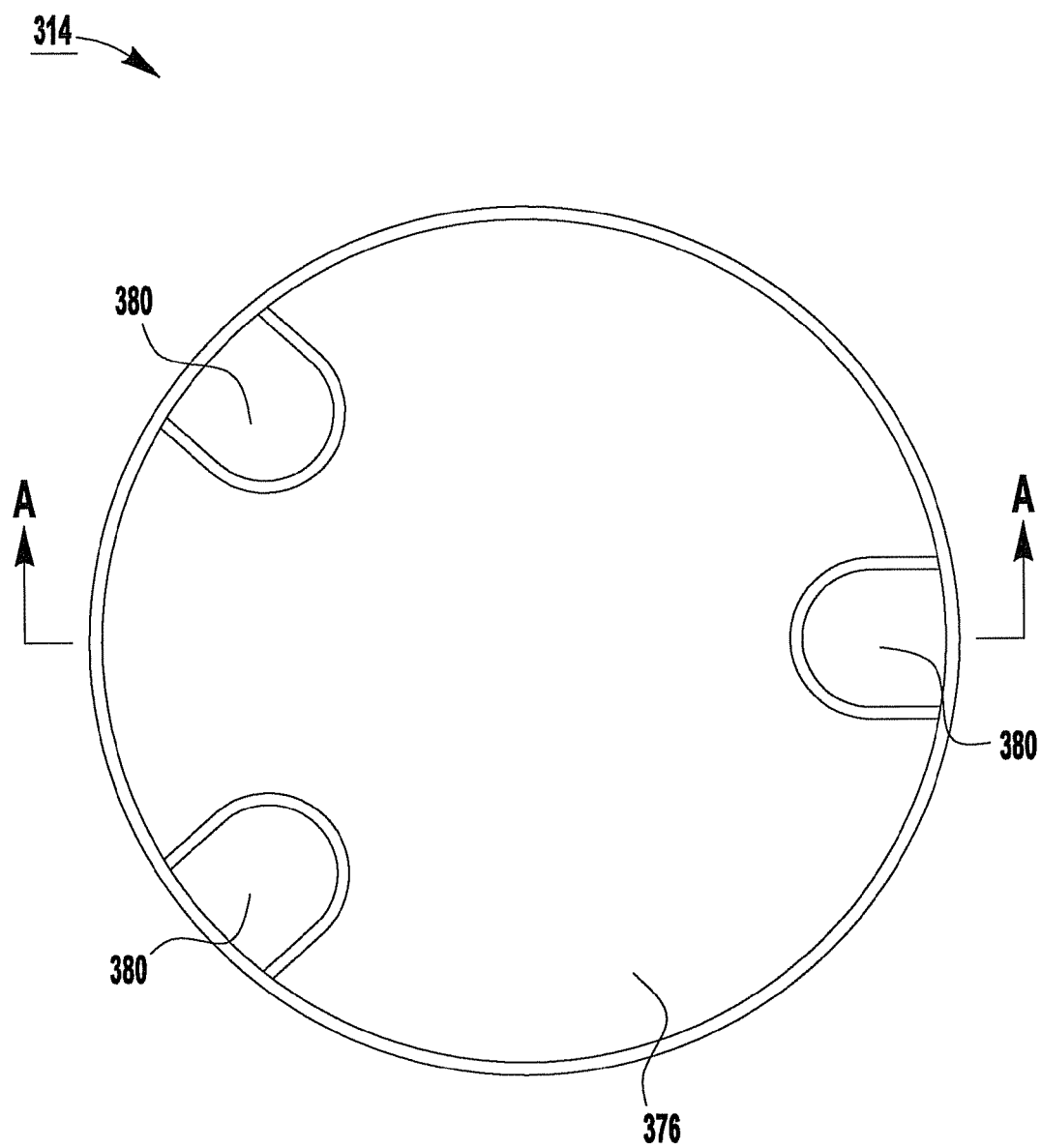
FIGS. 17A-17C show an exemplary movable disk used in the exemplary valve cartridge of FIG. 11.
Figure 17B:
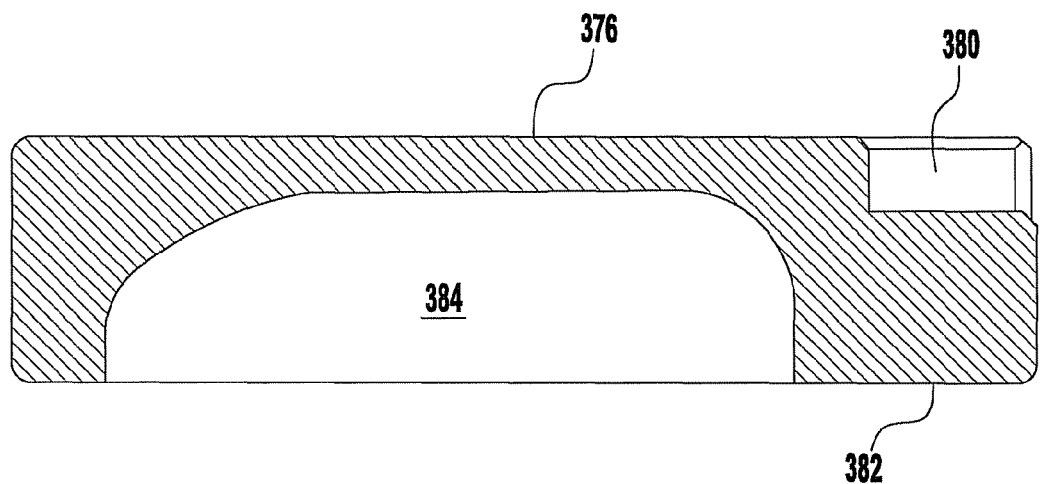
Figure 17C:
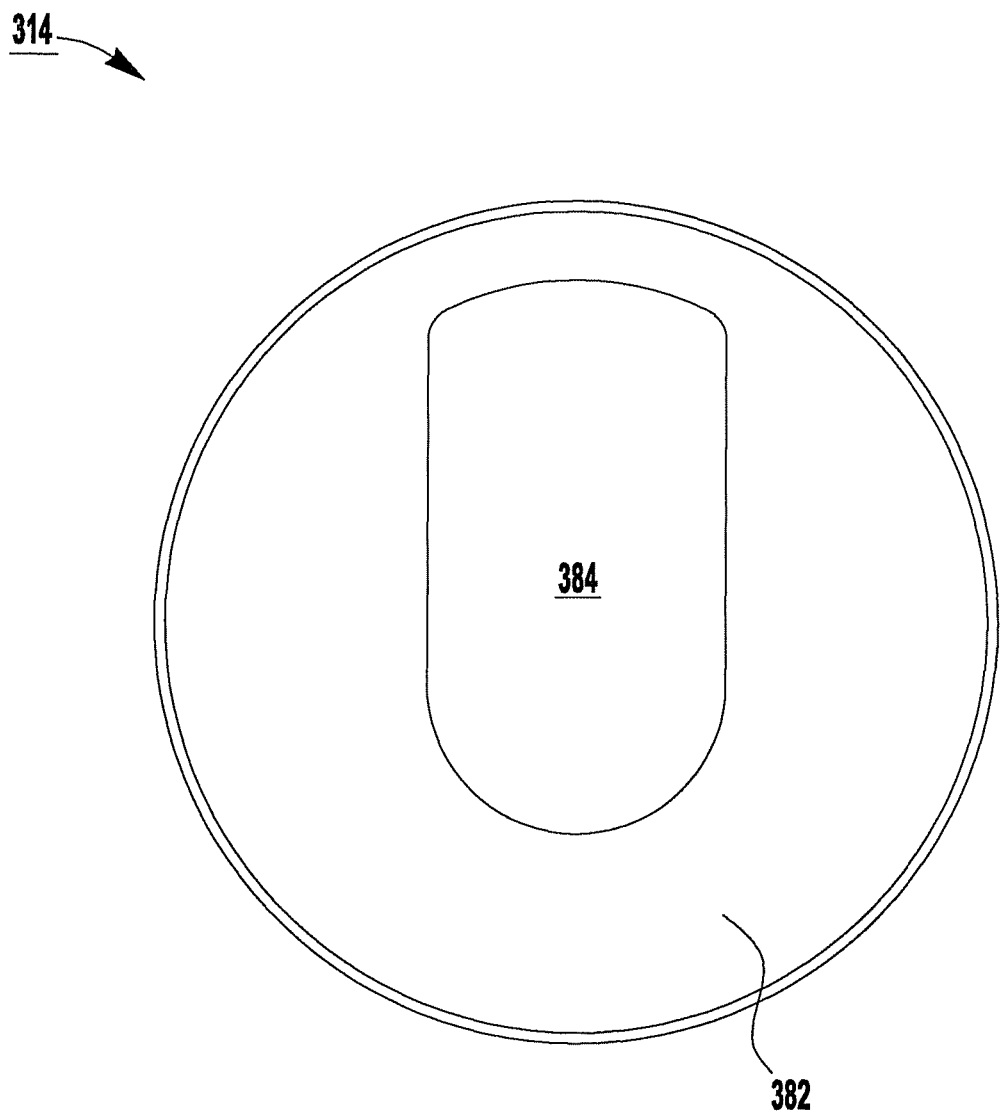
Figure 18A:
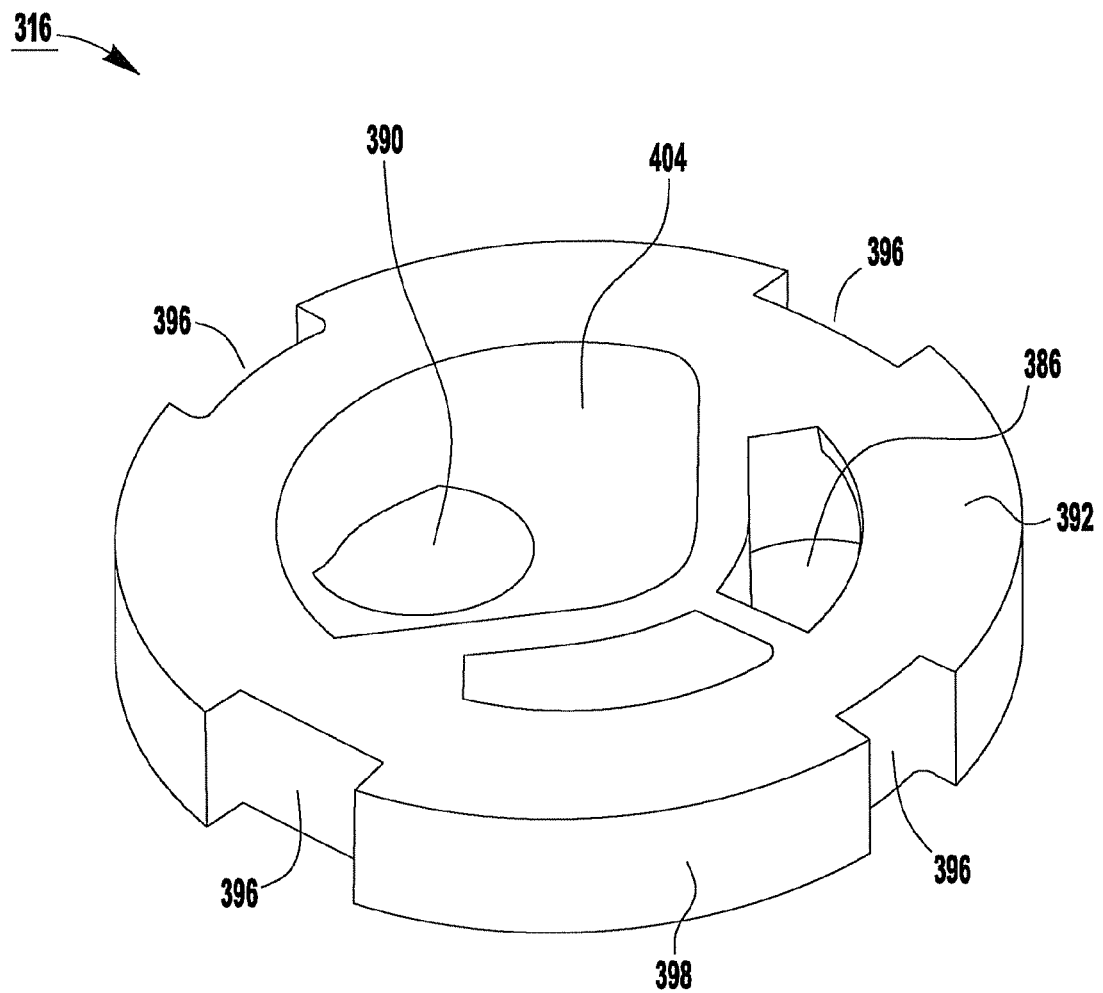
FIGS. 18A-18D show an exemplary fixed disk used in the exemplary valve cartridge of FIG. 11.
Figure 18B:
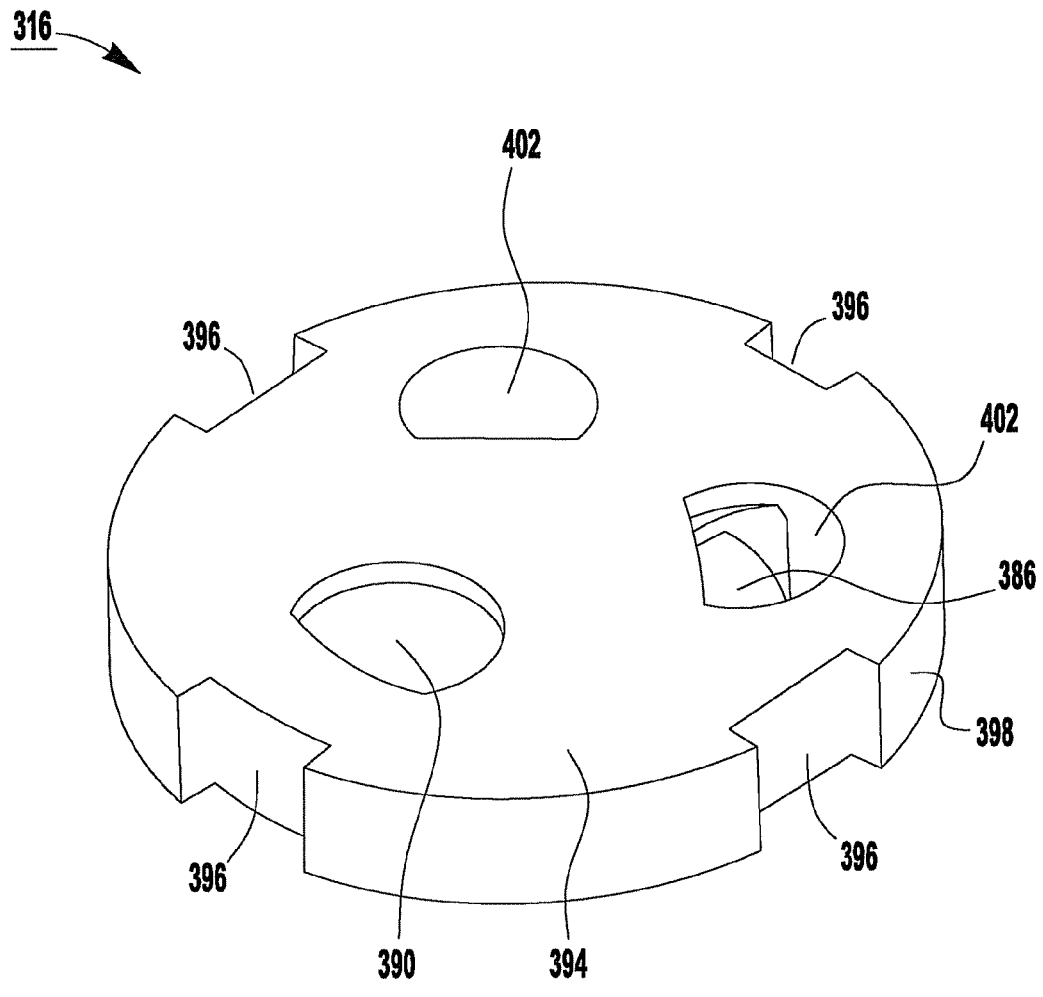
Figure 18C:
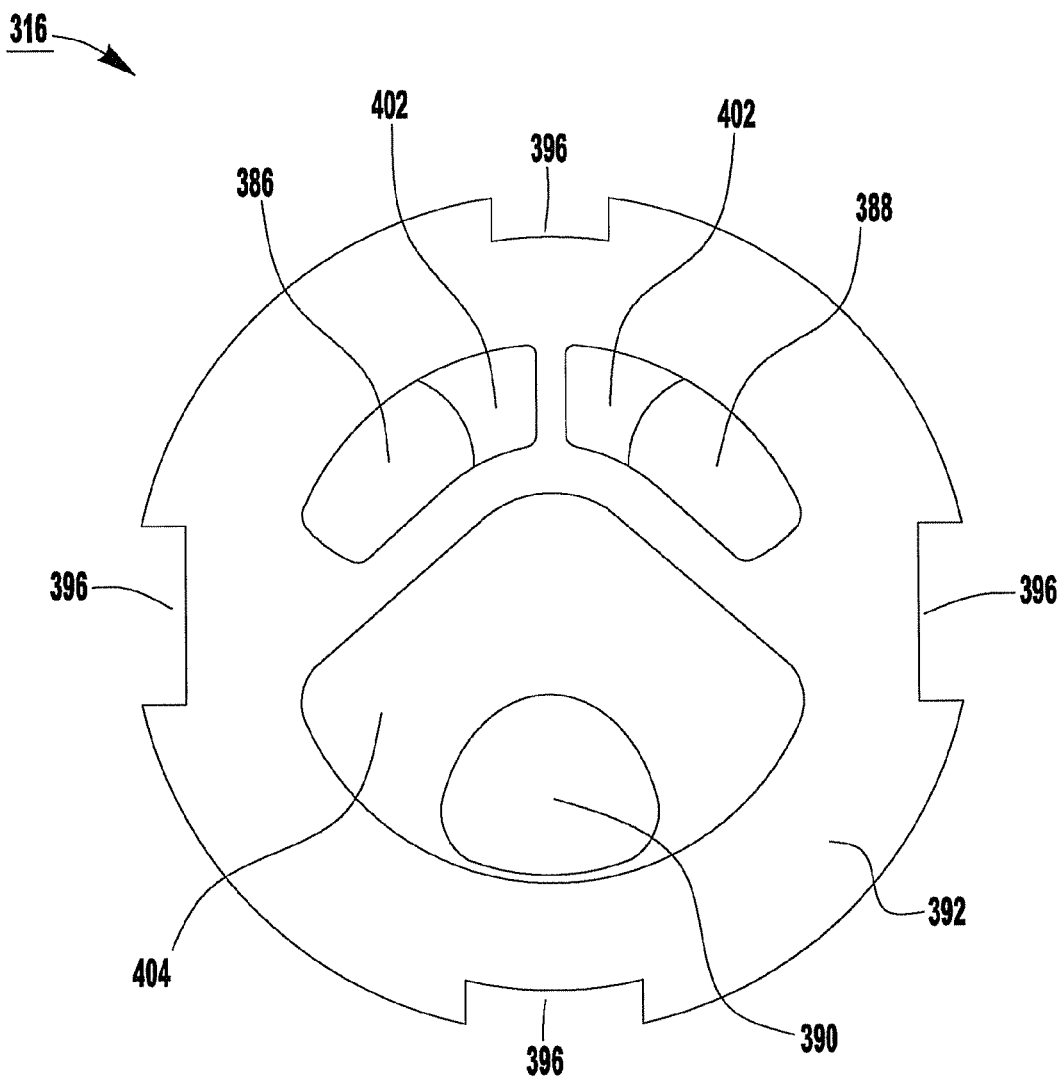
Figure 18D:
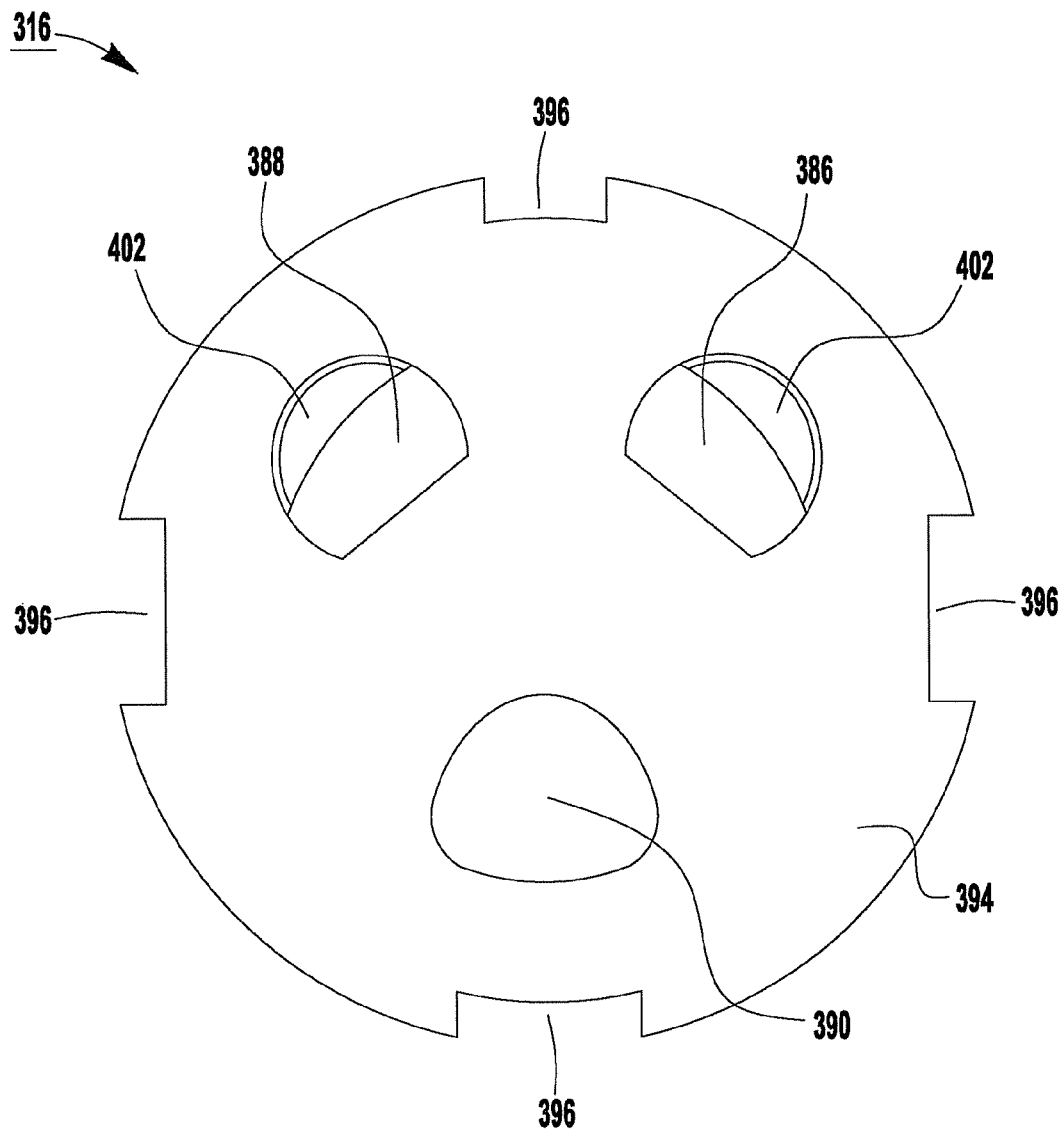

As shown in FIGS. 17A-17C, the movable disk 314 is a valve member formed as a plate, disk or the like that is movable relative to the upper housing 302. As noted above, the upper surface 376 of the movable disk 314 includes the U-shaped recesses 380. The upper surface 376 is substantially flat. A lower surface 382 of the movable disk 314 includes a mixing chamber 384 (i.e., a cavity formed in the movable disk 314). In an alternative exemplary embodiment, the mixing chamber 384 extends through the movable disk 314 (i.e., from the lower surface 382 to the upper surface 376). The lower surface 382 is substantially flat. The lower surface 382 of the movable disk 314 forms a sealing surface that can cover and uncover water inlet apertures 386 and 388 in the fixed disk 316 to allow only cold water, only hot water or both cold and hot water to flow through the fixed disk 316. The water flowing through the water inlet apertures 386 and 388 in the fixed disk 316 enters the mixing chamber 384 where the cold and hot water mix prior to being discharged through a water outlet aperture 390 in the fixed disk 316.

As shown in FIGS. 18A-18D, the fixed disk 316 is a valve member formed as a plate, disk or the like that is fixed relative to the upper housing 302. The fixed disk 316 has an upper surface 392 and a lower surface 394. The fixed disk 316 includes structure for interfacing with the lower housing 320 to fix (i.e., prevent rotation) of the fixed disk 316 relative to the upper housing 302 once the valve cartridge 300 is assembled. For example, four notches 396 are formed along a periphery 398 of the fixed disk 316. One or more notches 396 engage corresponding projections 400 formed on the lower housing 320, thereby preventing the fixed disk 316 from rotating relative to the lower housing 320. In one exemplary embodiment, two notches 396 engage corresponding projections 400. By varying the size of and/or the spacing between the notches 396 (and, thus, the corresponding projections 400), it is possible to insure that the fixed disk 316 will interface with the lower housing 320 in only one orientation. Thus, because the fixed disk 316 is prevented from rotating relative to the lower housing 320 and the lower housing 320 is secured to the upper housing 302, as described below, the fixed disk 316 will not rotate within the upper housing 302.

The fixed disk 316 includes the water inlet apertures 386 and 388, which correspond to a cold water inlet aperture and a hot water inlet aperture, respectively. The fixed disk 316 also includes the water outlet aperture 390 through which cold water flowing through the cold water inlet aperture 386, hot water flowing through the hot water inlet aperture 388 or a mixture of the cold and hot water can flow to a water outlet passage of the valve body. The cold water inlet aperture 386 and the hot water inlet aperture 388 of the fixed disk 316 each have walls 402 that slope from near the lower surface 394 of the fixed disk 316 to near the upper surface 392 of the fixed disk 316 to improve the flow of water through the fixed disk 316 and into the valve cartridge 300. The water outlet aperture 390 of the fixed disk 316 has walls 404 that slope from near the upper surface 392 of the fixed disk 316 to near the lower surface 394 of the fixed disk 316 to improve the flow of water through the fixed disk 316 and out of the valve cartridge 300.

Figure 19A:
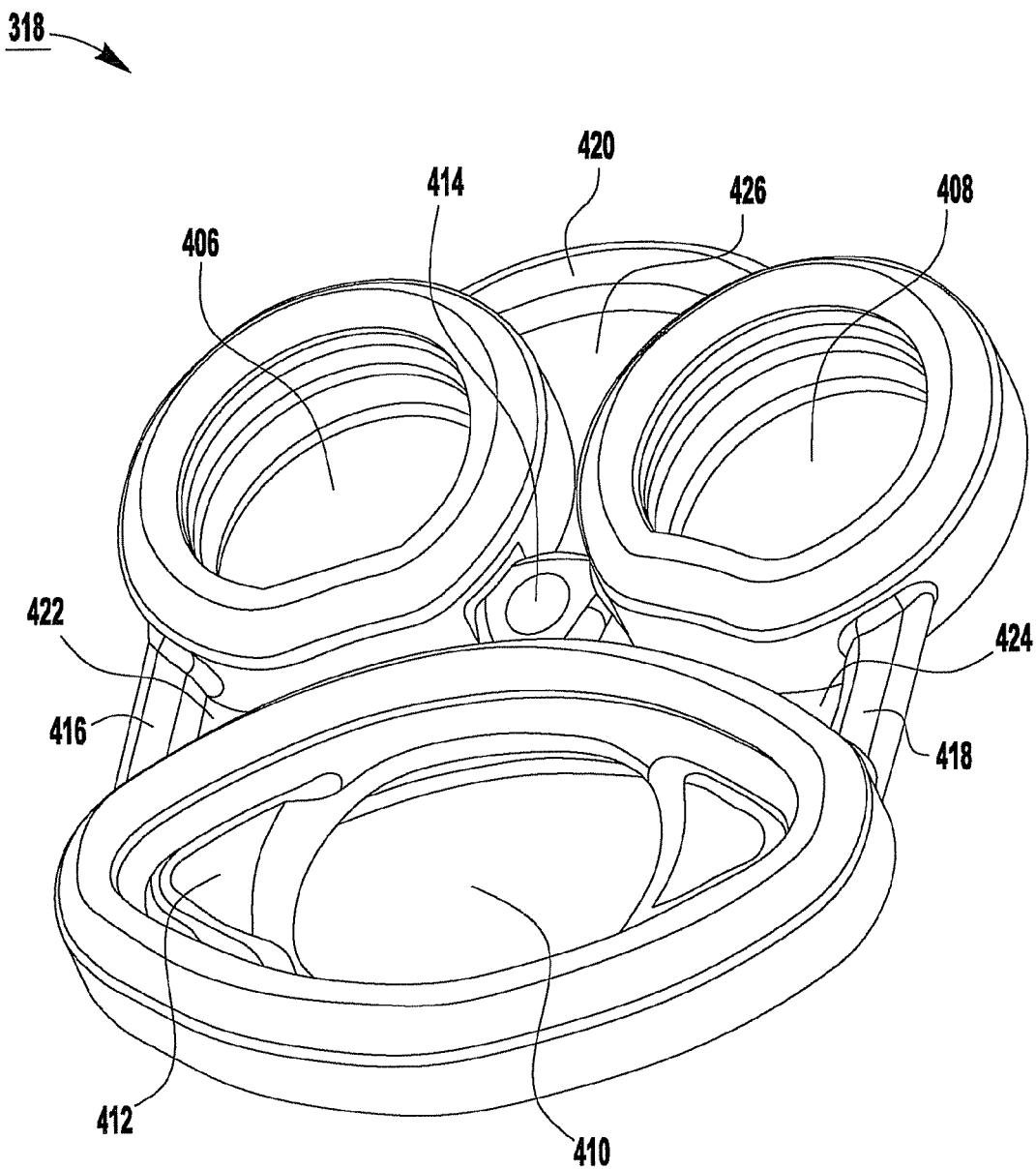
FIGS. 19A-19B show an exemplary base seal used in the exemplary valve cartridge of FIG. 11.
Figure 19B:
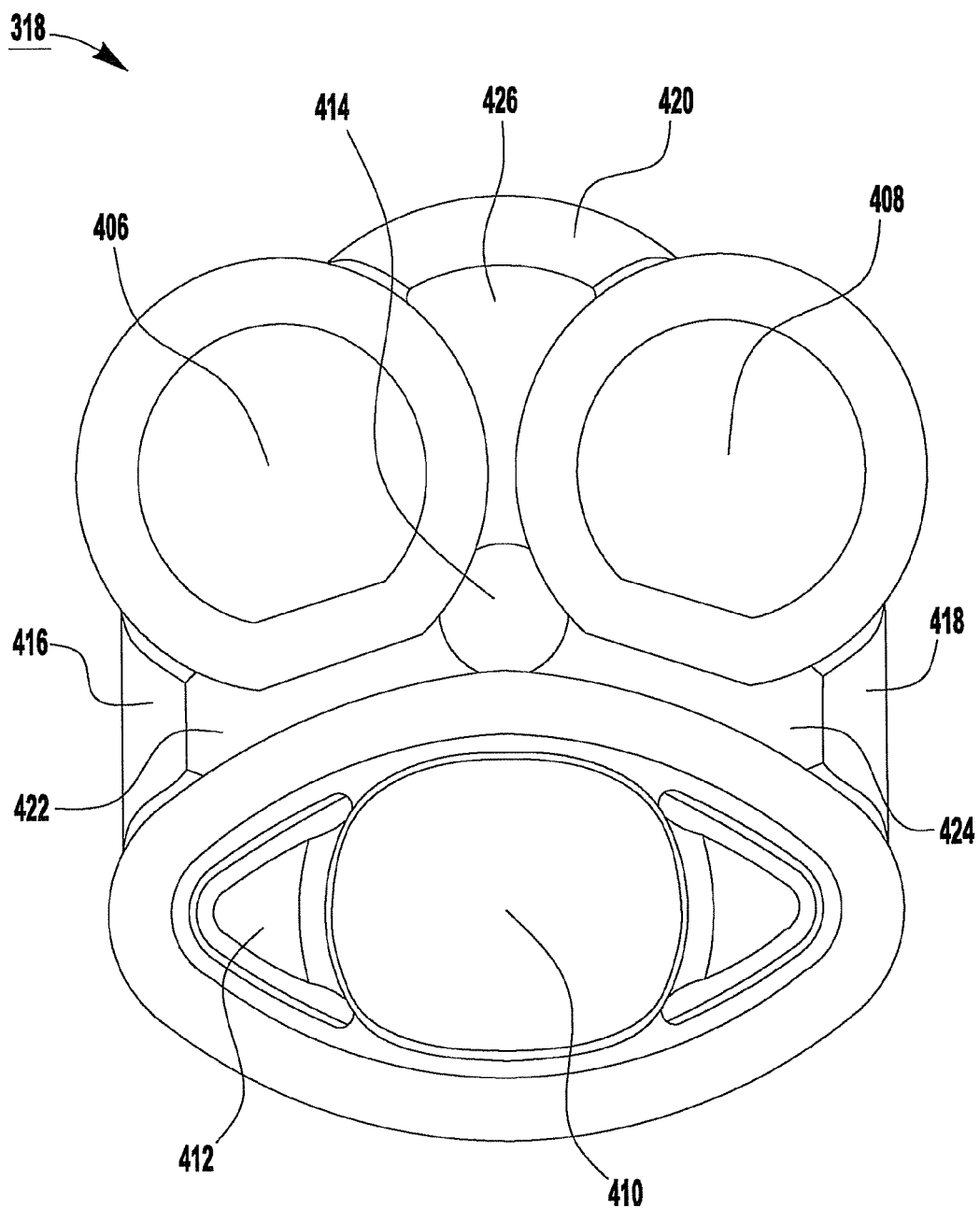
Figure 20A:
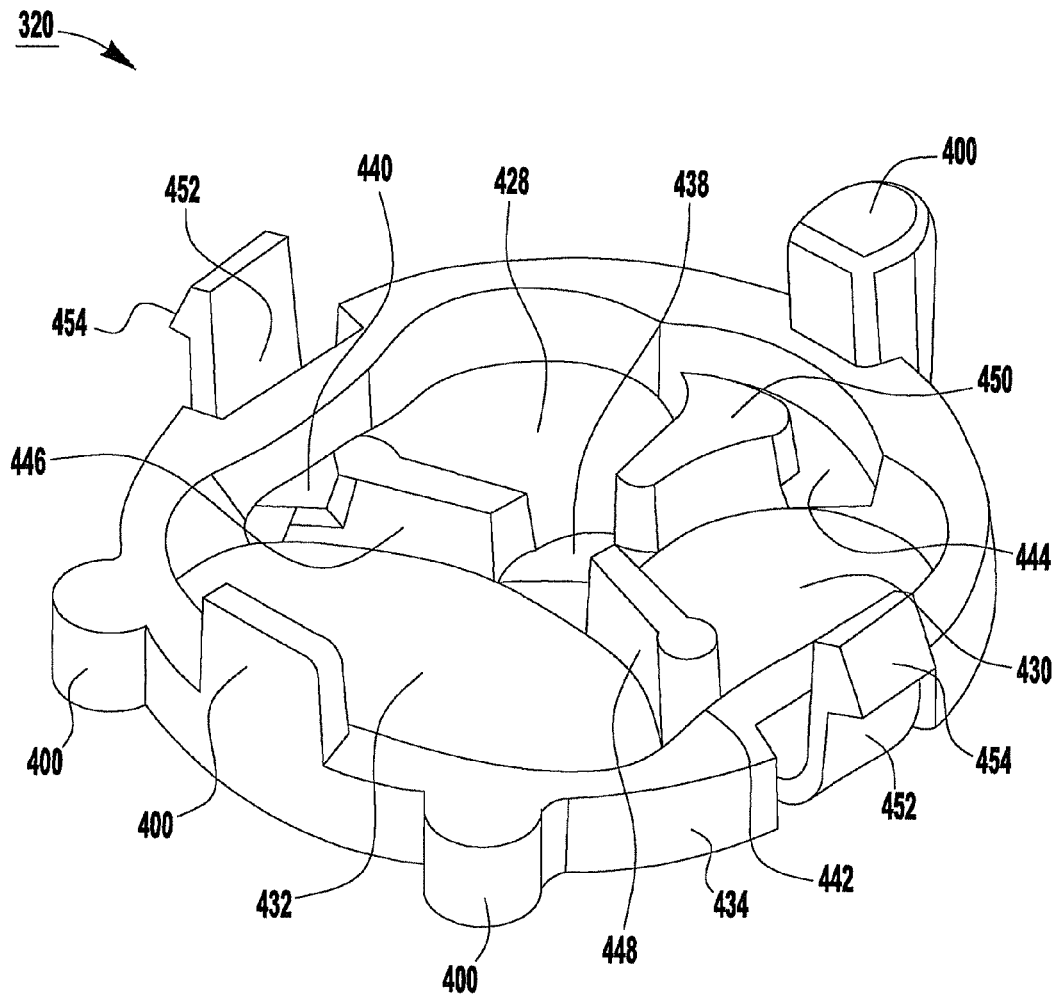
FIGS. 20A-20D show an exemplary lower housing used in the exemplary valve cartridge of FIG. 11.
Figure 20B:
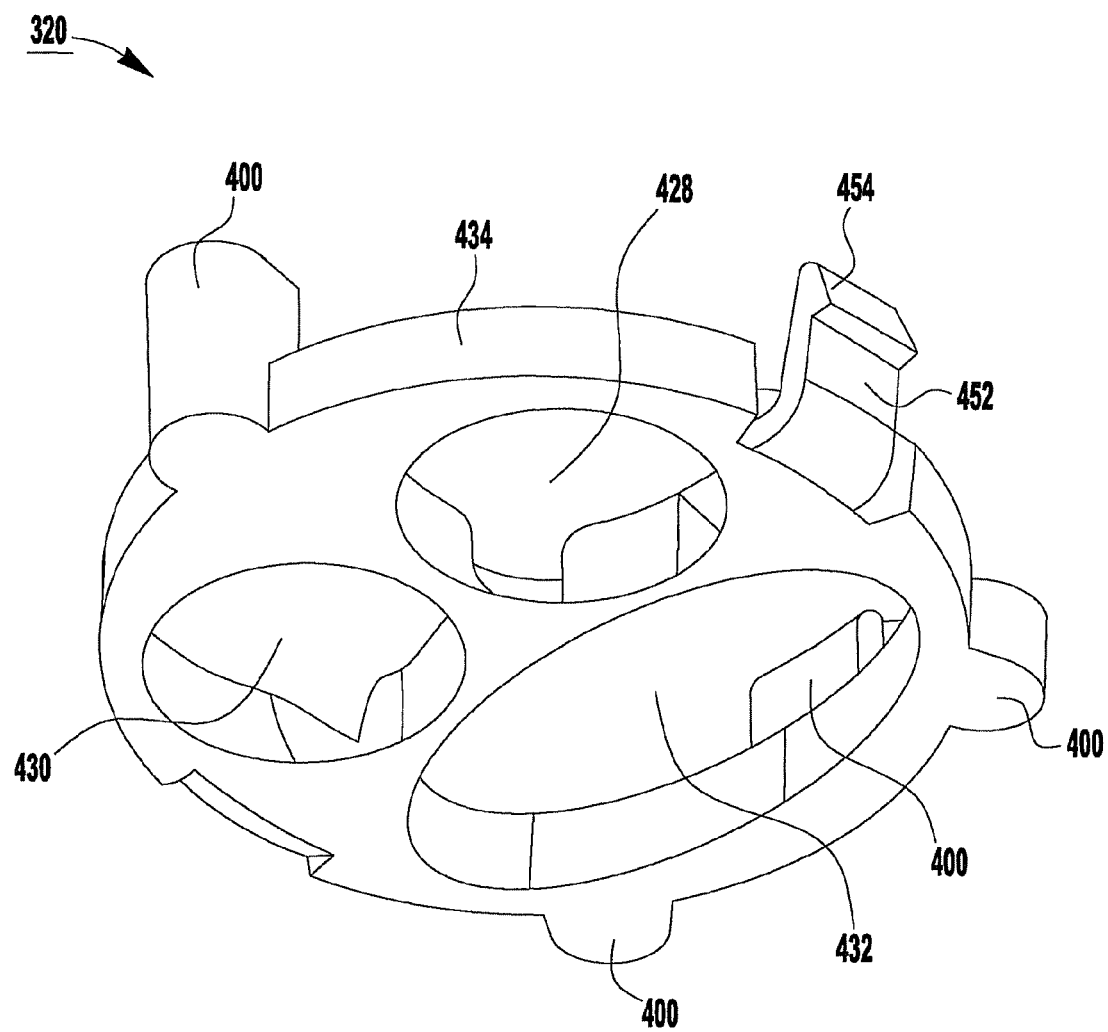
Figure 20C:
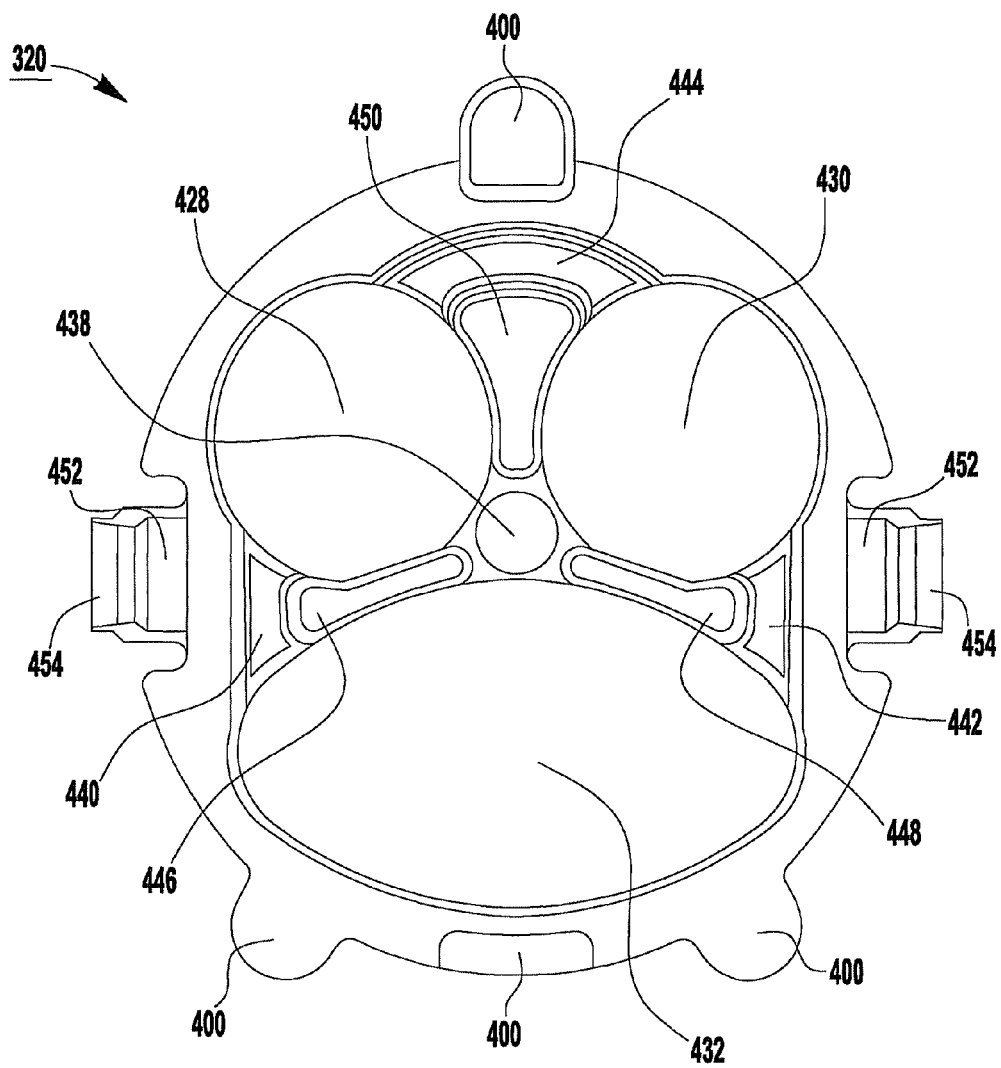
Figure 20D:
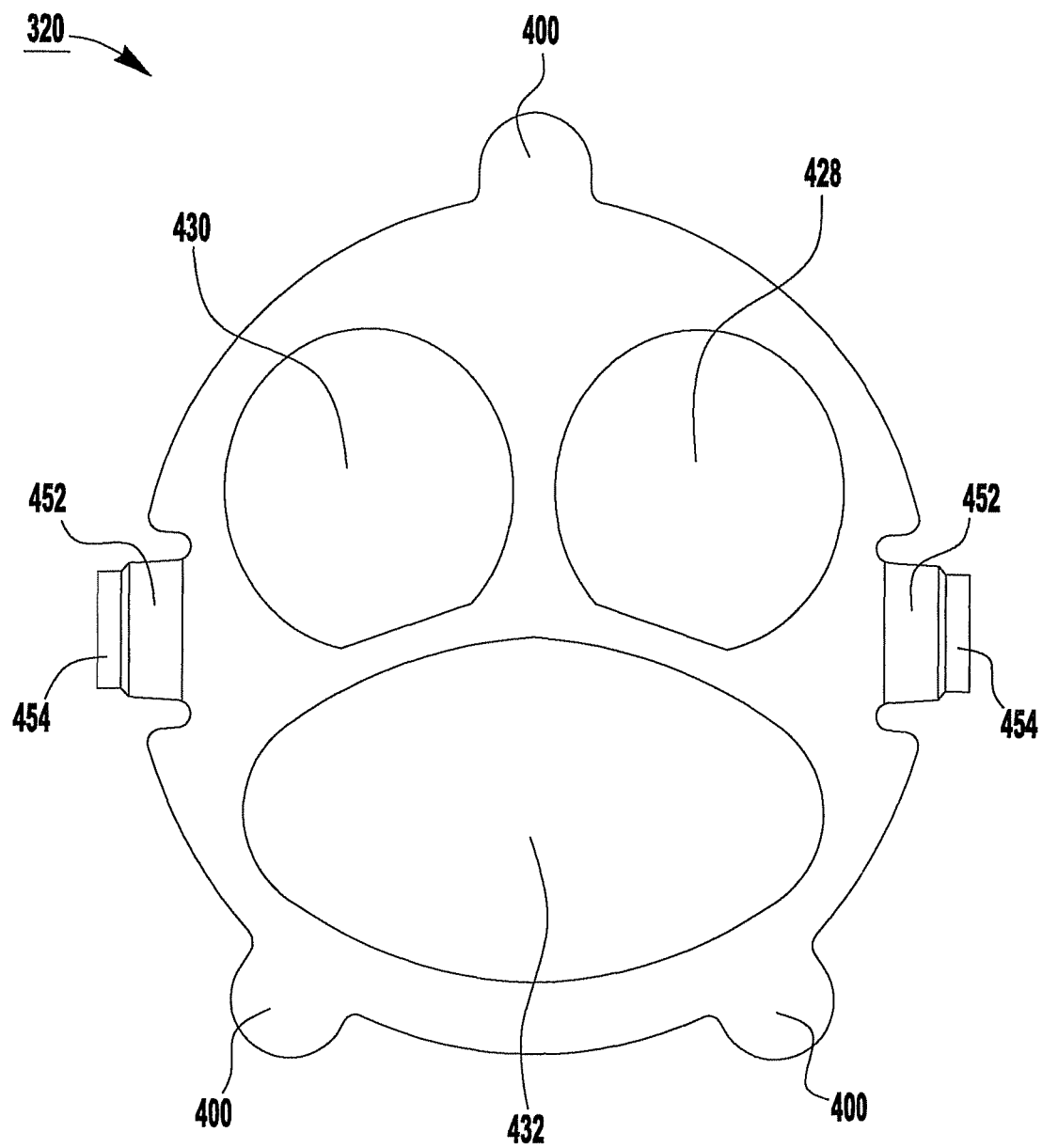

As shown in FIGS. 19A-19B, the base seal 318 is a sealing member formed of an elastic material (e.g., rubber). The base seal 318 forms a watertight seal around the cold water inlet aperture 386, the hot water inlet aperture 388 and the water outlet aperture 390 of the fixed disk 316. Like the fixed disk 316, the base seal 318 has a cold water inlet aperture 406, a hot water inlet aperture 408 and a water outlet aperture 410. In one exemplary embodiment, the water outlet aperture 410 of the base seal 318 is formed by inserting a member 412 (e.g., a plastic insert) having the water outlet aperture 410 therein into an opening in the base seal 318. In another exemplary embodiment, the base seal 318 is formed integrally with the lower housing 320.

The cold water inlet aperture 406, the hot water inlet aperture 408 and the water outlet aperture 410 are all connected by a hub 414 near the center of the base seal 318. Furthermore, the cold water inlet aperture 406 is connected to the water outlet aperture 410 by a first connection 416; the hot water inlet aperture 408 is connected to the water outlet aperture 410 by a second connection 418; and the cold water inlet aperture 406 is connected to the hot water inlet aperture 408 by a third connection 420. The joining of the cold water inlet aperture 406 to the water outlet aperture 410 by the first connection 416 forms a first space 422; the joining of the hot water inlet aperture 408 to the water outlet aperture 410 by the second connection 418 forms a second space 424; and the joining of the cold water inlet aperture 406 to the hot water inlet aperture 408 by the third connection 420 forms a third space 426.

It is important that the apertures 386, 388 and 390 in the fixed disk 316 are aligned with the apertures 406, 408 and 410 in the base seal 318 when the valve cartridge 300 is assembled. Accordingly, as described below, the hub 414, the first connection 416, the second connection 418, the third connection 420, the first space 422, the second space 424 and the third space 426 are used to align the base seal 318 in the lower housing 320 and, thus, with the fixed disk 318.

As shown in FIGS. 20A-20D and 21B-21C, the lower housing 320 interfaces with the upper housing 302 to retain the components (e.g., the bushing 310, the carrier 312, the movable disk 314, the fixed disk 316 and the base seal 318) in the cavity 322 of the upper housing 302 after assembly of the valve cartridge 300. The lower housing 320, for example, can be made of plastic or metal. The lower housing 320 can be formed from the same material as the upper housing 302.

Furthermore, the lower housing 320 functions as a support member to orient and retain the fixed disk 316 and the base seal 318 prior to assembly of the valve cartridge 300. Similar to the fixed disk 316 and the base seal 318, the lower housing 320 includes a cold water inlet aperture 428, a hot water inlet aperture 430 and a water outlet aperture 432 (see FIGS. 20A-20D). As noted above, the lower housing 320 also includes the projections 400. One or more projections 400 can extend above a sidewall 434 of the lower housing 320. In one exemplary embodiment, two projections 400 extend above the sidewall 434. One or more projections 400 can have a height that is substantially the same as a height of the sidewall 434. In one exemplary embodiment, two projections 400 have a height that is substantially the same as the height of the sidewall 434.

One or more projections 400 can fit into openings 436 formed in the upper housing 302 below the keys 336 (see FIGS. 12A-12C). In one exemplary embodiment, three projections 400 fit into the openings 436. These projections 400 have a shape that is substantially the same as a shape of the keys 336. By fitting into the openings 436 below the keys 336, the projections 400 also function as part of the keys 336, for example, by engaging the complementary-shaped recesses in the valve body.

The size and/or shape of the projections 400 can be varied such that the lower housing 320 will interface with the fixed disk 316 and the upper housing 302 in only one orientation, thereby insuring that the fixed disk 316 will be properly oriented relative to the upper housing 302 and the lower housing 320 when the valve cartridge 300 is assembled. By engaging the notches 396 in the fixed disk 316, the projections 400 also prevent the fixed disk 316 from rotating relative to the lower housing 320 (and, thus, the upper housing 302).

The lower housing 320 includes a first recess 438, a second recess 440, a third recess 442 and a fourth recess 444. The lower housing 320 also includes a first projection 446, a second projection 448 and a third projection 450. The hub 414, the first connection 416, the second connection 418 and the third connection 420, respectively, of the base seal 318 fit into the first recess 438, the second recess 440, the third recess 442 and the fourth recess 444, respectively, of the lower housing 320. Furthermore, the first projection 446, the second projection 448 and the third projection 450, respectively, of the lower housing 320 fit into the first space 422, the second space 424 and the third space 426, respectively, of the base seal 318. Accordingly, the lower housing 320 orients, fixes and retains the base seal 318 in the lower housing 320.

The lower housing 320 also includes a pair of elastic flanges 452 that each have an angled upper portion 454. The notches 396 in the fixed disk 316 allow the elastic flanges 452 to be pressed inward (i.e., toward a central vertical axis of the valve cartridge 300), such that the angled upper portions 454 can enter the cavity 322 in the upper housing 302. When the angled upper portions 454 are aligned with the corresponding openings 456 formed in the upper housing 302 (see FIGS. 13A-13C), the elastic flanges 452 press outward and the angled upper portions 454 are received in the openings 456. In this manner, the lower housing 320 (including the fixed disk 316 and the base seal 318 interfaced therewith) can be secured to the upper housing 302 (see FIGS. 21B-21C).

It should be noted that although the notches 396 of the fixed disk 316 interface with the projections 400 of the lower housing 320 to prevent the fixed disk 316 from rotating within the lower housing 320 (and, thus, the upper housing 302), the fixed disk 316 is nonetheless allowed to move axially within the lower housing 320 and the upper housing 302. In this manner, compression of the base seal 318 exerts a loading force on the movable disk 314 and the fixed disk 316. Accordingly, the movable disk 314 and the fixed disk 316 are kept in water-tight engagement with one another, after installation of the valve cartridge 300.

The position and the orientation of the movable disk 314 relative to the fixed disk 316 are controlled by the stem portion 328 of the ball-stem 304 projecting out of the upper housing 302 through the upper opening 326. For example, pivoting the stem portion 328 of the ball-stem 304 about a pivot (e.g., the pin 306) changes the position of the movable disk 314 relative to the fixed disk 316, which changes the flow rate of the water. Rotating the stem portion 328 of the ball-stem 304 changes the orientation of the movable disk 314 relative to the fixed disk 316, which changes the temperature of the water.

An operating member (e.g., the operating member 216 shown in FIG. 10) such as a handle, knob or the like can be connected to the stem portion 328 of the ball-stem 304 to facilitate manipulation of the stem portion 328 by a user. Accordingly, after the valve cartridge 300 is installed in the valve body, the user can manipulate the operating member which moves the stem portion 328 of the ball-stem 304 to change the position and/or orientation of the movable disk 314 relative to the fixed disk 316, thereby controlling the flow rate and temperature of the water flowing through the valve cartridge 300 and out a plumbing fixture (e.g., the plumbing fixture 218 shown in FIG. 10).

Pivoting of the stem portion 328 of the ball-stem 304 about the pin 306 can be limited by the stem portion 328 contacting opposing surfaces of the upper opening 326 of the housing 302. Thus, the stem portion 328 of the ball-stem 304 contacts a first surface 458 of the upper opening 326 of the upper housing 302 when the valve cartridge 300 is in a fully closed position corresponding to a flow rate of zero (see FIG. 21C). The stem portion 328 of the ball-stem 304 contacts a second surface 460 of the upper opening 326 of the upper housing 302 when the valve cartridge 300 is in a fully open position corresponding to a maximum flow rate. Rotation of the stem portion 328 of the ball-stem 304 can be limited by the distal ends of the pin 306 contacting end portions 462 of the slots 338 (see FIG. 21A). Accordingly, the length of the slots 338, which function as temperature limit stops, define the range of temperatures for which the valve cartridge 300 can deliver the water.

The valve cartridge 300 has structural features that make an amount of force required to operate the valve cartridge 300 insensitive to a load applied to the valve cartridge 300 during installation of the valve cartridge 300 in the valve body. In an exemplary embodiment, the load applied to the valve cartridge 300 is directly related to an amount of torque applied to the retention nut 464 during installation of the valve cartridge 300 in the valve body.

In one exemplary embodiment, after an amount of torque is applied to the retention nut 464 to install the valve cartridge 300 in the valve body in an operational state, an increased amount of torque will not increase the load applied to the valve cartridge 300 in the operational state. In one exemplary embodiment, the operational state refers to the valve cartridge 300 not leaking during use. In another exemplary embodiment, the operational state refers to the movable disk 314 being readily movable relative to the fixed disk 316. In yet another exemplary embodiment, the operational state refers to a threshold load that is applied to the valve cartridge 300. In still another exemplary embodiment, the operational state refers to a range of installation loads within which the valve cartridge 300 functions properly.

One exemplary structural feature that contributes to the installation load insensitivity of the valve cartridge 300 is the spring 308. The spring 308 is connected to the second inner surface 346 of the upper housing 302 during assembly of the valve cartridge 300. In this manner, the spring 308 secures the ball-stem 304 in the upper housing 302 independently of the bushing 310, the carrier 312, the movable disk 314, the fixed disk 316 and the base seal 318 being inserted in the upper housing 302. The spring 308 exerts an upward force (i.e., a preloading force) on the ball-stem 304.

As noted above, when the assembled valve cartridge 300 is installed in the valve body by tightening the retention nut 464 down on the installation ledge 334 and/or the upper housing 302 above the installation ledge 334, the base seal 318 is compressed. This compression of the base seal 318 results in a loading force being transferred up through the components of the valve cartridge 300. However, because the spring 308 exerts the upward preloading force on the ball-stem 304, which is distinct from the loading force, and the projection 340 of the ball-stem 304 does not bottom out in the coupling recess 372 of the carrier 312, the actuating mechanism (i.e., the ball-stem 304) is decoupled from the components of the valve cartridge 300 disposed below the spring 308 (e.g., the bushing 310, the carrier 312, the movable disk 314, the fixed disk 316 and the base seal 318). Accordingly, the spring 308 isolates the ball-stem 304 from the loading force attributable to the compression of the base seal 318, such that the ball-stem 304 is influenced primarily by the preloading force of the spring 308 and not the load applied to the valve cartridge 300 during installation of the valve cartridge 300. As a result, the user realizes a consistent, precise and smooth feel during operation of the valve cartridge 300 over a wide range of installation loads (e.g., installation torques of 25-200 lbs-in.).

Still another exemplary structural feature that contributes to the installation torque insensitivity of the valve cartridge 300 is the location of the installation ledge 334. The installation ledge 334 is formed below the ball-stem 304 (see FIGS. 21B-21C). Additionally, the installation ledge 334 is formed above that portion of the cavity 322 in the upper housing 302 that receives the flat annular portion 354 of the bushing 310, the carrier 312, the movable disk 314, the fixed disk 314 and the base seal 318 (see FIGS. 21B-21C). When the retention nut 464 is tightened down on the upper housing 302, the upper housing 302 is forced toward a seating surface (e.g., the seating surface 214 shown in FIG. 10) of the valve body. Because the force of the retention nut 464 on the upper housing 302 is located below (or near the bottom of) the ball-stem 304, operation of the ball-stem 304 is not directly affected by an increased torque applied to the retention nut 464 during installation of the valve cartridge 300. Furthermore, the ball-stem 304 is not indirectly affected by the increased torque applied to the retention nut 464 and the resulting compression of the base seal 318 because of the spring 308 described above.

An exemplary structural feature that prevents deformation or buckling of the upper housing 302 from an excessive amount of torque applied to the retention nut 464 (and the resulting installation load on the valve cartridge 300) is the rigidity of the upper housing 302. Deformation of the upper housing 302 could affect the operation of the ball-stem 304 and could render the valve cartridge 300 inoperable. By preventing such deformation, the ball-stem 304 can provide a consistent, precise and smooth feel during operation of the valve cartridge 300 over a wide range of installation loads (e.g., installation torques of 25-200 lbs-in.). Accordingly, the upper housing 302 is made of a hard material such as a hard plastic or metal that resists deformation and, thus, contributes to the installation torque insensitivity of the valve cartridge 300.

Another exemplary structural feature that increases the rigidity of the upper housing 302 and, thus, prevents deformation of the upper housing 302 from an excessive installation load on the valve cartridge 300 is the formation of one or more ribs on the upper housing 302. The ribs increase the structural strength of the upper housing 302, thereby preventing deformation of the upper housing 302. In one exemplary embodiment, the one or more keys 336 function as the ribs. As noted above, the keys 336 can have a lobular shape. The keys 336 are formed integrally with the upper housing 302. In one exemplary embodiment, the keys 336 extend from near the lower opening 324 of the upper housing 302 to the installation ledge 334 of the upper housing 302.

In one exemplary embodiment, the height of the keys 336 is between 0.641 and 0.651 inches. In another exemplary embodiment, the height of the keys 336 is approximately 0.646 inches.

In one exemplary embodiment, as described above, one or more of the projections 400 of the lower housing 320 form part of the keys 336. In another exemplary embodiment, one or more of the keys 336 has a first height and one or more of the keys 336 has a second height, wherein the first height is smaller than the second height. In one exemplary embodiment, the first height is between 0.368 and 0.384 inches. In another exemplary embodiment, the first height is 0.376 inches. In one exemplary embodiment, the second height is between 0.513 and 0.529 inches. In another exemplary embodiment, the second height is 0.521 inches.

In one exemplary embodiment, three keys 336 are formed around a circumference of the upper housing 302. The keys 336 can be evenly spaced around a circumference of the upper housing 302. Alternatively, the keys 336 can be unevenly spaced around the circumference of the upper housing 302. Because of the rigidity of the upper housing 302 (e.g., due to the keys 336 acting as ribs), the upper housing 302 can resist deformation over a wide range of installation loads applied to the valve cartridge 300, which allows the ball-stem 304 to provide a consistent, precise and smooth feel during operation of the valve cartridge 300.

Still another exemplary structural feature that prevents deformation of the upper housing 302 from an excessive amount of torque applied to the retention nut 464 is structure on the retention nut 464 and/or the valve body that prevents the excessive torque from being transferred to the valve cartridge 300 where it would otherwise result in an excessive load on the valve cartridge 300. For example, the retention nut 464 includes an annular flange 466 that bottoms out on a surface (e.g., the surface 230 shown in FIG. 10) of the valve body to prevent excessive tightening of the retention nut 464. Accordingly, the annular flange 466 functions to limit the maximum amount of torque that can be transferred from the retention nut 464 to the upper housing 302 of the valve cartridge 300. By preventing an excessive amount of torque from being transferred from the retention nut 464 to the upper housing 302, the annular flange 466 prevents deformation of the upper housing 302, which allows the ball-stem 304 to provide a consistent, precise and smooth feel during operation of the valve cartridge 300.

Figure 22A:
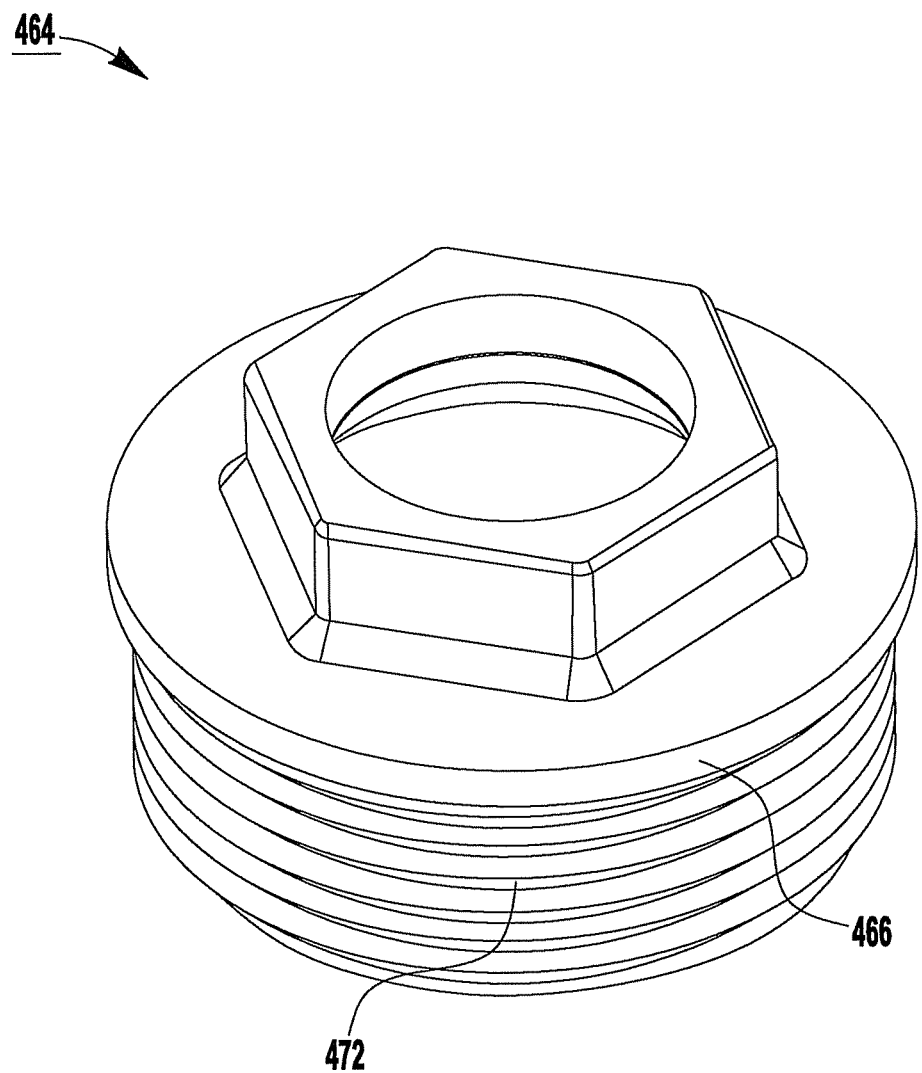
FIGS. 22A-22C show an exemplary retention nut used to secure the exemplary valve cartridge of FIG. 11 in a valve body.
Figure 22B:
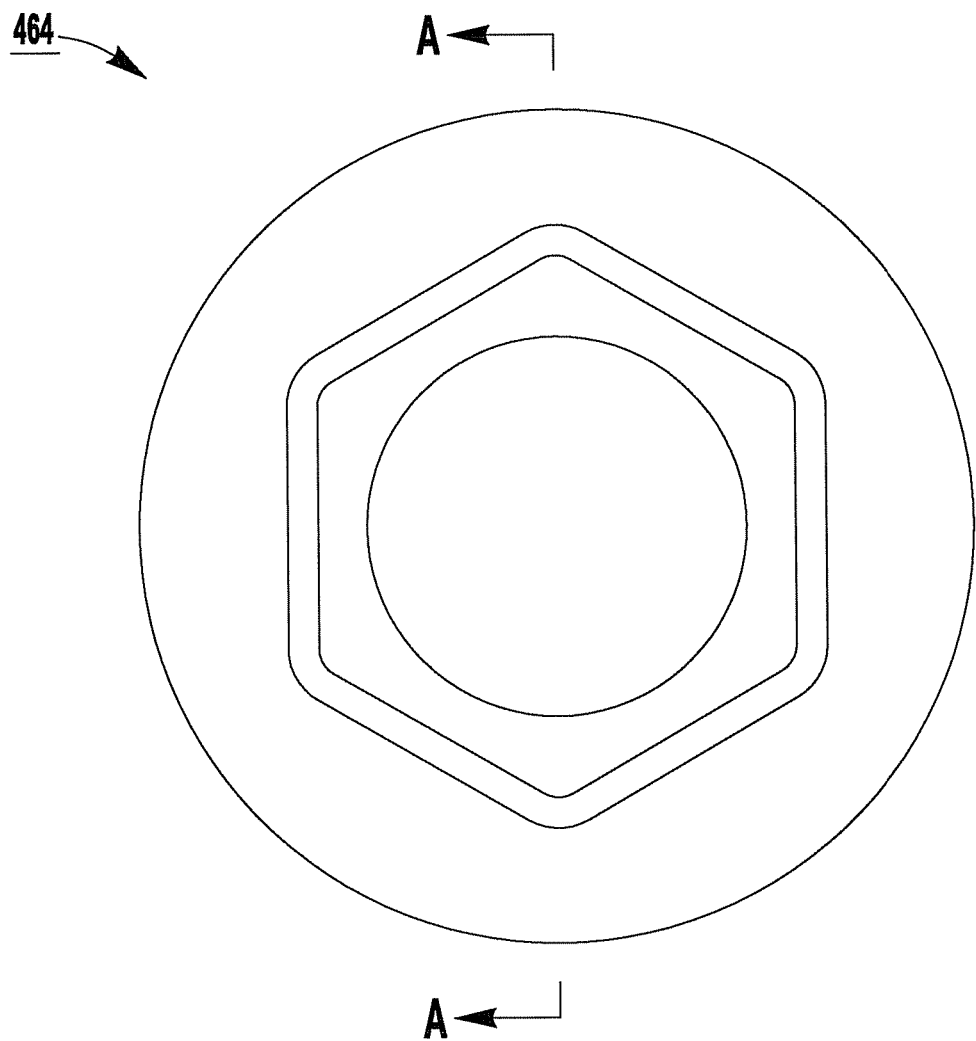
Figure 22C:
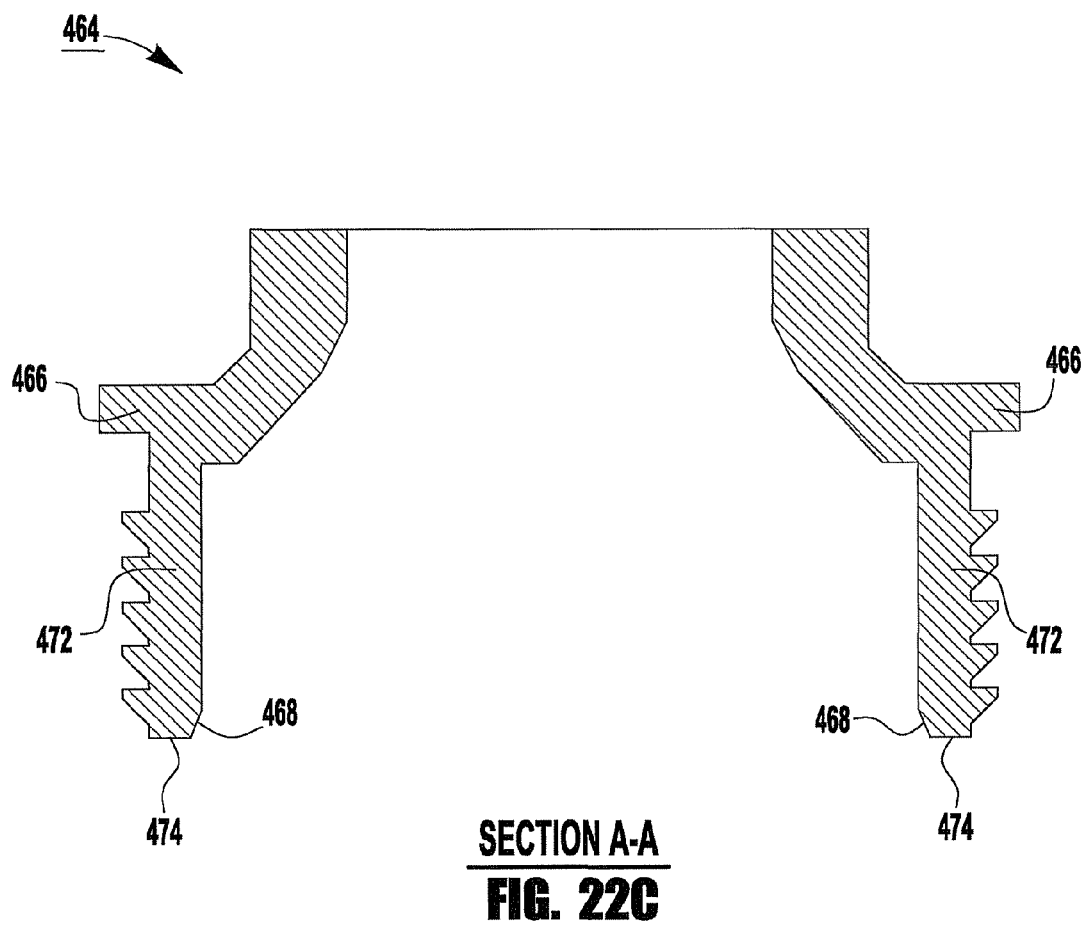

In another exemplary embodiment, the retention nut 464 includes a tapered portion 468 formed on an inner surface of the retention nut 464 (see FIGS. 22C and 23). The upper housing 302 includes a tapered portion 470 formed on an outer surface of the upper housing 302 (see FIGS. 12B-12C and 23). As shown in FIG. 23, as the retention nut 464 bears down on the upper housing 302, the tapered portion 470 of the upper housing 302 contacts the tapered portion 468 of the retention nut 464 to force a threaded portion 472 of the retention nut 464 against a threaded portion (not shown) of the valve body. In this manner, a gap g is maintained between a lower portion 474 of the retention nut 464 and the installation ledge 334 of the upper housing 302. Accordingly, the tapered portions 468 and 470 function to limit the maximum amount of torque that can be transferred from the retention nut 464 to the upper housing 302 of the valve cartridge 300.

Yet another exemplary structural feature that may contribute to the installation load insensitivity of the valve cartridge 300 is the formation of serrations on the lower portion 474 of the retention nut 464 that faces the installation ledge 334 of the upper housing 302. For example, a retention nut 480 shown in FIG. 24 has serrations 482 formed on its lower portion. Additionally, a raised ridge of material is formed or otherwise disposed on the installation ledge 334 of the upper housing 302. For example, a valve cartridge 484 shown in FIG. 25 includes a housing 486 with a raised ridge 488 of material formed on its installation ledge 490. Accordingly, as the retention nut 480 is rotated during installation of the valve cartridge 484 in the valve body, the serrations 482 on the retention nut 480 cut the raised ridge 488 of material on the installation ledge 490 of the housing 486. In this manner, the serrations 482 and the raised ridge 488 allow manufacturing tolerances of the components (e.g., the valve cartridge 300, the retention nut 464 and the valve body) to be absorbed, thereby insuring the retention nut 480 properly engages the valve cartridge 484 during installation. Alternatively, the serrations 482 could be formed on the installation ledge 490 of the housing 486, while the raised ridge 488 of material could be formed on the lower portion of the retention nut 480.

Another exemplary structural feature that contributes to the installation load insensitivity of the valve cartridge 300 is a low friction coating applied to the movable disk 314 and/or the fixed disk 316. For example, a diamond-like carbon coating is applied to a side of the movable disk 314 facing the fixed disk 316 and/or a side of the fixed disk 316 facing the movable disk 314. Because the ball-stem 304 is decoupled from the dynamic sealing elements (e.g., the movable disk 314 and the fixed disk 316) by the spring 308, as noted above, the frictional force between the movable disk 314 and the fixed disk 316 can be small without resulting in the handle drop problem discussed above. Accordingly, use of the low friction coating does not result in a weight of the operating member overcoming the frictional force between the movable disk 314 and the fixed disk 316, such that the operating member resists any unintentional change in position.

As an increased amount of torque is applied to the retention nut 464 during installation of the valve cartridge 300 in the valve body, the base seal 318 is subjected to increased compression. As a result, the movable disk 314 and the fixed disk 316 are pressed tightly together. The low friction coating, however, facilitates the movable disk 314 moving relative to the fixed disk 316 over a wide range of installation loads (e.g., installation torques of 25-200 lbs-in.). Accordingly, when an excessive amount of torque is applied to the retention nut 464, the user can readily move the operating member (and, thus, the ball-stem 304) to control the operation of the valve cartridge 300. Thus, the user experiences a consistent, precise and smooth feel during operation of the valve cartridge 300.

The above exemplary structural features, whether alone, in combination or in various subcombinations, contribute to the installation load insensitivity of the valve cartridge 300. Consequently, the amount of force required to operate the valve cartridge 300 is relatively insensitive to (i.e., varies little with respect to) the load applied to the valve cartridge 300 during installation of the valve cartridge 300 in the valve body. Thus, the valve cartridge 300 operates properly over a wide range of installation loads. Furthermore, the user realizes a consistent, precise and smooth feel during operation of the valve cartridge 300 over a wide range of installation loads.

Because operation of the valve cartridge 300 is relatively insensitive to an installation load, the valve cartridge 300 can be more readily installed in the valve body without using a specialized tool or mechanism, such as a torque wrench.

Figure 26:
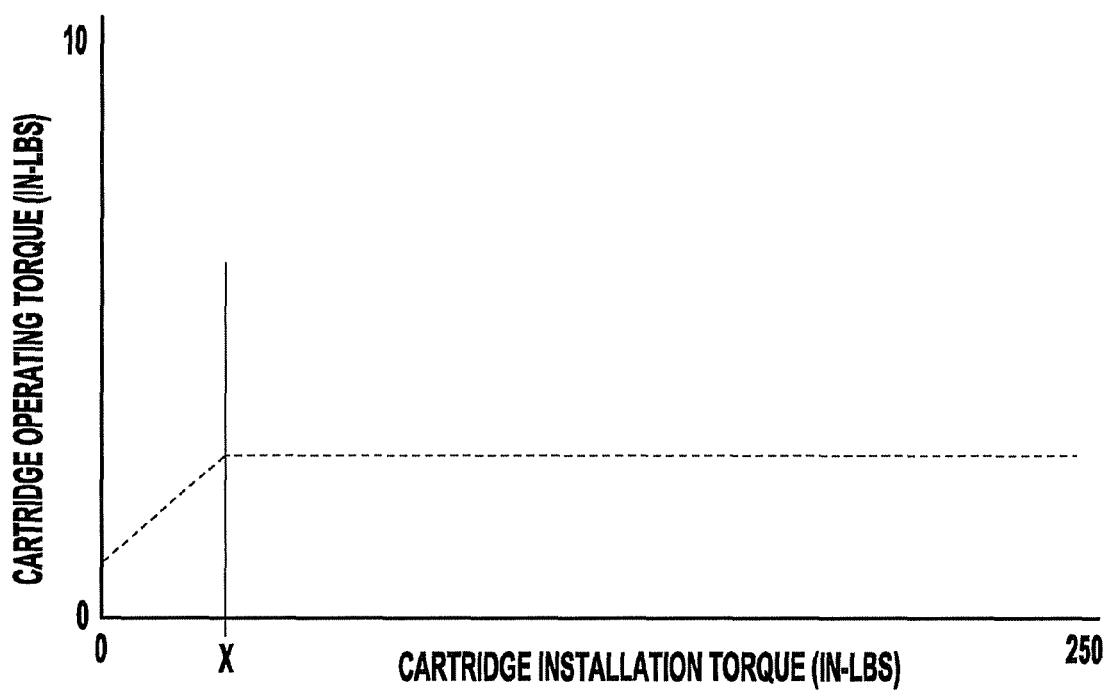
FIG. 26 is a graph illustrating a relationship between a valve cartridge operating torque and a valve cartridge installation torque, according to an exemplary embodiment.

As shown in FIG. 26, once a minimum required loading force x is achieved, an operational force (e.g., a torque required to adjust the flow rate and/or the temperature of the water flowing through a valve cartridge) remains substantially constant as the loading force x is increased. In one exemplary embodiment, the minimum required loading force x is a minimum force (e.g., a torque of 25 lbs-in.) applied to a retaining member (e.g., the retention nut 134, the retention nut 464) to compress a sealing member (e.g., the base seal 116, the base seal 318) in a valve cartridge (e.g., the valve cartridge 100, the valve cartridge 300) to prevent the valve cartridge from leaking during use. Thus, the valve cartridge is able to operate properly over a wide range of installation loads. Furthermore, the user realizes a consistent, precise and smooth feel during operation of the valve cartridge over the wide range of installation loads.

The above description of specific embodiments has been given by way of example. From the disclosure given, those skilled in the art will not only understand the general inventive concept and its attendant advantages, but will also find apparent various changes and modifications to the structures and methods disclosed. By way of example, the general inventive concept encompasses any form of installation force sufficient to achieve a proper load on the valve cartridge, including the described application of a torque (e.g., to a retention nut). It is sought, therefore, to cover all such changes and modifications as fall within the spirit and scope of the general inventive concept, as defined herein, and equivalents thereof.

The invention claimed is:

1. A valve for controlling a flow rate of a fluid, the valve comprising:
an actuating mechanism including a ball portion and a projection extending from the ball portion;
a first fluid control disk including a recess operable to receive at least a portion of the projection;
a second fluid control disk; and
an annular spring having a central opening and a plurality of elastic flanges extending around a periphery of the central opening,
wherein an actuating force is operable to move the actuating mechanism,
wherein movement of the actuating mechanism moves the first fluid control disk relative to the second fluid control disk to vary the flow rate of the fluid,
wherein the annular spring is disposed between the actuating mechanism and the fluid control disks,
wherein the elastic flanges of the annular spring extend below an upper surface of the annular spring, away from the ball portion of the actuating mechanism and toward the fluid control disks,
wherein at least a portion of the ball portion including the projection extends through the central opening of the annular spring, wherein the annular spring maintains contact with the actuating mechanism during movement of the actuating mechanism, wherein the projection of the ball portion does not contact a lower surface of the recess of the first fluid control disk during movement of the actuating mechanism, wherein the elastic flanges of the annular spring deform to exert a substantially uniform force on the ball portion of the actuating mechanism away from the fluid control disks, wherein a first range of loading forces are operable to keep opposing surfaces of the first fluid control disk and the second fluid control disk in operative engagement, wherein the first range of loading forces extends from a minimum loading force to a maximum loading force, wherein a loading force less than the minimum loading force allows the fluid to leak from the valve, wherein a loading force greater than the maximum loading force prevents movement of the first fluid control disk relative to the second fluid control disk, wherein a threshold loading force is within the first range of loading forces, wherein a second range of loading forces extends from the threshold loading force to the maximum loading force, and wherein the actuating force remains substantially constant across a plurality of loading forces within the second range of loading forces.

2. The valve of claim 1, wherein the range of loading forces corresponds to a range of torques of 25 to 200 lbs-in. applied to a retaining member for securing the valve in a valve body.

3. The valve of claim 2, wherein the threshold loading force corresponds to a torque of 25 lbs-in. applied to the retaining member.

4. The valve of claim 2, wherein the retaining member comprises:
   a body for interfacing with the valve body, and
   an annular flange formed on the body,
   wherein the annular flange is operable to contact the valve body to limit a loading force applied to the valve by the retaining member.

5. The valve of claim 4, wherein the retaining member is a nut.

6. The valve of claim 1, further comprising a resilient member disposed between the actuating mechanism and the first fluid control disk,
   wherein the resilient member exerts a preloading force on the actuating mechanism and away from the first fluid control disk.

7. The valve of claim 6, wherein the resilient member is an annular spring.

8. The valve of claim 1, wherein the first fluid control disk has a mixing chamber formed integrally therewith.

9. The valve of claim 1, wherein the threshold loading force is closer to the minimum loading force than the maximum loading force.

10. The valve of claim 1, wherein the threshold loading force is equal to the minimum loading force.

* * * * *